US008416528B1

(12) United States Patent
Sasaki et al.

(10) Patent No.: US 8,416,528 B1
(45) Date of Patent: Apr. 9, 2013

(54) MAGNETIC HEAD FOR PERPENDICULAR MAGNETIC RECORDING HAVING A RETURN PATH SECTION

(75) Inventors: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Yukinori Ikegawa, Milpitas, CA (US); Atsushi Iijima, Hong Kong (CN); Tatsuya Shimizu, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/463,298

(22) Filed: May 3, 2012

(51) Int. Cl.
*G11B 5/127* (2006.01)

(52) U.S. Cl.
USPC .................................. 360/125.02; 29/603.16

(58) Field of Classification Search ...... 360/125.02–125.15, 119.02; 29/603.16
See application file for complete search history.

(56) References Cited

U.S. PATENT DOCUMENTS

| | | | |
|---|---|---|---|
| 7,233,457 B2 * | 6/2007 | Johnston et al. | 360/125.04 |
| 7,343,668 B2 * | 3/2008 | Kobayashi | 29/603.16 |
| 7,957,096 B2 * | 6/2011 | Miyatake et al. | 360/125.02 |
| 8,064,162 B2 * | 11/2011 | Matsumoto et al. | 360/125.02 |
| 8,173,028 B2 * | 5/2012 | Ishizaki et al. | 216/22 |
| 8,270,110 B2 * | 9/2012 | Araki et al. | 360/125.11 |
| 8,295,008 B1 * | 10/2012 | Sasaki et al. | 360/125.02 |
| 8,300,357 B1 * | 10/2012 | Sasaki et al. | 360/123.06 |
| 2005/0128637 A1 | 6/2005 | Johnston et al. | |
| 2010/0165517 A1 | 7/2010 | Araki et al. | |

* cited by examiner

*Primary Examiner* — Angel Castro
(74) *Attorney, Agent, or Firm* — Oliff & Berridge, PLC

(57) ABSTRACT

A magnetic head includes a main pole and a return path section located above a top surface of a substrate. The main pole has an end face located in a medium facing surface. The return path section is located on the front side in the direction of travel of a recording medium relative to the main pole and is farther from the top surface of the substrate than is the main pole. The return path section has: a front end face located on the front side of the main pole in the medium facing surface; and an inclined surface located on the front side and connected to the front end face. The inclined surface is not exposed in the medium facing surface. An angle greater than 90° is formed between the front end face and the inclined surface.

12 Claims, 37 Drawing Sheets

MAGNETIC HEAD FOR PERPENDICULAR MAGNETIC RECORDING HAVING A RETURN PATH SECTION

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a main pole and a return path section.

2. Description of Related Art

The recording systems of magnetic read/write apparatuses include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head section having a magnetoresistive element (hereinafter, also referred to as MR element) for reading and a write head section having an induction-type electromagnetic transducer for writing are stacked on the top surface of a substrate. The write head section includes a main pole that produces a write magnetic field in a direction perpendicular to the plane of the recording medium. The main pole includes, for example, a track width defining portion having an end located in a medium facing surface that faces the recording medium, and a wide portion that is connected to the other end of the track width defining portion and is greater in width than the track width defining portion. The track width defining portion has a generally constant width. To achieve higher recording density, it is required that the write head section of the perpendicular magnetic recording system be smaller in track width and improved in write characteristics such as overwrite property which is a parameter indicating an overwriting capability.

A magnetic head for use in a magnetic disk drive such as a hard disk drive is typically provided in a slider. The slider has the medium facing surface mentioned above. The medium facing surface has an air inflow end (a leading end) and an air outflow end (a trailing end). The slider is designed to slightly fly over the surface of the recording medium by means of an airflow that comes from the air inflow end into the space between the medium facing surface and the recording medium.

Here, the side of positions closer to the leading end relative to a reference position will be defined as the leading side, and the side of positions closer to the trailing end relative to the reference position will be defined as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing (such a phenomenon will hereinafter be referred to as adjacent track erasure). For higher recording densities, it is necessary to prevent adjacent track erasure.

Providing one or more shields near the main pole is effective for preventing adjacent track erasure induced by the skew mentioned above and increasing the recording density. For example, U.S. Patent Application Publication Nos. 2005/0128637 A1 and 2010/0165517 A1 each disclose a magnetic head including a shield having an end face that is located in the medium facing surface to wrap around an end face of the main pole.

A magnetic head including one or more shields is typically provided with one or more return path sections including the one or more shields. The one or more return path sections are magnetically connected to part of the main pole away from the medium facing surface. The one or more return path sections have the function of capturing a magnetic flux that is produced from the end face of the main pole and spreads in directions other than the direction perpendicular to the plane of the recording medium, so as to prevent the magnetic flux from reaching the recording medium. The one or more return path sections also have the function of allowing a magnetic flux that has been produced from the end face of the main pole and has magnetized the recording medium to flow back to the main pole. Thus, the magnetic head having one or more shields near the main pole can prevent the occurrence of adjacent track erasure and provide a further improved recording density.

U.S. Patent Application Publication Nos. 2005/0128637 A1 and 2010/0165517 A1 each disclose a magnetic head including, as the aforementioned one or more return path sections, a return path section located on the leading side relative to the main pole and a return path section located on the trailing side relative to the main pole.

Now, the configuration of the return path section located on the trailing side relative to the main pole (hereinafter, referred to as the trailing return path section) will be contemplated. In a magnetic head, the read head section and the write head section stacked on the top surface of the substrate are typically located on the trailing side relative to the top surface of the substrate. In this case, the trailing return path section is disposed farther from the top surface of the substrate than is the main pole. The main pole and the trailing return path section define a space through which a portion of a coil passes. In such a magnetic head, the trailing return path section is typically composed of a plurality of layers.

In the magnetic head shown in FIG. 9 of U.S. Patent Application Publication No. 2005/0128637 A1, the trailing return path section is composed of a shorting shield, a return pole, a back via and a yoke. In this magnetic head, the shorting shield is extremely longer in the direction of travel of the recording medium than in the direction perpendicular to the medium facing surface, and an end face of the shorting shield is exposed over a large area in the medium facing surface. When the shorting shield has such a configuration, part of the magnetic flux captured into the shorting shield from a part of the end face of the shorting shield located near the end face of the main pole may leak from another part of the end face of the shorting shield toward the recording medium. This may result in the occurrence of adjacent track erasure.

Furthermore, in the above-described magnetic head, heat generated by the coil may cause expansion of the shorting shield and an insulating layer surrounding the coil, and thereby cause the end face of the shorting shield to protrude toward the recording medium. The protrusion of the end face of the shorting shield causes the end face of the main pole and an end of the read head section located in the medium facing surface to get farther from the recording medium, and this may result in degradation of the read and write characteristics.

In the magnetic head shown in FIG. 2 of U.S. Patent Application Publication No. 2010/0165517 A1, the trailing return path section is composed of seven layers. The seven layers include a top shield layer having an end face that is located in the medium facing surface at a position on the trailing side relative to the end face of the main pole, and second to fourth layers that are stacked in order on the top shield layer. In this magnetic head, each of the second to fourth layers has an end face that is closer to the medium facing surface and located at a distance from the medium facing surface. This magnetic head can avoid the problems resulting from a configuration in which an end face of the trailing return path section is exposed over a large area in the medium facing surface.

However, the magnetic head shown in FIG. 2 of U.S. Patent Application Publication No. 2010/0165517 A1 has the following drawback. In this magnetic head, the end face of the top shield layer located in the medium facing surface and the top surface of the top shield layer intersect at 90°. Consequently, the trailing return path section has an edge with an angle of 90° in the vicinity of the medium facing surface. When the trailing return path section has such a configuration, there tends to be magnetic field leakage from the vicinity of the aforementioned edge to the outside of the trailing return path section. This may result in the occurrence of adjacent track erasure.

OBJECT AND SUMMARY OF THE INVENTION

It is an object of the present invention to provide a magnetic head for perpendicular magnetic recording that is capable of precluding the occurrence of adjacent track erasure attributable to a return path section located on the front side in the direction of travel of the recording medium relative to the main pole, and a method of manufacturing such a magnetic head.

A magnetic head for perpendicular magnetic recording of the present invention includes: a medium facing surface that faces a recording medium; a coil; a main pole; a first return path section made of a magnetic material; a gap part; a nonmagnetic layer made of a nonmagnetic material; and a substrate having a top surface. The coil produces a magnetic field corresponding to data to be written on the recording medium. The main pole has an end face located in the medium facing surface. The main pole allows a magnetic flux corresponding to the magnetic field produced by the coil to pass, and produces a write magnetic field for writing the data on the recording medium by means of a perpendicular magnetic recording system. The gap part is made of a nonmagnetic material and includes a first portion interposed between the main pole and the first return path section. The coil, the main pole, the first return path section, the gap part, and the nonmagnetic layer are located above the top surface of the substrate.

The first return path section is located on the front side in the direction of travel of the recording medium relative to the main pole and is farther from the top surface of the substrate than is the main pole. The first return path section is magnetically connected to part of the main pole away from the medium facing surface so that a first space is defined by the main pole, the gap part and the first return path section. The coil includes at least one first coil element extending to pass through the first space.

The first return path section has: a front end face located in the medium facing surface at a position on the front side in the direction of travel of the recording medium relative to the end face of the main pole; and an inclined surface located on the front side in the direction of travel of the recording medium relative to the front end face. The inclined surface has a first edge connected to the front end face, and a second edge that is located farther from the top surface of the substrate than is the first space. Part of the inclined surface lies between the first space and the medium facing surface. The distance from the medium facing surface to an arbitrary point on the inclined surface increases with increasing distance from the arbitrary point to the top surface of the substrate. An angle greater than 90° is formed between the front end face and the inclined surface. The nonmagnetic layer includes an interposer interposed between the inclined surface and the medium facing surface.

In the magnetic head for perpendicular magnetic recording of the present invention, the angle formed between the front end face and the inclined surface may be in the range of 160° to 175°. The inclined surface may be planar.

In the magnetic head for perpendicular magnetic recording of the present invention, the first return path section may include: a first shield including the front end face; a first coupling portion for magnetically coupling the first shield to the part of the main pole away from the medium facing surface; and an underlying layer interposed between the first shield and the first coupling portion and underlying a part of the first coupling portion. In this case, the inclined surface may be formed over the first shield, the underlying layer and the first coupling portion. The first edge of the inclined surface may be present on the first shield. The first shield may further have a top surface farthest from the main pole. The first coupling portion may have a shield facing surface that faces the top surface of the first shield with the underlying layer interposed therebetween.

Where the first return path section includes the first shield, the first coupling portion and the underlying layer, the first coupling portion may include a yoke layer and a first, a second, and a third coupling layer. The yoke layer is located away from the medium facing surface and magnetically connected to the part of the main pole away from the medium facing surface. The first coupling layer includes the shield facing surface and is magnetically connected to the first shield. The second coupling layer is located farther from the top surface of the substrate than is the yoke layer, and is magnetically connected to the yoke layer. The third coupling layer is located farther from the top surface of the substrate than are the first and second coupling layers, and magnetically couples the first and second coupling layers to each other.

Where the first return path section includes the first shield, the first coupling portion and the underlying layer, the first coupling portion may include a yoke layer and a coupling layer. The yoke layer is located away from the medium facing surface and magnetically connected to the part of the main pole away from the medium facing surface. The coupling layer includes the shield facing surface. The coupling layer is located farther from the top surface of the substrate than are the first shield and the yoke layer, and magnetically couples the first shield and the yoke layer to each other.

The magnetic head for perpendicular magnetic recording of the present invention may further include a second return path section made of a magnetic material and located on the rear side in the direction of travel of the recording medium relative to the main pole. In this case, the gap part may further include a second portion interposed between the main pole and the second return path section. The second return path section may be magnetically connected to the part of the main pole away from the medium facing surface so that a second space is defined by the main pole, the gap part and the second return path section. The coil may further include at least one second coil element extending to pass through the second space.

The magnetic head for perpendicular magnetic recording of the present invention may further include two side shields made of a magnetic material and having two end faces that are located in the medium facing surface at positions on opposite sides of the end face of the main pole in a track width direction.

A method of manufacturing the magnetic head for perpendicular magnetic recording of the present invention includes the steps of forming a preliminary main pole which is to be provided with the end face later to thereby become the main pole; forming the gap part; forming the coil; forming a preliminary return path section which is to be provided with the front end face and the inclined surface later to thereby become the first return path section; partially etching the preliminary return path section so that the preliminary return path section is provided with the inclined surface; forming a preliminary nonmagnetic layer which is to become the nonmagnetic layer later; and forming the medium facing surface so that the preliminary return path section is provided with the front end face and thereby becomes the first return path section, the preliminary main pole is provided with the end face and thereby becomes the main pole, and the preliminary nonmagnetic layer becomes the nonmagnetic layer.

In the method of manufacturing the magnetic head for perpendicular magnetic recording of the present invention, the angle formed between the front end face and the inclined surface may be in the range of 160° to 175°. The inclined surface may be planar.

In the method of manufacturing the magnetic head for perpendicular magnetic recording of the present invention, the first return path section may include: a first shield including the front end face; a first coupling portion for magnetically coupling the first shield to the part of the main pole away from the medium facing surface; and an underlying layer interposed between the first shield and the first coupling portion and underlying a part of the first coupling portion. In this case, the inclined surface may be formed over the first shield, the underlying layer and the first coupling portion. The first edge of the inclined surface may be present on the first shield. The first shield may further have a top surface farthest from the main pole. The first coupling portion may have a shield facing surface that faces the top surface of the first shield with the underlying layer interposed therebetween.

In this case, the step of forming the preliminary return path section may include the steps of: forming a preliminary shield which is to become the first shield later; forming a seed layer on the preliminary shield, the seed layer being intended to become the underlying layer later; and forming a preliminary coupling portion which is to become the first coupling portion later, wherein at least part of the preliminary coupling portion is formed by plating with the seed layer used as a seed. The step of partially etching the preliminary return path section may etch respective portions of the preliminary shield, the seed layer and the preliminary coupling portion so that the inclined surface is formed over the preliminary shield, the seed layer and the preliminary coupling portion.

In the magnetic head for perpendicular magnetic recording of the present invention, the first return path section has the front end face, and the inclined surface that is located on the front side in the direction of travel of the recording medium relative to the front end face. This serves to reduce the exposure area of the first return path section in the medium facing surface. Furthermore, in the present invention, an angle greater than 90° is formed between the front end face and the inclined surface of the first return path section. The present invention having these features can preclude the occurrence of adjacent track erasure attributable to the first return path section.

Other objects, features and advantages of the present invention will become fully apparent from the following description.

DETAILED DESCRIPTION OF THE PREFERRED EMBODIMENTS

First Embodiment

Figure 1:
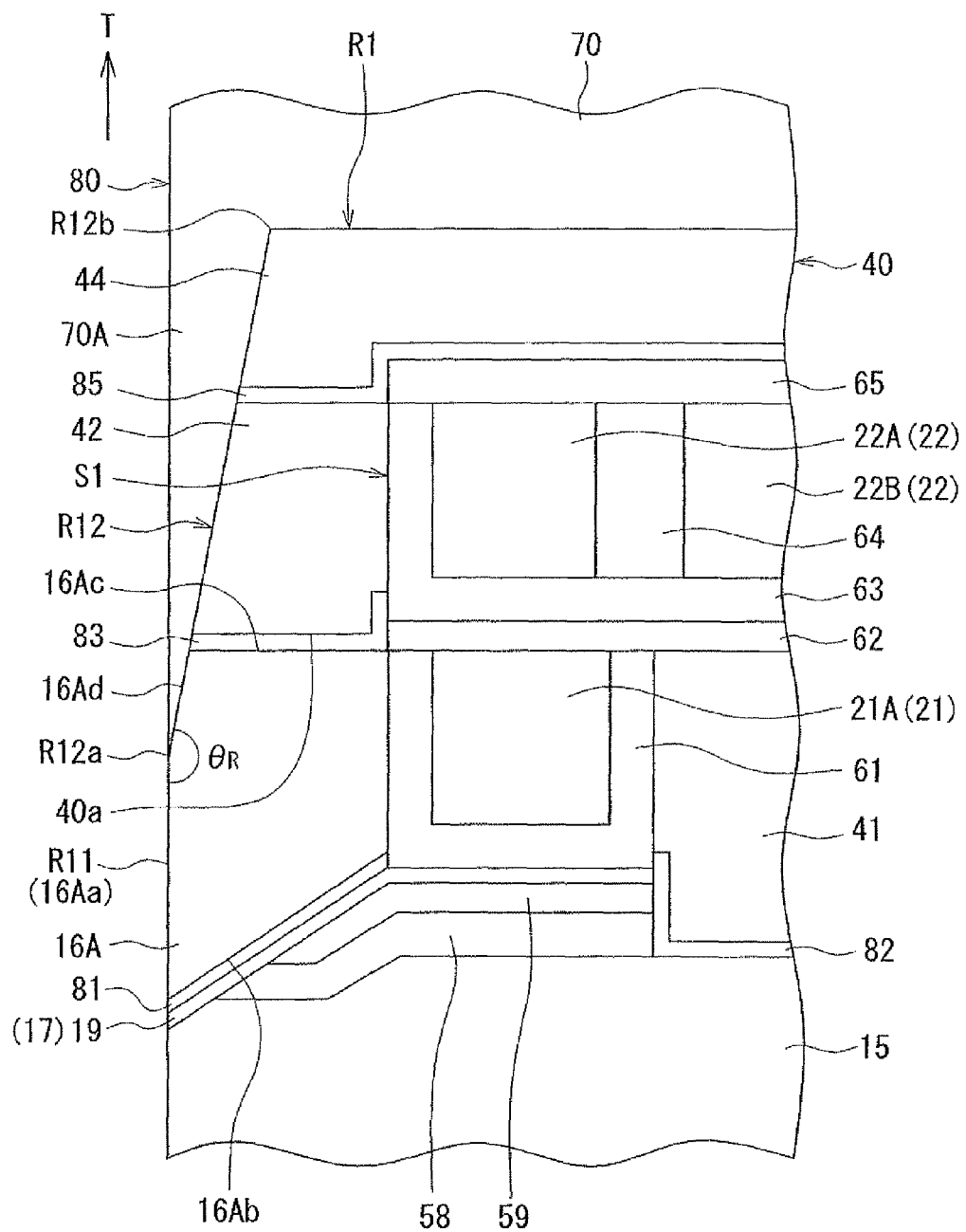
FIG. 1 is a cross-sectional view showing a part of a first return path section in the vicinity of a medium facing surface in a magnetic head according to a first embodiment of the invention.
Figure 2:
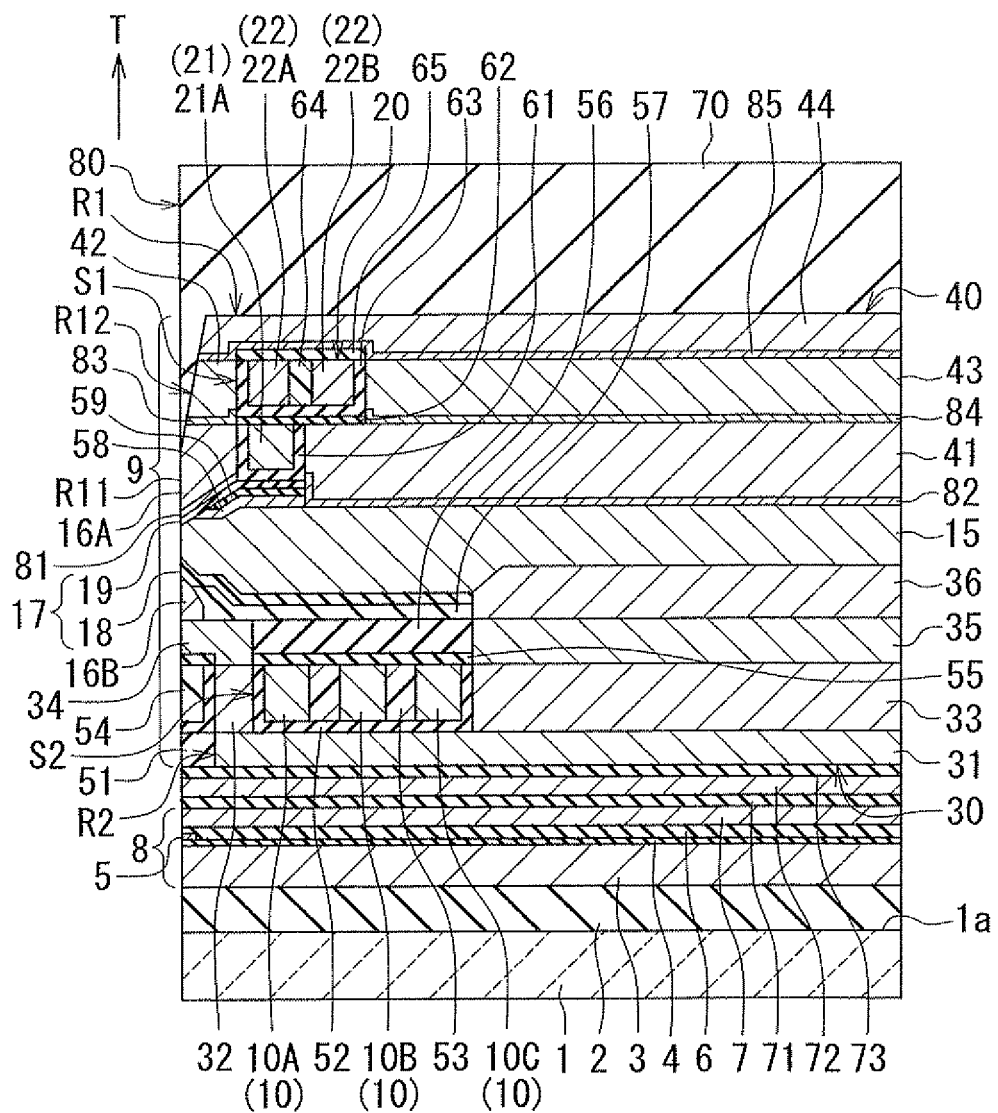
FIG. 2 is a cross-sectional view of the magnetic head according to the first embodiment of the invention.
Figure 3:
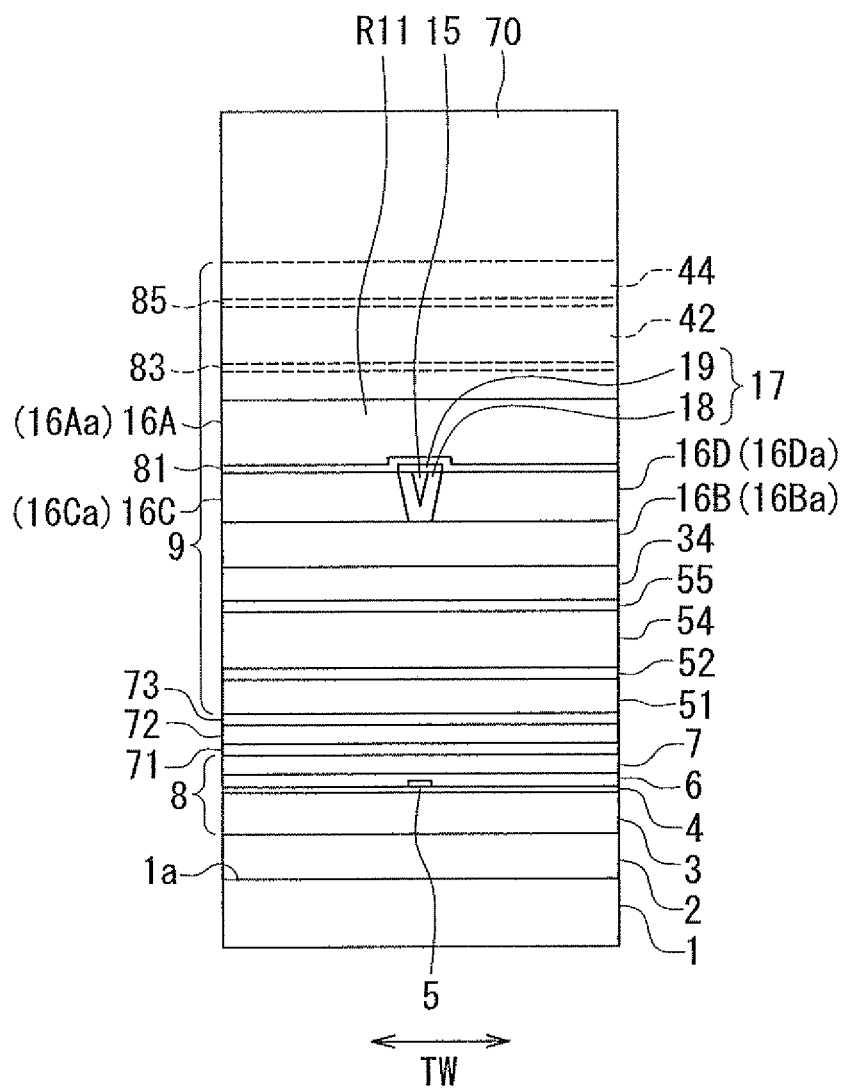
FIG. 3 is a front view showing the medium facing surface of the magnetic head according to the first embodiment of the invention.
Figure 4:
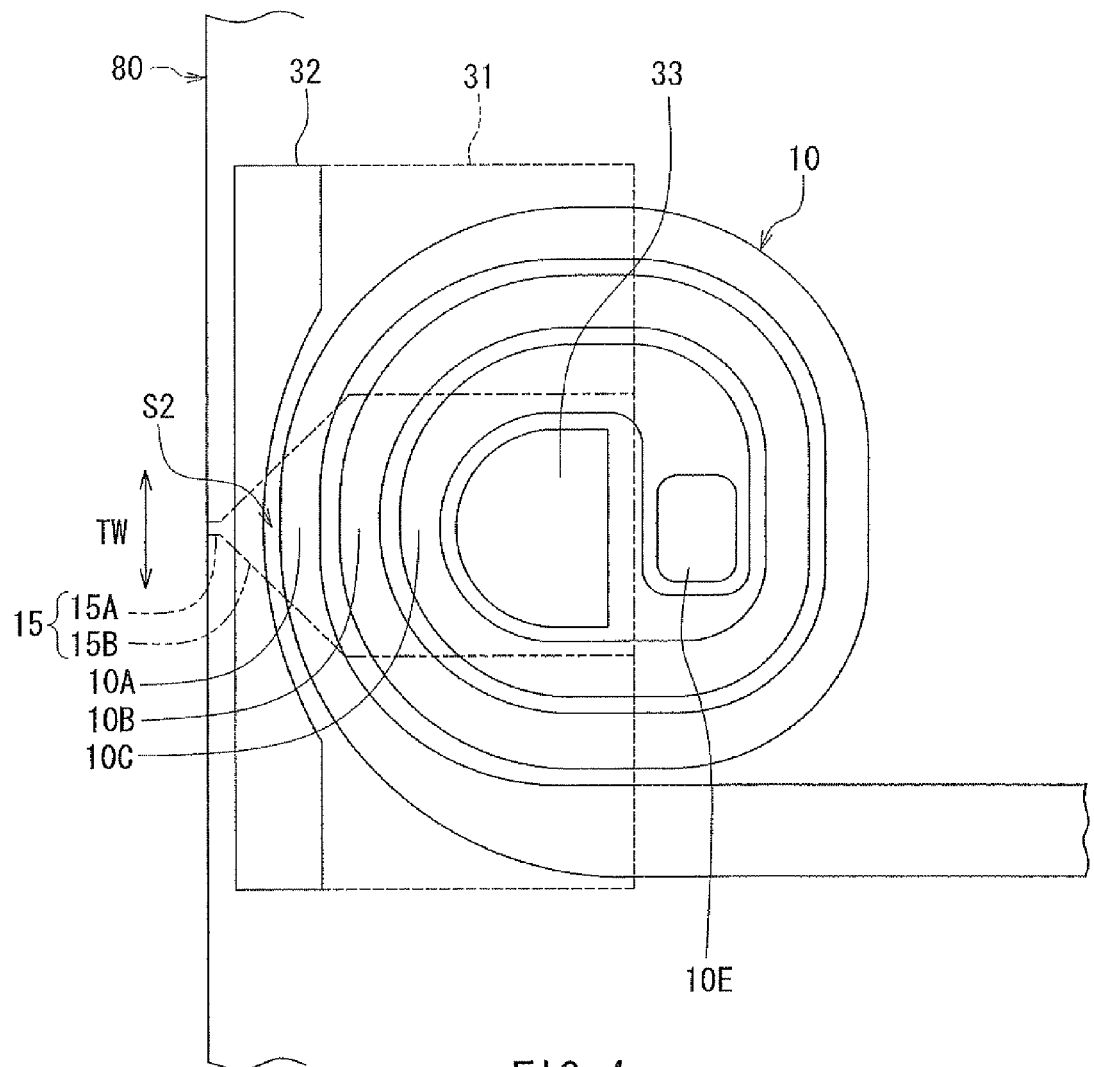
FIG. 4 is a plan view showing a second portion of a coil of the magnetic head according to the first embodiment of the invention.
Figure 5:
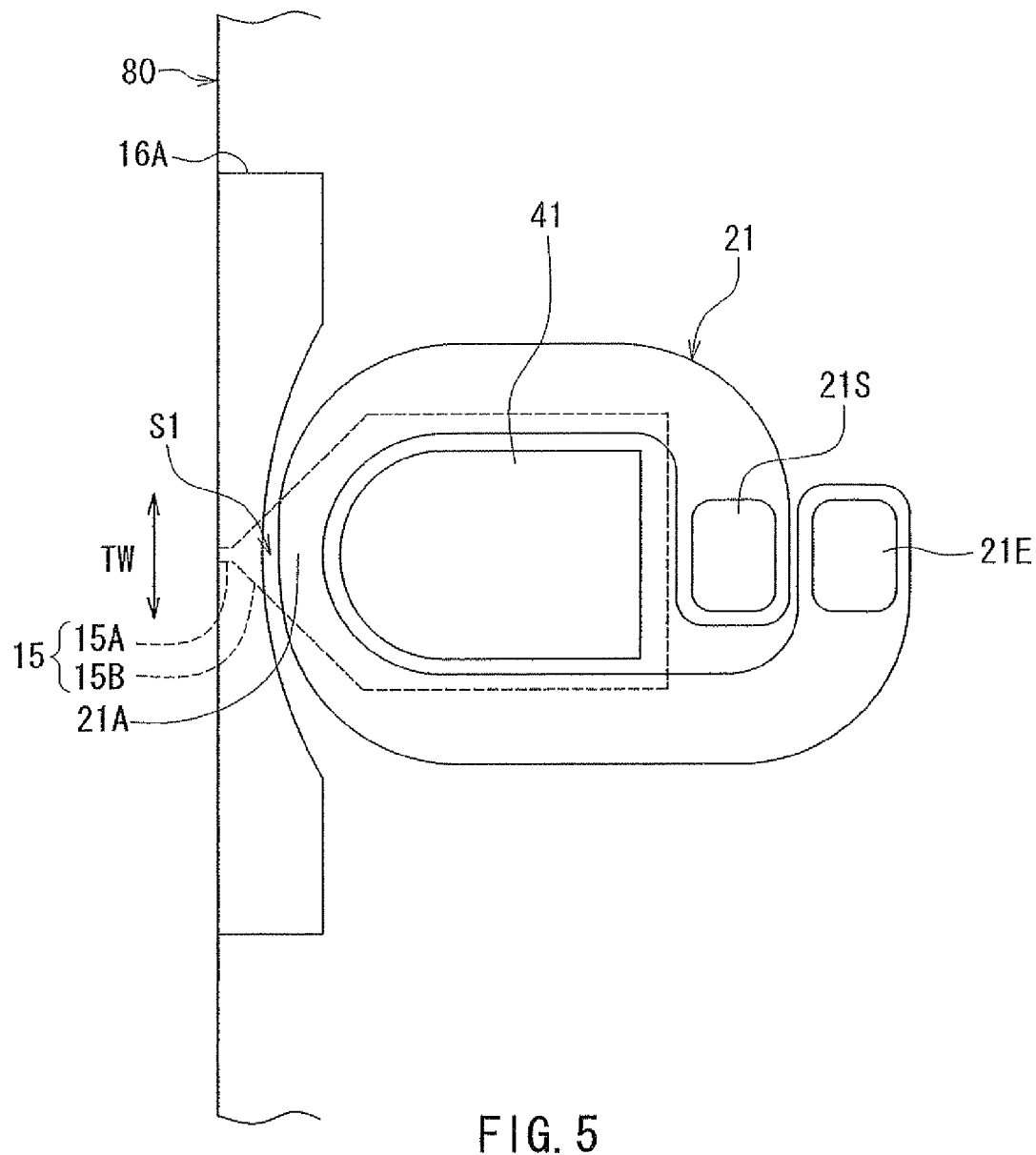
FIG. 5 is a plan view showing a first layer of a first portion of the coil of the magnetic head according to the first embodiment of the invention.
Figure 6:
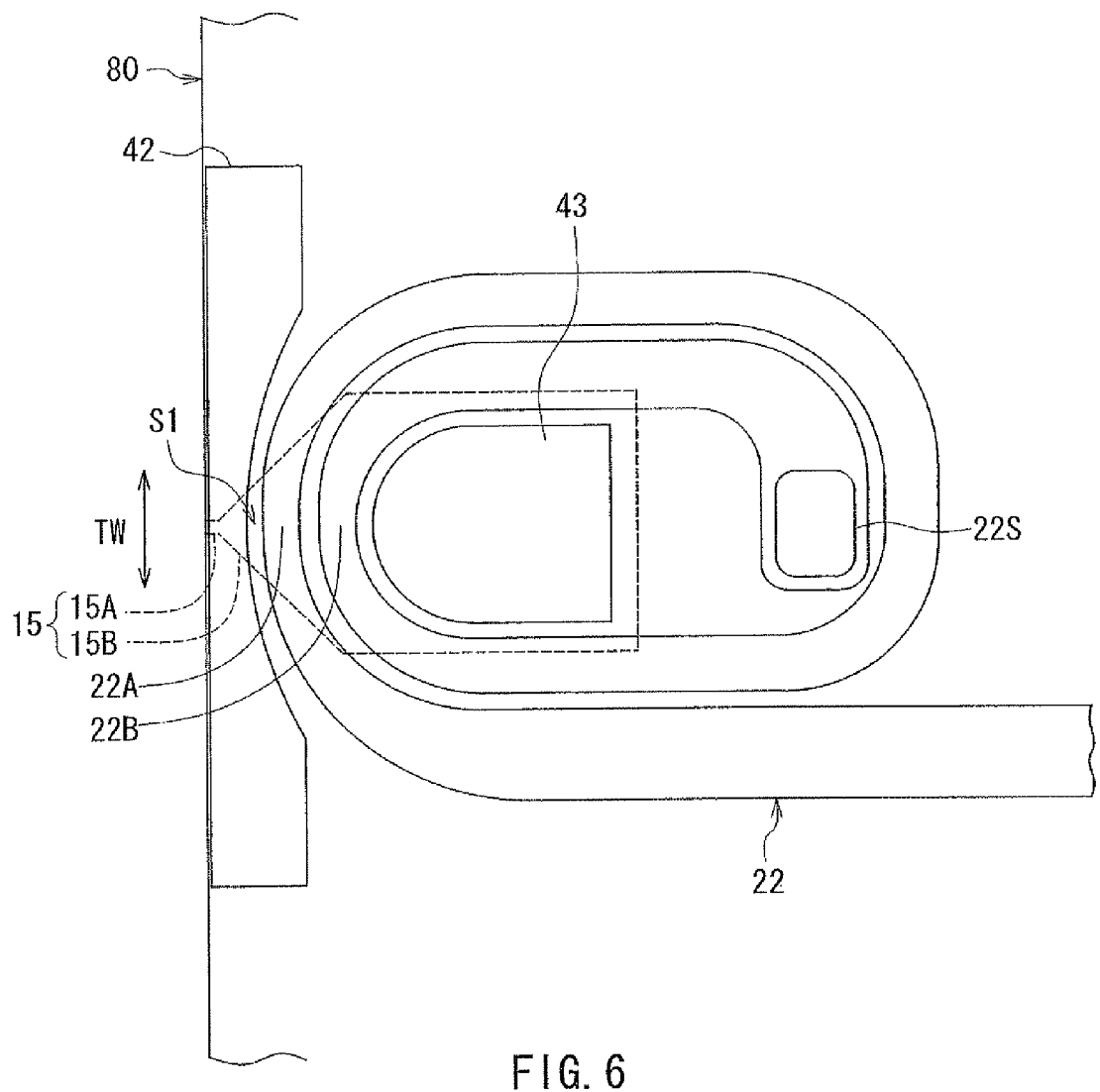
FIG. 6 is a plan view showing a second layer of the first portion of the coil of the magnetic head according to the first embodiment of the invention.
Figure 7:
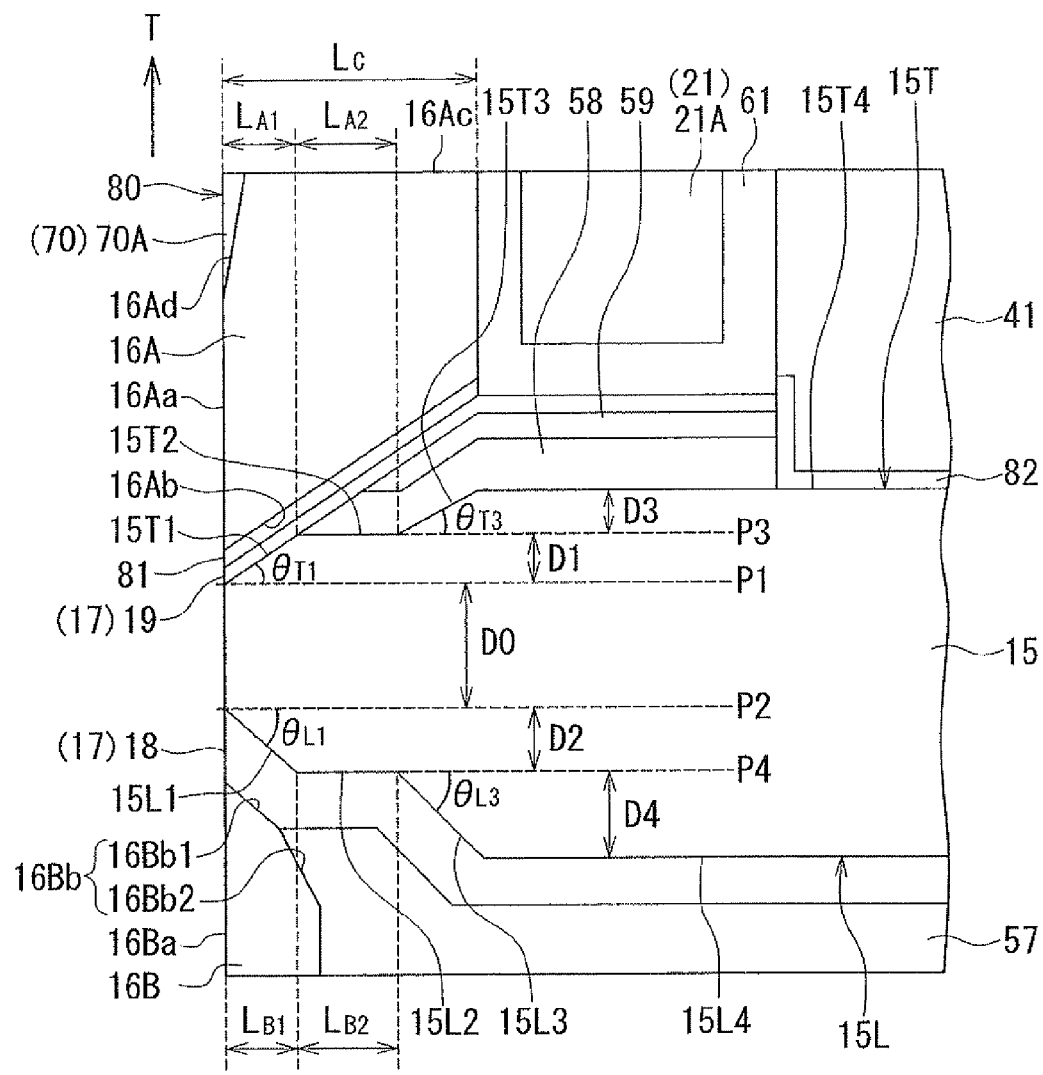
FIG. 7 is a cross-sectional view showing a part of a main pole in the vicinity of the medium facing surface in the magnetic head according to the first embodiment of the invention.

Embodiments of the present invention will now be described in detail with reference to the drawings. First, reference is made to FIG. 1 to FIG. 7 to describe the configuration of a magnetic head according to a first embodiment of the invention. FIG. 1 is a cross-sectional view showing a part of a first return path section in the vicinity of the medium facing surface in the magnetic head according to the present embodiment. FIG. 2 is a cross-sectional view of the magnetic head according to the present embodiment. FIG. 3 is a front view showing the medium facing surface of the magnetic head according to the present embodiment. FIG. 4 is a plan view showing a second portion of a coil of the magnetic head according to the present embodiment. FIG. 5 is a plan view showing a first layer of a first portion of the coil of the magnetic head according to the present embodiment. FIG. 6 is a plan view showing a second layer of the first portion of the coil of the magnetic head according to the present embodiment. FIG. 7 is a cross-sectional view showing a part of a main pole in the vicinity of the medium facing surface in the magnetic head according to the present embodiment. Note that FIG. 1, FIG. 2 and FIG. 7 show cross sections perpendicular to the medium facing surface and to the top surface of the substrate. The arrows with the symbol T in FIG. 1, FIG. 2 and FIG. 7 indicate the direction of travel of the recording medium. The arrows with the symbol TW in FIG. 3 to FIG. 6 indicate the track width direction.

As shown in FIG. 2 and FIG. 3, the magnetic head for perpendicular magnetic recording (hereinafter simply referred to as the magnetic head) according to the present embodiment includes: a substrate 1 made of a ceramic material such as aluminum oxide-titanium carbide ($Al_2O_3$—TiC) and having a top surface 1a; an insulating layer 2 made of an insulating material such as alumina ($Al_2O_3$) and disposed on the top surface 1a of the substrate 1; a first read shield layer 3 made of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 made of a magnetic material and disposed on the second read shield gap film 6.

An end of the MR element 5 is located in a medium facing surface 80 that faces the recording medium. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head section 8. The magnetic head further includes: a nonmagnetic layer 71 made of a nonmagnetic material and disposed on the second read shield layer 7; a middle shield layer 72 made of a magnetic material and disposed on the nonmagnetic layer 71; a nonmagnetic layer 73 made of a nonmagnetic material and disposed on the middle shield layer 72; and a write head section 9 disposed on the nonmagnetic layer 73. The middle shield layer 72 has the function of shielding the MR element 5 from magnetic fields generated in the write head section 9. The nonmagnetic layers 71 and 73 are made of alumina, for example. The write head section 9 includes a coil, a main pole 15, a first return path section R1, a second return path section R2, and a gap part 17.

The coil produces a magnetic field corresponding to data to be written on the recording medium. The coil includes a first portion 20 and a second portion 10. The first portion 20 and the second portion 10 are both made of a conductive material such as copper. The first portion 20 and the second portion 10 are connected in series or in parallel. The main pole 15 has an end face located in the medium facing surface 80. The main pole 15 allows a magnetic flux corresponding to the magnetic field produced by the coil to pass, and produces a write magnetic field for writing data on the recording medium by means of a perpendicular magnetic recording system. FIG. 1, FIG. 2 and FIG. 7 each show a cross section that intersects the end face of the main pole 15 located in the medium facing surface 80 and that is perpendicular to the medium facing surface 80 and to the top surface 1a of the substrate 1 (the cross section will hereinafter be referred to as the main cross section).

The first and second return path sections R1 and R2 are both made of a magnetic material. Examples of materials that can be used for the first and second return path sections R1 and R2 include CoFeN, CoNiFe, NiFe, and CoFe. The first return path section R1 and the second return path section R2 align along a direction perpendicular to the top surface 1*a* of the substrate 1 with the main pole 15 interposed therebetween. The first return path section R1 is located on the front side in the direction T of travel of the recording medium relative to the main pole 15 and is farther from the top surface 1*a* of the substrate 1 than is the main pole 15. The first return path section R1 is magnetically connected to part of the main pole 15 away from the medium facing surface 80. The second return path section R2 is located on the rear side in the direction T of travel of the recording medium relative to the main pole 15 and lies between the main pole 15 and the top surface 1*a* of the substrate 1. The second return path section R2 is magnetically connected to the part of the main pole 15 away from the medium facing surface 80.

The first return path section R1 includes a first shield 16A and a first coupling portion 40. The first shield 16A is located in the vicinity of the medium facing surface 80. The first coupling portion 40 magnetically couples the first shield 16A to the part of the main pole 15 away from the medium facing surface 80.

The second return path section R2 includes a second shield 16B and a second coupling portion 30. The second shield 16B is located in the vicinity of the medium facing surface 80. The second coupling portion 30 magnetically couples the second shield 16B to the part of the main pole 15 away from the medium facing surface 80.

The write head section 9 further includes two side shields 16C and 16D located on opposite sides of the main pole 15 in the track width direction TW. The two side shields 16C and 16D each magnetically couple the first shield 16A and the second shield 16B to each other. The side shields 16C and 16D are each made of a magnetic material. Examples of materials that can be used for the side shields 16C and 16D include CoFeN, CoNiFe, NiFe, and CoFe.

The second coupling portion 30 includes coupling layers 31, 32, 33, 34, 35 and 36. The coupling layer 31 is located on the nonmagnetic layer 73. The coupling layers 32 and 33 are both located on the coupling layer 31. The coupling layer 32 lies in the vicinity of the medium facing surface 80. The coupling layer 33 is farther from the medium facing surface 80 than is the coupling layer 32. Each of the coupling layers 31 and 32 has an end face that faces toward the medium facing surface 80, the end face being located at a distance from the medium facing surface 80. As shown in FIG. 4, the second portion 10 of the coil is wound approximately three turns around the coupling layer 33.

The magnetic head further includes: an insulating layer 51 made of an insulating material, disposed on the nonmagnetic layer 73 and surrounding the coupling layer 31; an insulating film 52 made of an insulating material and interposed between the second portion 10 and the coupling layers 31 to 33; an insulating layer 53 made of an insulating material and disposed in the space between adjacent turns of the second portion 10; and an insulating layer 54 made of an insulating material and disposed around the second portion 10 and the coupling layer 32. The top surfaces of the second portion 10, the coupling layers 32 and 33, the insulating film 52 and the insulating layers 53 and 54 are even with each other. The insulating layers 51 and 54 and the insulating film 52 are made of alumina, for example. The insulating layer 53 is made of photoresist, for example.

The magnetic head further includes insulating layers 55 and 56 each made of an insulating material. The insulating layer 55 is disposed over the top surfaces of the second portion 10, the insulating film 52 and the insulating layers 53 and 54. The coupling layer 34 is disposed over the coupling layer 32 and the insulating layer 55 and has an end face located in the medium facing surface 80. The coupling layer 35 lies on the coupling layer 33. The coupling layer 36 lies on the coupling layer 35. The insulating layer 56 lies on the insulating layer 55 and surrounds the coupling layers 34 and 35. The top surfaces of the coupling layers 34 and 35 and the insulating layer 56 are even with each other. The insulating layers 55 and 56 are made of alumina, for example.

The second shield 16B is disposed on the coupling layer 34. As shown in FIG. 7, the second shield 16B has: an end face 16Ba located on the rear side in the direction T of travel of the recording medium relative to the end face of the main pole 15; and a second inclined surface 16Bb which is a top surface. The magnetic head further includes a nonmagnetic layer 57 made of a nonmagnetic material. The nonmagnetic layer 57 is disposed on part of the top surface of the coupling layer 34 and the top surface of the insulating layer 56, and surrounds the second shield 16B and the coupling layer 36. The nonmagnetic layer 57 is made of alumina, for example.

The side shields 16C and 16D are disposed on the second shield 16B and in contact with the top surface of the second shield 16B. As shown in FIG. 3, the two side shields 16C and 16D have two end faces 16Ca and 16Da that are located on opposite sides of the end face of the main pole 15 in the track width direction TW.

The main pole 15 has a top surface 15T (see FIG. 7), which is a surface located at an end on the front side in the direction T of travel of the recording medium, and a bottom end 15L (see FIG. 7) opposite to the top surface 15T. The main pole 15 further has first and second side parts (see FIG. 3) that are opposite to each other in the track width direction TW. The side shield 16C has a first sidewall opposed to the first side part of the main pole 15. The side shield 16D has a second sidewall opposed to the second side part of the main pole 15.

The gap part 17 is made of a nonmagnetic material and includes: a first portion 19 interposed between the main pole 15 and the first return path section R1; and a second portion 18 interposed between the main pole 15 and the second return path section R2. The second portion 18 is arranged to extend along the sidewalls of the side shields 16C and 16D, the second inclined surface 16Bb of the second shield 16B and the top surface of the nonmagnetic layer 57. The nonmagnetic material forming the second portion 18 may be an insulating material or a nonmagnetic metal material. Alumina is an example of insulating materials that can be used to form the second portion 18. Ru is an example of nonmagnetic metal materials that can be used to form the second portion 18.

The main pole 15 is disposed over the second shield 16B and the nonmagnetic layer 57 such that the second portion 18 is interposed between the main pole 15 and each of the second inclined surface 16Bb of the second shield 16B and the top surface of the nonmagnetic layer 57. As shown in FIG. 3, the second portion 18 is interposed also between the main pole 15 and each of the side shields 16C and 16D.

The bottom end 15L of the main pole 15 is in contact with the top surface of the coupling layer 36 at a position away from the medium facing surface 80. The main pole 15 is made of a magnetic metal material. Examples of materials that can be used for the main pole 15 include NiFe, CoNiFe, and CoFe. The shape of the main pole 15 will be described in detail later.

The magnetic head further includes a first nonmagnetic layer (not shown) made of a nonmagnetic material and disposed around the main pole 15 and the side shields 16C and 16D. In the present embodiment, the first nonmagnetic layer is made of a nonmagnetic insulating material such as alumina, in particular.

The magnetic head further includes: a nonmagnetic metal layer 58 made of a nonmagnetic metal material and disposed on part of the top surface 15T of the main pole 15 at a position away from the medium facing surface 80; and an insulating layer 59 made of an insulating material and disposed on the top surface of the nonmagnetic metal layer 58. The nonmagnetic metal layer 58 is made of Ru, NiCr, or NiCu, for example. The insulating layer 59 is made of alumina, for example.

The first portion 19 is disposed to cover the main pole 15, the nonmagnetic metal layer 58 and the insulating layer 59. The first portion 19 may be made of a nonmagnetic insulating material such as alumina or a nonmagnetic conductive material such as Ru, NiCu, Ta, W, NiB, or NiP.

The first shield 16A is disposed over the side shields 16C and 16D and the first portion 19. The first return path section R1 further includes an underlying layer 81 interposed between the first shield 16A and each of the side shields 16C and 16D and the first portion 19 and underlying the first shield 16A. The underlying layer 81 may be made of a material the same as or different from that of the first shield 16A. As will be described in detail later, the underlying layer 81 is part of a seed layer that is used for plating to form the first shield 16A.

As shown in FIG. 7, the first shield 16A has: an end face 16Aa located on the front side in the direction T of travel of the recording medium relative to the end face of the main pole 15; a first inclined surface 16Ab which is a bottom surface; a top surface 16Ac farthest from the main pole 15; and a connecting surface 16Ad which connects the end face 16Aa and the top surface 16Ac to each other. The distance from the medium facing surface 80 to an arbitrary point on the connecting surface 16Ad increases with increasing distance from the arbitrary point to the top surface 1a of the substrate 1.

In the medium facing surface 80, part of the end face 16Aa of the first shield 16A is spaced from the end face of the main pole 15 by a predetermined distance created by the thicknesses of the first portion 19 and the underlying layer 81. The thickness of the first portion 19 preferably falls within the range of 5 to 60 nm, and may be 30 to 60 nm, for example. The end face of the main pole 15 has a side that is adjacent to the first portion 19, and the side defines the track width.

The first coupling portion 40 includes a yoke layer 41 and a first, a second, and a third coupling layer 42, 43, and 44. The yoke layer 41 is located away from the medium facing surface 80 and magnetically connected to the part of the main pole 15 away from the medium facing surface 80. The first coupling portion 40 further includes an underlying layer 82 interposed between the main pole 15 and the yoke layer 41 and underlying the yoke layer 41. The underlying layer 82 may be made of a material the same as or different from that of the yoke layer 41. As will be described in detail later, the underlying layer 82 is part of a seed layer that is used for plating to form the yoke layer 41.

The first portion 20 of the coil includes a first layer 21 and a second layer 22. As shown in FIG. 5, the first layer 21 is wound one turn around the yoke layer 41. The magnetic head further includes an insulating film 61 made of an insulating material and interposed between the first layer 21 and each of the first shield 16A, the first portion 19 and the yoke layer 41, and a second nonmagnetic layer (not shown) made of a nonmagnetic material and disposed around the first layer 21, the first shield 16A and the underlying layers 81 and 82. The insulating film 61 is made of alumina, for example. The second nonmagnetic layer is made of an inorganic insulating material, for example. The inorganic insulating material may be alumina or silicon oxide, for example. The top surfaces of the first shield 16A, the first layer 21, the yoke layer 41, the insulating film 61 and the second nonmagnetic layer are even with each other.

The magnetic head further includes an insulating layer 62 made of an insulating material and disposed over the top surfaces of the first layer 21 and the insulating film 61 and part of the top surface of the yoke layer 41. The insulating layer 62 is made of alumina, for example.

The first coupling layer 42 is located farther from the top surface 1a of the substrate 1 than is the first shield 16A, and is magnetically connected to the first shield 16A. The second coupling layer 43 is located farther from the top surface 1a of the substrate 1 than is the yoke layer 41, and is magnetically connected to the yoke layer 41. The first return path section R1 further includes an underlying layer 83 interposed between the first shield 16A and the first coupling layer 42 and underlying the first coupling layer 42. The underlying layer 83 has an end closest to the medium facing surface 80, the end being located at a distance from the medium facing surface 80. The underlying layer 83 may be made of a material the same as or different from the material of the first shield 16A and the first coupling layer 42. As will be described in detail later, the underlying layer 83 is part of a seed layer that is used for plating to form the first coupling layer 42. The underlying layer 83 may be said to be a layer interposed between the first shield 16A and the first coupling portion 40 and underlying the first coupling portion 40. The underlying layer 83 corresponds to the "underlying layer" according to the invention.

The first coupling layer 42 has an end face that faces toward the medium facing surface 80, the end face being located at a distance from the medium facing surface 80. The distance from the medium facing surface 80 to an arbitrary point on the end face of the first coupling layer 42 increases with increasing distance from the arbitrary point to the top surface 1a of the substrate 1.

The first coupling portion 40 further includes an underlying layer 84 interposed between the yoke layer 41 and the second coupling layer 43 and underlying the second coupling layer 43. The underlying layer 84 may be made of a material the same as or different from the material of the yoke layer 41 and the second coupling layer 43. As will be described in detail later, the underlying layer 84 is part of a seed layer that is used for plating to form the second coupling layer 43.

As shown in FIG. 6, the second layer 22 is wound approximately two turns around the second coupling layer 43. The magnetic head further includes an insulating film 63 made of an insulating material and interposed between the second layer 22 and each of the coupling layers 42 and 43 and the insulating layer 62, an insulating layer 64 made of an insulating material and disposed in the space between adjacent turns of the second layer 22, and a not-shown insulating layer disposed around the second layer 22 and the coupling layer 42. The top surfaces of the second layer 22, the coupling layers 42 and 43, the insulating film 63, the insulating layer 64 and the not-shown insulating layer are even with each other. The magnetic head further includes an insulating layer 65 made of an insulating material and disposed over the top surfaces of the second layer 22, the insulating film 63 and the insulating layer 64. The insulating film 63, the insulating layer 65 and the not-shown insulating layer are made of alumina, for example. The insulating layer 64 is made of photoresist, for example.

The third coupling layer 44 is located farther from the top surface 1a of the substrate 1 than are the coupling layers 42 and 43, and magnetically couples the coupling layers 42 and 43 to each other.

The first coupling portion 40 further includes an underlying layer 85 interposed between the third coupling layer 44 and each of the coupling layers 42 and 43 and the insulating layer 65 and underlying the third coupling layer 44. The underlying layer 85 has an end closest to the medium facing surface 80, the end being located at a distance from the medium facing surface 80. The underlying layer 85 may be made of a material the same as or different from the material of the coupling layers 42, 43 and 44. As will be described in detail later, the underlying layer 85 is part of a seed layer that is used for plating to form the third coupling layer 44.

The third coupling layer 44 has an end face that faces toward the medium facing surface 80, the end face being located at a distance from the medium facing surface 80. The distance from the medium facing surface 80 to an arbitrary point on the end face of the third coupling layer 44 increases with increasing distance from the arbitrary point to the top surface 1a of the substrate 1.

The magnetic head further includes a nonmagnetic layer 70 made of a nonmagnetic material and disposed to cover the write head section 9. The nonmagnetic layer 70 is made of, for example, an inorganic insulating material such as alumina.

As has been described, the magnetic head according to the present embodiment includes the medium facing surface 80, the read head section 8, the write head section 9, and the nonmagnetic layer 70. The medium facing surface 80 faces the recording medium. The read head section 8 and the write head section 9 are stacked on the substrate 1. The read head section 8 is located on the rear side in the direction T of travel of the recording medium (i.e., located on the leading side) relative to the write head section 9.

The read head section 8 includes: the MR element 5 serving as the read element; the first read shield layer 3 and the second read shield layer 7 for shielding the MR element 5, with their respective portions near the medium facing surface 80 opposed to each other with the MR element 5 therebetween; the first read shield gap film 4 disposed between the MR element 5 and the first read shield layer 3; and the second read shield gap film 6 disposed between the MR element 5 and the second read shield layer 7.

The write head section 9 includes the coil including the first portion 20 and the second portion 10, the main pole 15, the first and second return path sections R1 and R2, and the gap part 17. The coil, the main pole 15, the first return path section R1, the second return path section R2, the gap part 17 and the nonmagnetic layer 70 are located above the top surface 1a of the substrate 1. The first return path section R1 and the second return path section R2 align along the direction perpendicular to the top surface 1a of the substrate 1 with the main pole 15 interposed therebetween. The gap part 17 includes the first portion 19 and the second portion 18.

The second return path section R2 includes the second shield 16B and the second coupling portion 30. The second return path section R2 is located on the rear side in the direction T of travel of the recording medium relative to the main pole 15 and lies between the main pole 15 and the top surface 1a of the substrate 1. As shown in FIG. 2, the second return path section R2 is magnetically connected to part of the main pole 15 away from the medium facing surface 80 so that a second space S2 is defined by the main pole 15, the gap part 17 (the second portion 18) and the second return path section R2. The second coupling portion 30 includes the coupling layers 31 to 36 and magnetically couples the second shield 16B to the part of the main pole 15 away from the medium facing surface 80.

The first return path section R1 is located on the front side in the direction T of travel of the recording medium relative to the main pole 15 and is farther from the top surface 1a of the substrate 1 than is the main pole 15. As shown in FIG. 2, the first return path section R1 is magnetically connected to part of the main pole 15 away from the medium facing surface 80 so that a first space S1 is defined by the main pole 15, the gap part 17 (the first portion 19) and the first return path section R1.

The first return path section R1 will now be described in more detail with reference to FIG. 1. As shown in FIG. 1, the first return path section R1 has: a front end face R11 located in the medium facing surface 80 at a position on the front side in the direction T of travel of the recording medium relative to the end face of the main pole 15; and an inclined surface R12 located on the front side in the direction T of travel of the recording medium relative to the front end face R11. In the present embodiment, the inclined surface R12 is planar, in particular. The inclined surface R12 has a first edge R12a connected to the front end face R11, and a second edge R12b that is located farther from the top surface 1a of the substrate 1 than is the first space S1. Part of the inclined surface R12 lies between the first space S1 and the medium facing surface 80. The distance from the medium facing surface 80 to an arbitrary point on the inclined surface R12 increases with increasing distance from the arbitrary point to the top surface 1a of the substrate 1. The nonmagnetic layer 70 includes an interposer 70A interposed between the inclined surface R12 and the medium facing surface 80.

Here, as shown in FIG. 1, the angle formed between the front end face R11 and the inclined surface R12 will be represented by the symbol $\theta_R$. The angle $\theta_R$ is greater than 90°. The angle $\theta_R$ is preferably in the range of 160° to 175°.

The first return path section R1 includes the underlying layer 81, the first shield 16A, the underlying layer 83 and the first coupling portion 40. As previously mentioned, the first shield 16A has the end face 16Aa, the top surface 16Ac and the connecting surface 16Ad. The end face 16Aa also serves as the front end face R11. The first coupling portion 40 has a shield facing surface 40a facing the top surface 16Ac of the first shield 16A with the underlying layer 83 interposed therebetween.

The first coupling portion 40 includes the yoke layer 41, the first to third coupling layers 42, 43 and 44, and the underlying layers 82, 84 and 85. The yoke layer 41 is located away from the medium facing surface 80 and magnetically connected to the part of the main pole 15 away from the medium facing surface 80. The first coupling layer 42 includes the shield facing surface 40a, which is the bottom surface, and is magnetically connected to the first shield 16A. The second coupling layer 43 is located farther from the top surface 1a of the substrate 1 than is the yoke layer 41, and is magnetically connected to the yoke layer 41. The third coupling layer 44 is located farther from the top surface 1a of the substrate 1 than are the first and second coupling layers 42 and 43, and magnetically couples the first and second coupling layers 42 and 43 to each other.

The underlying layer 83 is interposed between the first shield 16A and the first coupling portion 40 (the first coupling layer 42). The underlying layer 85 is interposed between the third coupling layer 44 and the first and second coupling layers 42 and 43. The inclined surface R12 is formed over the first shield 16A, the underlying layer 83 and the first coupling portion 40 (the coupling layers 42 and 44 and the underlying layer 85). The connecting surface 16Ad of the first shield 16A, the respective end faces of the coupling layers 42 and 44 and the respective ends of the underlying layers 83 and 85 each constitute part of the inclined surface R12. The first edge R12a of the inclined surface R12 is present on the first shield 16A.

The first portion 20 and the second portion 10 of the coil will now be described in detail with reference to FIG. 4 to FIG. 6. FIG. 4 is a plan view showing the second portion 10. As previously mentioned, the second portion 10 is wound approximately three turns around the coupling layer 33 which constitutes part of the second return path section R2. The second portion 10 includes three coil elements 10A, 10B and 10C extending to pass between the coupling layer 32 and the coupling layer 33, in particular, within the second space S2. Note that the coil elements refer to part of the coil winding. The coil elements 10A, 10B and 10C align in this order in the direction perpendicular to the medium facing surface 80, the coil element 10A being closest to the medium facing surface 80. The second portion 10 has a coil connection part 10E electrically connected to the first portion 20.

FIG. 5 is a plan view showing the first layer 21 of the first portion 20. As previously mentioned, the first layer 21 is wound one turn around the yoke layer 41 which constitutes part of the first return path section R1. The first layer 21 includes a coil element 21A extending to pass between the first shield 16A and the yoke layer 41, in particular, within the first space S1. The first layer 21 has a coil connection part 21S electrically connected to the coil connection part 10E of the second portion 10, and a coil connection part 21E electrically connected to the second layer 22. The coil connection part 21S is electrically connected to the coil connection part 10E via first to third connection layers of columnar shape (not shown) that penetrate a plurality of layers interposed between the first layer 21 and the second portion 10. The first to third connection layers are stacked in order on the coil connection part 10E. The coil connection part 21S lies on the third connection layer. The first to third connection layers are each made of a conductive material such as copper.

FIG. 6 is a plan view showing the second layer 22 of the first portion 20. As previously mentioned, the second layer 22 is wound approximately two turns around the second coupling layer 43 which constitutes part of the first return path section R1. The second layer 22 includes two coil elements 22A and 22B extending to pass between the first coupling layer 42 and the second coupling layer 43, in particular, within the first space S1. The coil elements 22A and 22B align in this order in the direction perpendicular to the medium facing surface 80, the coil element 22A being closer to the medium facing surface 80. The second layer 22 has a coil connection part 22S penetrating the insulating layer 62 and the insulating film 63 and electrically connected to the coil connection part 21E of the first layer 21. In the example shown in FIG. 4 to FIG. 6, the first portion 20 and the second portion 10 are connected in series.

The coil elements 21A, 22A and 22B extend to pass through the first space S1. Hereinafter, the coil elements extending to pass through the first space S1 will also be referred to as the first coil elements, and the coil elements extending to pass through the second space S2 will also be referred to as the second coil elements.

The shape of the main pole 15 will now be described in detail with reference to FIG. 4 to FIG. 7. As shown in FIG. 4 to FIG. 6, the main pole 15 includes a track width defining portion 15A and a wide portion 15B. The track width defining portion 15A has an end face located in the medium facing surface 80, and an end opposite to the end face. The wide portion 15B is connected to the end of the track width defining portion 15A. As shown in FIG. 7, the main pole 15 has: the top surface 15T which is the surface located at the end on the front side in the direction T of travel of the recording medium; the bottom end 15L opposite to the top surface 15T; the first side part; and the second side part. The width of the top surface 15T in the track width direction TW is greater in the wide portion 15B than in the track width defining portion 15A.

In the track width defining portion 15A, the width of the top surface 15T in the track width direction TW is generally constant regardless of the distance from the medium facing surface 80. In the wide portion 15B, the width of the top surface 15T in the track width direction TW is, for example, equal to that in the track width defining portion 15A when seen at the boundary between the track width defining portion 15A and the wide portion 15B, and gradually increases with increasing distance from the medium facing surface 80, then becoming constant. Here, the length of the track width defining portion 15A in the direction perpendicular to the medium facing surface 80 will be referred to as the neck height. The neck height falls within the range of 0 to 0.3 µm, for example. A zero neck height means that no track width defining portion 15A exists and an end face of the wide portion 15B is thus located in the medium facing surface 80.

The top surface 15T includes a first portion 15T1, a second portion 15T2, a third portion 15T3, and a fourth portion 15T4 contiguously arranged in this order, the first portion 15T1 being closest to the medium facing surface 80. The first portion 15T1 has a first end located in the medium facing surface 80 and a second end opposite to the first end. The second portion 15T2 is connected to the second end of the first portion 15T1. The third portion 15T3 has a third end connected to the second portion 15T2 and a fourth end that is located farther from the medium facing surface 80 than is the third end. The fourth portion 15T4 is connected to the fourth end of the third portion 15T3.

The bottom end 15L includes a first portion 15L1, a second portion 15L2, a third portion 15L3, and a fourth portion 15L4 contiguously arranged in this order, the first portion 15L1 being closest to the medium facing surface 80. The first portion 15L1 has a first end located in the medium facing surface 80 and a second end opposite to the first end. The second portion 15L2 is connected to the second end of the first portion 15L1. The third portion 15L3 has a third end connected to the second portion 15L2 and a fourth end that is located farther from the medium facing surface 80 than is the third end. Each of the first to third portions 15L1 to 15L3 may be an edge formed by two intersecting planes, or may be a plane connecting two planes to each other. The fourth portion 15L4 is a plane connected to the fourth end of the third portion 15L3.

Here, as shown in FIG. 7, assume a first virtual plane P1 and a second virtual plane P2. The first virtual plane P1 passes through the first end of the first portion 15T1 of the top surface 15T and is perpendicular to the medium facing surface 80 and to the direction T of travel of the recording medium. The second virtual plane P2 passes through the first end of the first portion 15L1 of the bottom end 15L and is perpendicular to the medium facing surface 80 and to the direction T of travel of the recording medium. The second and fourth portions 15T2 and 15T4 of the top surface 15T are substantially parallel to the first and second virtual planes P1 and P2. The first portion 15T1 is inclined relative to the first and second virtual planes P1 and P2 and the medium facing surface 80 such that the second end of the first portion 15T1 is located on the front side in the direction T of travel of the recording medium relative to the first end of the first portion 15T1. The third portion 15T3 is inclined relative to the first and second virtual planes P1 and P2 and the medium facing surface 80 such that the fourth end of the third portion 15T3 is located on the front side in the direction T of travel of the recording medium relative to the third end of the third portion 15T3.

The second and fourth portions 15L2 and 15L4 of the bottom end 15L are substantially parallel to the first and second virtual planes P1 and P2. The first portion 15L1 is inclined relative to the first and second virtual planes P1 and P2 and the medium facing surface 80 such that the second end of the first portion 15L1 is located on the rear side in the direction T of travel of the recording medium relative to the first end of the first portion 15L1. The third portion 15L3 is inclined relative to the first and second virtual planes P1 and P2 and the medium facing surface 80 such that the fourth end of the third portion 15L3 is located on the rear side in the direction T of travel of the recording medium relative to the third end of the third portion 15L3.

The first shield 16A of the first return path section R1 includes a portion interposed between the third portion 15T3 of the top surface 15T and the medium facing surface 80. As previously mentioned, the first shield 16A has the first inclined surface 16Ab which is the bottom surface. The first inclined surface 16Ab includes a portion that is opposed to the first portion 15T1 of the top surface 15T with the first portion 19 of the gap part 17 interposed therebetween. The first inclined surface 16Ab is inclined relative to the first and second virtual planes P1 and P2 and the medium facing surface 80.

The second shield 16B of the second return path section R2 includes a portion interposed between the third portion 15L3 of the bottom end 15L and the medium facing surface 80. As previously mentioned, the second shield 16B has the second inclined surface 16Bb which is the top surface. The second inclined surface 16Bb includes an upper part 16Bb1 and a lower part 16Bb2 contiguous with each other. The upper part 16Bb1 and the lower part 16Bb2 are each inclined relative to the first and second virtual planes P1 and P2 and the medium facing surface 80. The angle of inclination of the lower part 16Bb2 relative to the direction perpendicular to the medium facing surface 80 is greater than the angle of inclination of the upper part 16Bb1 relative to the direction perpendicular to the medium facing surface 80.

Here, as shown in FIG. 7, the lengths of the first portion 15T1 and the second portion 15T2 of the top surface 15T in the direction perpendicular to the medium facing surface 80 will be represented by the symbols $L_{A1}$ and $L_{A2}$, respectively; the lengths of the first portion 15L1 and the second portion 15L2 of the bottom end 15L in the direction perpendicular to the medium facing surface 80 will be represented by the symbols $L_{B1}$ and $L_{B2}$, respectively; and the length of the first inclined surface 16Ab in the direction perpendicular to the medium facing surface 80 will be represented by the symbol $L_C$. The length $L_{A1}$ falls within the range of 0.05 to 0.15 μm, for example. The length $L_{A2}$ falls within the range of 0.2 to 0.6 μm, for example. The length $L_{B1}$ falls within the range of 0.1 to 0.5 μm, for example. The length $L_{B2}$ falls within the range of 0.2 to 0.6 μm, for example. The length $L_C$ falls within the range of 0.2 to 0.6 μm, for example. Note that the neck height can be set to any value independently of the aforementioned lengths $L_{A1}$, $L_{A2}$, $L_{B1}$, $L_{B2}$, and $L_C$.

The angle of inclination of the first portion 15T1 of the top surface 15T relative to the first virtual plane P1 will be represented by the symbol $\theta_{T1}$, and the angle of inclination of the first portion 15L1 of the bottom end 15L relative to the second virtual plane P2 will be represented by the symbol $\theta_{L1}$. The angle of inclination $\theta_{T1}$ falls within the range of 24° to 35°, for example. The angle of inclination $\theta_{L1}$ falls within the range of 30° to 50°, for example.

Assume also a virtual plane P3 and a virtual plane P4. The virtual plane P3 passes through the third end of the third portion 15T3 of the top surface 15T and is parallel to the first and second virtual planes P1 and P2. The virtual plane P4 passes through the third end of the third portion 15L3 of the bottom end 15L and is parallel to the first and second virtual planes P1 and P2. The angle of inclination of the third portion 15T3 relative to the virtual plane P3 will be represented by the symbol $\theta_{T3}$. The angle of inclination of the third portion 15L3 relative to the virtual plane P4 will be represented by the symbol $\theta_{L3}$. The angles of inclination $\theta_{T3}$ and $\theta_{L3}$ both fall within the range of 22° to 60°, for example.

The thickness of the main pole 15 in the medium facing surface 80, i.e., the distance between the first virtual plane P1 and the second virtual plane P2; will be represented by the symbol D0. The distance between the second portion 15T2 of the top surface 15T and the first virtual plane P1 will be represented by the symbol D1. The distance between the second portion 15L2 of the bottom end 15L and the second virtual plane P2 will be represented by the symbol D2. The distance D0 falls within the range of 0.05 to 0.1 μm, for example. The distance D1 falls within the range of 0.02 to 0.1 μm, for example. The distance D2 falls within the range of 0.1 to 0.5 μm, for example.

The distance between the fourth portion 15T4 of the top surface 15T and the virtual plane P3 will be represented by the symbol D3. The distance between the fourth portion 15L4 of the bottom end 15L and the virtual plane P4 will be represented by the symbol D4. The distance D3 falls within the range of 0.05 to 0.3 for example. The distance D4 falls within the range of 0.1 to 0.5 μm, for example.

The end face of the main pole 15 located in the medium facing surface 80 has a first side adjacent to the first portion 19, a second side connected to one end of the first side, and a third side connected to the other end of the first side. The first side defines the track width. The position of an end of a record bit to be recorded on the recording medium depends on the position of the first side. The end face of the main pole 15 located in the medium facing surface 80 decreases in width in the track width direction TW with increasing distance from the first side, that is, with increasing distance from the first virtual plane P1. Each of the second side and the third side forms an angle of, for example, 7° to 17°, or preferably 10° to 15°, relative to a direction perpendicular to the first virtual plane P1. The first side has a length in the range of 0.05 to 0.20 μm, for example.

The function and effects of the magnetic head according to the present embodiment will now be described. The magnetic head writes data on the recording medium by using the write head section 9 and reads data stored on the recording medium by using the read head section 8. In the write head section 9, the coil including the first portion 20 and the second portion 10 produces magnetic fields corresponding to data to be written on the recording medium. A magnetic flux corresponding to the magnetic field produced by the first portion 20 passes through the first return path section R1 and the main pole 15. A magnetic flux corresponding to the magnetic field produced by the second portion 10 passes through the second return path section R2 and the main pole 15. Consequently, the main pole 15 allows the magnetic flux corresponding to the magnetic field produced by the first portion 20 and the magnetic flux corresponding to the magnetic field produced by the second portion 10 to pass.

The first portion 20 and the second portion 10 may be connected in series or in parallel. In either case, the first portion 20 and the second portion 10 are connected such that the magnetic flux corresponding to the magnetic field produced by the first portion 20 and the magnetic flux corresponding to the magnetic field produced by the second portion 10 flow in the same direction through the main pole 15.

The main pole 15 allows the magnetic fluxes corresponding to the magnetic fields produced by the coil to pass as mentioned above, and produces a write magnetic field for writing data on the recording medium by means of the perpendicular magnetic recording system.

The shields 16A, 16B, 16C and 16D capture a disturbance magnetic field applied to the magnetic head from the outside thereof. This makes it possible to prevent erroneous writing on the recording medium induced by the disturbance magnetic field intensively captured into the main pole 15. The shields 16A, 16B, 16C and 16D also have the function of capturing a magnetic flux produced from the end face of the main pole 15 and spreading in directions other than the direction perpendicular to the plane of the recording medium, so as to prevent the magnetic flux from reaching the recording medium.

Furthermore, the shields 16A, 16B, 16C and 16D and the first and second coupling portions 40 and 30 have the function of allowing a magnetic flux that has been produced from the end face of the main pole 15 and has magnetized the recording medium to flow back. More specifically, a part of the magnetic flux that has been produced from the end face of the main pole 15 and has magnetized the recording medium flows back to the main pole 15 through the first shield 16A and the first coupling portion 40. Another part of the magnetic flux that has been produced from the end face of the main pole 15 and has magnetized the recording medium flows back to the main pole 15 through the second shield 16B and the second coupling portion 30.

The end faces 16Aa, 16Ba, 16Ca and 16Da of the shields 16A, 16B, 16C and 16D are arranged to wrap around the end face of the main pole 15 in the medium facing surface 80. According to the present embodiment, it is therefore possible that in regions on both the rear side and the front side in the direction T of travel of the recording medium relative to the end face of the main pole 15 and regions on opposite sides of the end face of the main pole 15 in the track width direction TW, a magnetic flux that is produced from the end face of the main pole 15 and spreads in directions other than the direction perpendicular to the plane of the recording medium can be captured and thereby prevented from reaching the recording medium. Consequently, the present embodiment makes it possible to prevent adjacent track erasure induced by a skew. The first and second shields 16A and 16B contribute not only to the prevention of adjacent track erasure induced by a skew but also to an increase in the gradient of the write magnetic field. The side shields 16C and 16D greatly contribute to the prevention of adjacent track erasure, in particular. According to the present embodiment, such functions of the shields 16A, 16B, 16C and 16D serve to increase the recording density.

Furthermore, as shown in FIG. 3, the present embodiment is configured so that in the medium facing surface 80, the distance between the first and second side parts of the main pole 15 in the track width direction TW, i.e., the width of the end face of the main pole 15, decreases with increasing distance from the first virtual plane P1. According to the present embodiment, this feature also serves to prevent adjacent track erasure induced by a skew.

The present embodiment is also configured so that in the medium facing surface 80, the distance between the first and second sidewalls of the side shields 16C and 16D in the track width direction TW decreases with increasing distance from the first virtual plane P1, as does the distance between the first and second side parts of the main pole 15. The present embodiment thus allows both the distance between the first side part and the first sidewall and the distance between the second side part and the second sidewall to be small and constant in the medium facing surface 80. This configuration allows the side shields 16C and 16D to efficiently capture the magnetic flux that is produced from the end face of the main pole 15 and spreads out to opposite areas in the track width direction TW. Consequently, according to the present embodiment, it is possible to enhance the function of the side shields 16C and 16D in particular, and to thereby enable more effective prevention of adjacent track erasure induced by a skew.

The shields 16A to 16D cannot capture much magnetic flux if they are not magnetically connected with any magnetic layer having a sufficiently large volume enough to accommodate the magnetic flux captured by the shields 16A to 16D. In the present embodiment, there are provided the first coupling portion 40 which magnetically couples the first shield 16A and the main pole 15 to each other, and the second coupling portion 30 which magnetically couples the second shield 16B and the main pole 15 to each other. Such a configuration allows the magnetic flux captured by the shields 16A to 16D to flow into the main pole 15 by way of the first coupling portion 40 and the second coupling portion 30. In the present embodiment, the first and second coupling portions 40 and 30 and the main pole 15, which are magnetic layers large in volume, are magnetically connected to the shields 16A to 16D. This allows the shields 16A to 16D to capture much magnetic flux, so that the above-described effect of the shields 16A to 16D can be exerted effectively.

In the present embodiment, the first return path section R1 has the front end face R11, and the inclined surface R12 that is located on the front side in the direction T of travel of the recording medium relative to the front end face R11. This serves to reduce the exposure area of the first return path section R1 in the medium facing surface 80, thereby making it possible that a magnetic flux captured into the first return path section R1 from the front end face R11 (the end face 16Aa of the first shield 16A) is prevented from leaking toward the recording medium from another portion of the first return path section R1.

Furthermore, in the present embodiment, the angle $\theta_R$ formed between the front end face R11 and the inclined surface R12 is greater than 90°. The effects resulting from this will now be described. If the first return path section R1 has an edge with an angle of 90° or less in the vicinity of the medium facing surface 80, magnetic field leakage from the inside to the outside of the first return path section R1 tends to occur in the vicinity of this edge. As a result, adjacent track erasure may occur. In contrast to this, in the present embodiment, since the aforementioned angle $\theta_R$ is greater than 90°, the first return path section R1 does not have an edge with an angle of 90° or less in the vicinity of the medium facing surface 80. According to the present embodiment, it is thus possible to prevent the occurrence of adjacent track erasure induced by an edge with an angle of 90° or less.

Furthermore, in the present embodiment, the interposer 70A of the nonmagnetic layer 70 which is harder than the first return path section R1 is interposed between the inclined surface R12 and the medium facing surface 80. The interposer 70A has the function of suppressing a change in the position of the first return path section R1 induced by heat generated by the first portion 20. According to the present embodiment, it is therefore possible to prevent degradation in the read and write characteristics that may result from a protrusion of part of the first return path section R1 due to the heat generated by the first portion 20.

In the present embodiment, the underlying layer 83 has an end closest to: the medium facing surface 80. This end constitutes part of the inclined surface R12, and is therefore located at a distance from the medium facing surface 80. The effects resulting from this configuration will now be described.

If the underlying layer 83 is made of a material different from the material of the first shield 16A and the first coupling layer 42, the underlying layer 83 should have features different from those of the first shield 16A and the first coupling layer 42. Even if the same material is employed for the underlying layer 83 as that for the first shield 16A and the first coupling layer 42, forming the underlying layer 83 by a method different from that for forming the first shield 16A and the first coupling layer 42 should make the underlying layer 83 differ from the first shield 16A and the first coupling layer 42 in film quality, crystal grain size, crystal structure, and the like. A case will now be contemplated where the underlying layer 83 having features different from those of the first shield 16A and the first coupling layer 42 is interposed between the first shield 16A and the first coupling layer 42, and the end of the underlying layer 83 is exposed in the medium facing surface 80. In this case, magnetic field leakage from the inside to the outside of the first return path section R1 tends to occur in the vicinity of the boundary between the first shield 16A and the underlying layer 83 which is present in the medium facing surface 80 and in the vicinity of the boundary between the underlying layer 83 and the first coupling layer 42 which is present in the medium facing surface 80. This may result in the occurrence of adjacent track erasure.

In contrast to this, in the present embodiment, since the end of the underlying layer 83 constitutes part of the inclined surface R12 and is located at a distance from the medium facing surface 80, neither of the boundary between the first shield 16A and the underlying layer 83 and the boundary between the underlying layer 83 and the first coupling layer 42 is present in the medium facing surface 80. This makes it possible to prevent the occurrence of adjacent track erasure induced by magnetic field leakage from these boundaries.

The features of the shape of the main pole 15 and the effects resulting therefrom will now be described. In the present embodiment, the top surface 15T of the main pole 15 includes the first and third portions 15T1 and 15T3 inclined relative to the first and second virtual planes P1 and P2 and the medium facing surface 80, while the bottom end 15L of the main pole 15 includes the first and third portions 15L1 and 15L3 inclined relative to the first and second virtual planes P1 and P2 and the medium facing surface 80. This allows the main pole 15 to have a small thickness in the medium facing surface 80, thereby allowing the prevention of adjacent track erasure induced by a skew. On the other hand, since a portion of the main pole 15 away from the medium facing surface 80 can have a large thickness, it is possible for the main pole 15 to direct much magnetic flux to the medium facing surface 80, and this allows the improvement of write characteristics such as the overwrite property.

Furthermore, in the present embodiment, the top surface 15T of the main pole 15 includes the second portion 15LT. This allows the distance between the third portion 15T3 and the first shield 16A to be greater than that in the case without the second portion 15T2. Likewise, the bottom end 15L of the main pole 15 includes the second portion 15L2. This allows the distance between the third portion 15L3 and the second shield 16B to be greater than that in the case without the second portion 15L2. The present embodiment thus makes it possible to prevent degradation in the write characteristics induced by magnetic flux leakage from the main pole 15 to the first and second return path sections R1 and R2.

According to the present embodiment, the above-described features of the shape of the main pole 15 make it possible to prevent the skew-induced problems and provide improved write characteristics.

A method of manufacturing the magnetic head according to the present embodiment will now be described with reference to FIG. 8A through FIG. 22B. FIG. 8A through FIG. 22B each show a stack of layers formed in the process of manufacturing the magnetic head. FIG. 8A to FIG. 22A each show a cross section perpendicular to the medium facing surface 80 and to the top surface 1a of the substrate 1, or the main cross section, in particular. FIG. 8B to FIG. 22B each show a cross section taken at the position at which the medium facing surface 80 is to be formed. The symbol "ABS" in FIG. 8A to FIG. 22A indicates the position at which the medium facing surface 80 is to be formed.

Figure 8A:
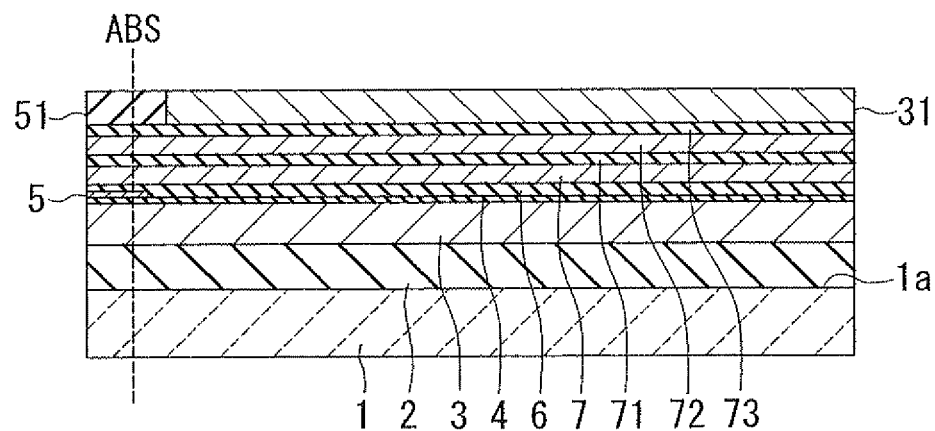
FIG. 8A and FIG. 8B are cross-sectional views showing a step of a method of manufacturing the magnetic head according to the first embodiment of the invention.
Figure 8B:
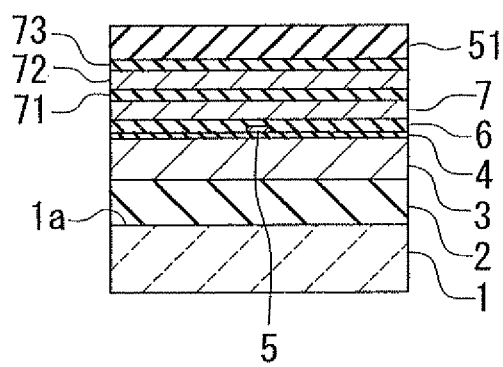

In the method of manufacturing the magnetic head according to the present embodiment, first, as shown in FIG. 8A and FIG. 8B, the insulating layer 2, the first read shield layer 3 and the first read shield gap film 4 are formed in this order on the substrate 1. Next, the MR element 5 and not-shown leads connected to the MR element 5 are formed on the first read shield gap film 4. The MR element 5 and the leads are then covered with the second read shield gap film 6. Then, the second read shield layer 7, the nonmagnetic layer 71, the middle shield layer 72 and the nonmagnetic layer 73 are formed in this order on the second read shield gap film 6.

Then, the coupling layer 31 is formed on the nonmagnetic layer 73 by frame plating, for example. Next, the insulating layer 51 is formed over the entire top surface of the stack. The insulating layer 51 is then polished by, for example, chemical mechanical polishing (hereinafter referred to as CMP), until the coupling layer 31 is exposed. The top surfaces of the coupling layer 31 and the insulating layer 51 are thereby made even with each other.

Figure 9A:
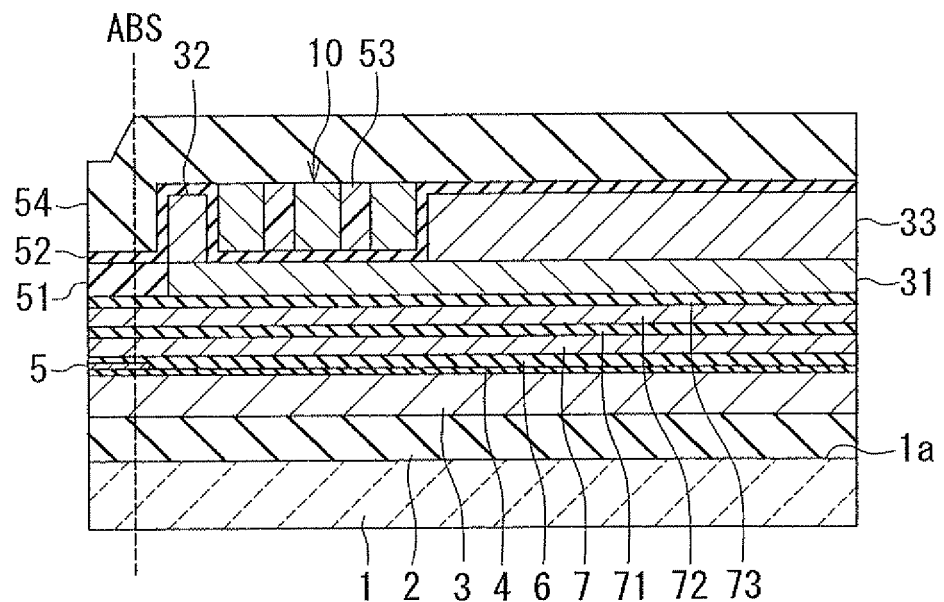
FIG. 9A and FIG. 9B are cross-sectional views showing a step that follows the step shown in FIG. 8A and FIG. 8B.
Figure 9B:
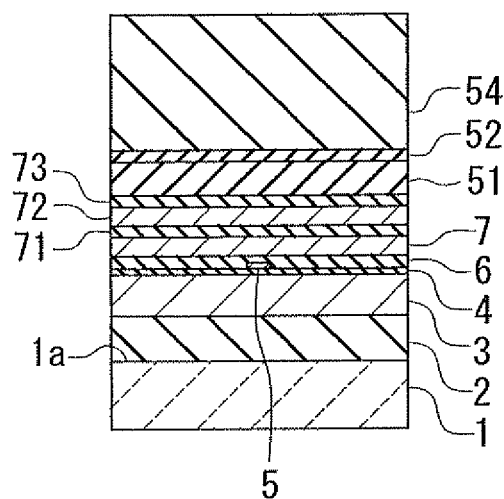

FIG. 9A and FIG. 9B show the next step. In this step, first, the coupling layers 32 and 33 are formed on the coupling layer 31 by frame plating, for example. The insulating film 52 is then formed over the entire top surface of the stack. Where alumina is selected as the material of the insulating film 52, the insulating film 52 is formed by atomic layer deposition (hereinafter referred to as ALD), for example. Next, the second portion 10 of the coil is formed by frame plating, for example. The insulating layer 53 is then formed in the space between adjacent turns of the second portion 10. The second portion 10 and the insulating layer 53 are formed such that their top surfaces are higher in level than the top surfaces of the coupling layers 32 and 33. Then, the insulating layer 54 is formed over the entire top surface of the stack.

Figure 10A:
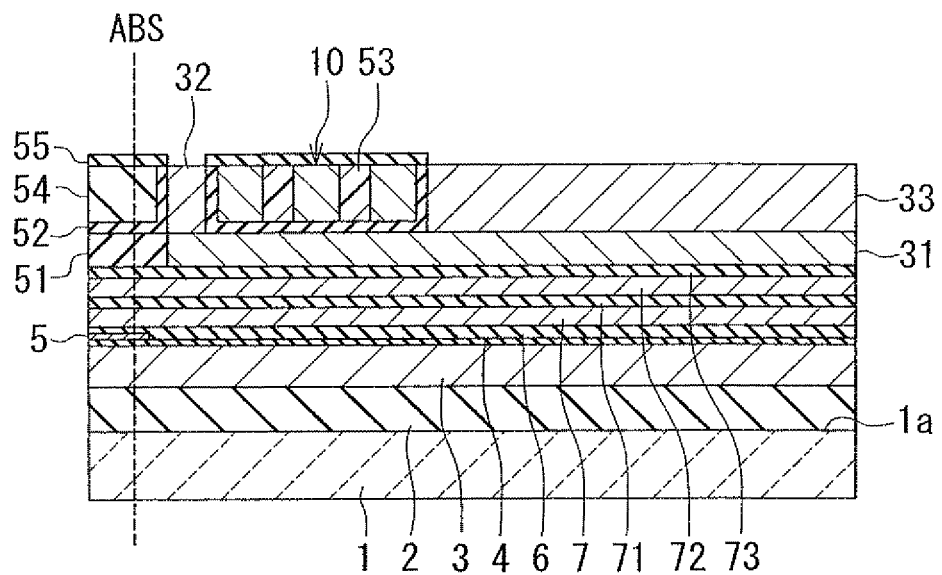
FIG. 10A and FIG. 10B are cross-sectional views showing a step that follows the step shown in FIG. 9A and FIG. 9B.
Figure 10B:
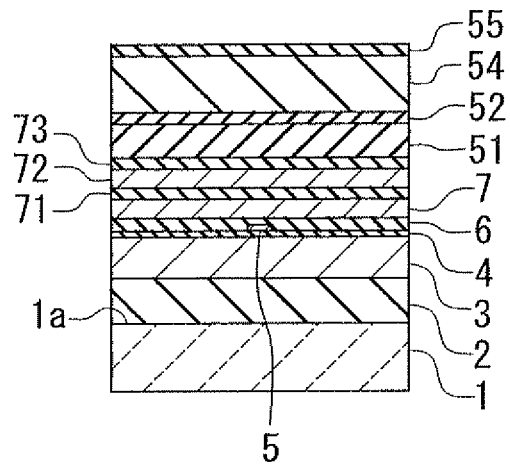

FIG. 10A and FIG. 10B show the next step. In this step, first, the second portion 10, the insulating film 52 and the insulating layers 53 and 54 are polished by, for example, CMP, until the coupling layers 32 and 33 are exposed. Next, the insulating layer 55 is formed over the entire top surface of the stack. The insulating layer 55 is then selectively etched by, for example, ion beam etching (hereinafter referred to as IBE), so that the top surfaces of the coupling layers 32 and 33 and the coil connection part 10E (see FIG. 4) of the second portion 10 are exposed.

Figure 11A:
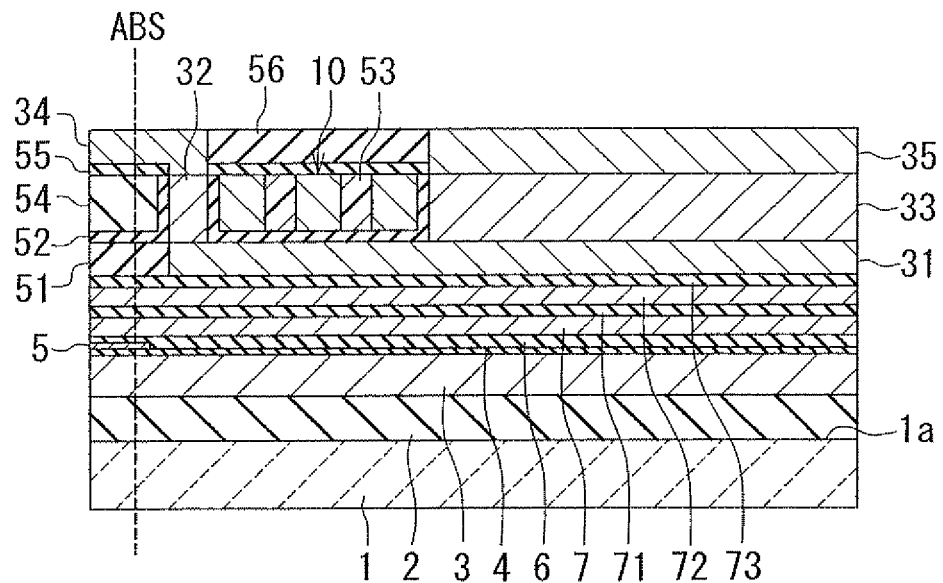
FIG. 11A and FIG. 11B are cross-sectional views showing a step that follows the step shown in FIG. 10A and FIG. 10B.
Figure 11B:
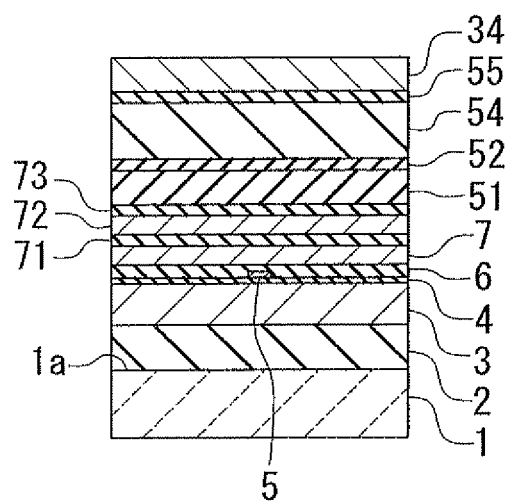

FIG. 11A and FIG. 11B show the next step. In this step, first, the coupling layer 34 is formed over the coupling layer 32 and the insulating layer 55, the coupling layer 35 is formed on the coupling layer 33, and the not-shown first connection layer is formed on the coil connection part 10E of the second portion 10, by employing frame plating, for example. Next, the insulating layer 56 is formed over the entire top surface of the stack. The insulating layer 56 is then polished by, for example, CMP, until the coupling layers 34 and 35 and the first connection layer are exposed.

Figure 12A:
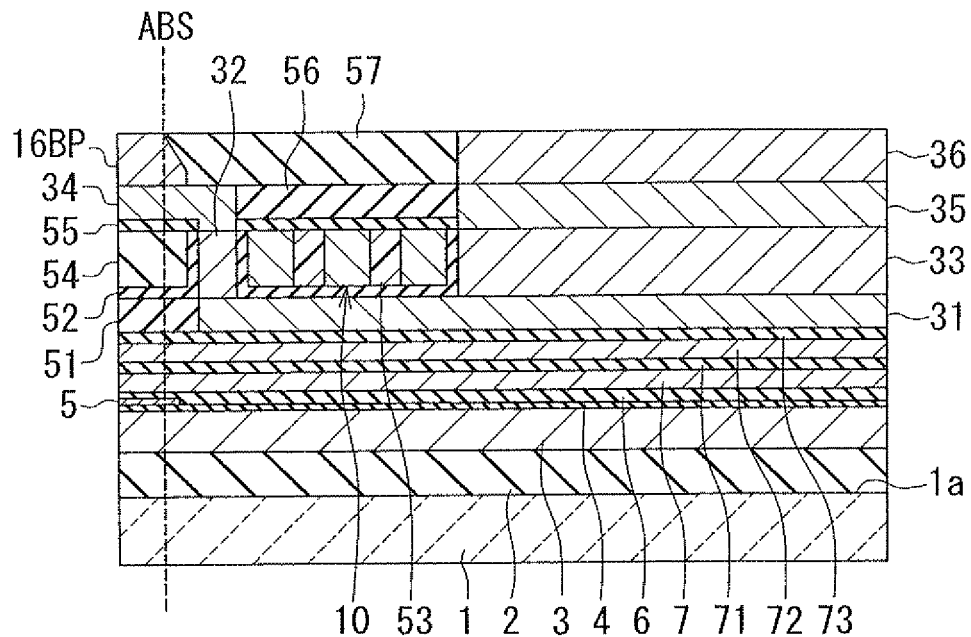
FIG. 12A and FIG. 12B are cross-sectional views showing a step that follows the step shown in FIG. 11A and FIG. 11B.
Figure 12B:
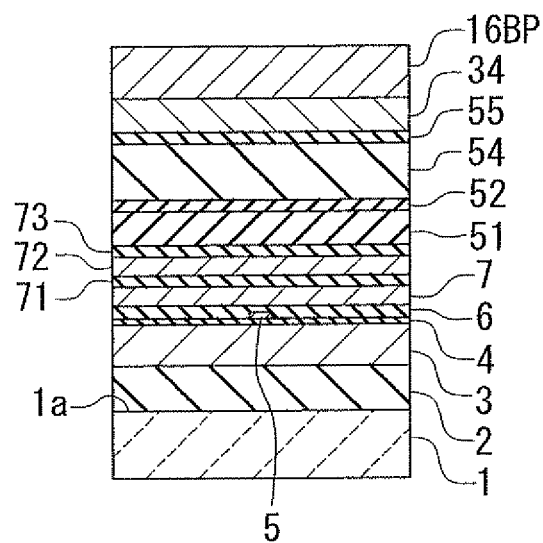

FIG. 12A and FIG. 12B show the next step. In this step, first, a second preliminary shield 16BP, which is to become the second shield 16B later, is formed on the coupling layer 34, the coupling layer 36 is formed on the coupling layer 35, and the not-shown second connection layer is formed on the first connection layer, by employing frame plating, for example. The second preliminary shield 16BP is then partially etched by, for example, IBE, so that the second preliminary shield 16BP is provided with a preliminary inclined surface which includes a portion to become the lower part 16Bb2 of the second inclined surface 16Bb. Next, the nonmagnetic layer 57 is formed over the entire top surface of the stack. The nonmagnetic layer 57 is then polished by, for example, CMP, until the second preliminary shield 16BP, the coupling layer 36 and the second connection layer are exposed.

Figure 13A:
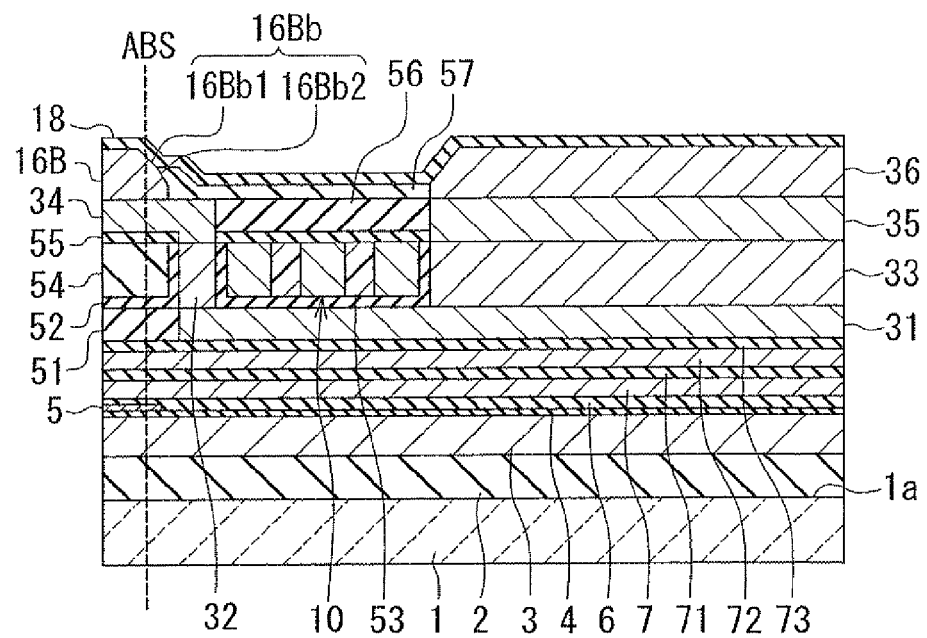
FIG. 13A and FIG. 13B are cross-sectional views showing a step that follows the step shown in FIG. 12A and FIG. 12B.
Figure 13B:
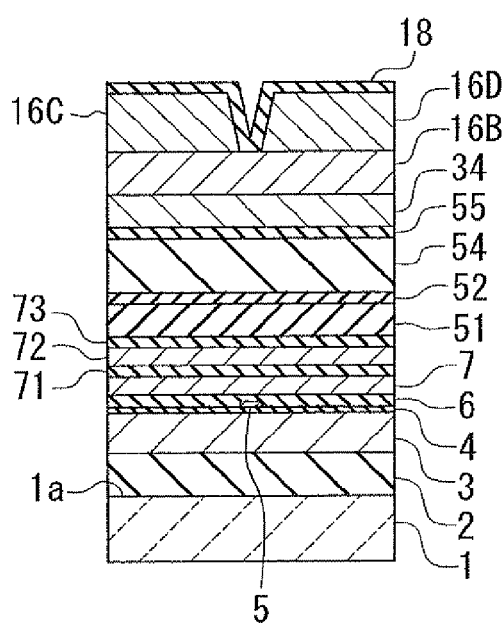

FIG. 13A and FIG. 13B show the next step. In this step, first, the nonmagnetic layer 57 is partially etched by, for example, reactive ion etching (hereinafter referred to as RIE) so as to expose an area of the preliminary inclined surface of the second preliminary shield 16BP where the upper part 16Bb1 of the second inclined surface 16Bb is to be formed later. Next, a portion of the preliminary inclined surface of the second preliminary shield 16BP and a portion of the coupling layer 36 are etched by, for example, IBE, so as to provide the second preliminary shield 16BP with the upper part 16Bb1 of the second inclined surface 16Bb and to chamfer corners at the edge of the top surface of the coupling layer 36. The rest of the preliminary inclined surface remaining after this etching makes the lower part 16Bb2 of the second inclined surface 16Bb. The second preliminary shield 16BP thereby becomes the second shield 16B.

Next, a not-shown photoresist mask is formed over the second shield 16B, the coupling layer 36 and the second connection layer. This photoresist mask is formed by patterning a photoresist layer. Note that any photoresist mask to be employed in any subsequent step is formed in the same manner as this photoresist mask. Using this photoresist mask as an etching mask, the nonmagnetic layer 57 is then taper-etched by RIE or IBE, for example. This determines the shape of the bottom end 15L of the main pole 15. The photoresist mask is then removed.

Next, the side shields 16C and 16D are formed on the second shield 16B by frame plating, for example. The second portion 18 is then formed to cover the second shield 16B and the side shields 16C and 16D. Where alumina is selected as the material of the second portion 18, the second portion 18 is formed by ALD, for example. Where Ru is selected as the material of the second portion 18, the second portion 18 is formed by chemical vapor deposition, for example.

Figure 14A:
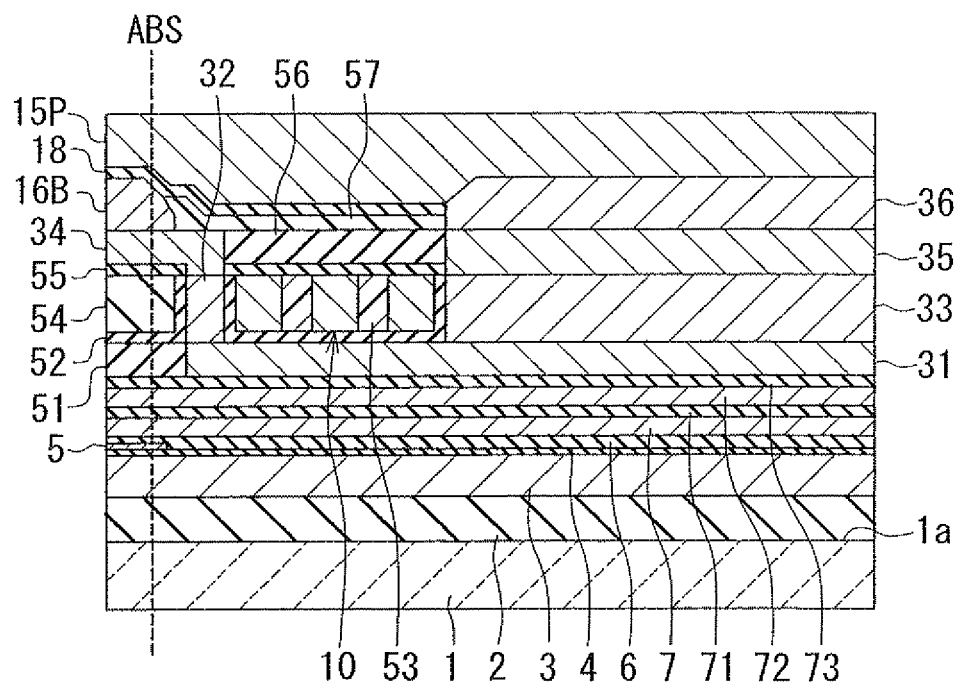
FIG. 14A and FIG. 14B are cross-sectional views showing a step that follows the step shown in FIG. 13A and FIG. 13B.
Figure 14B:
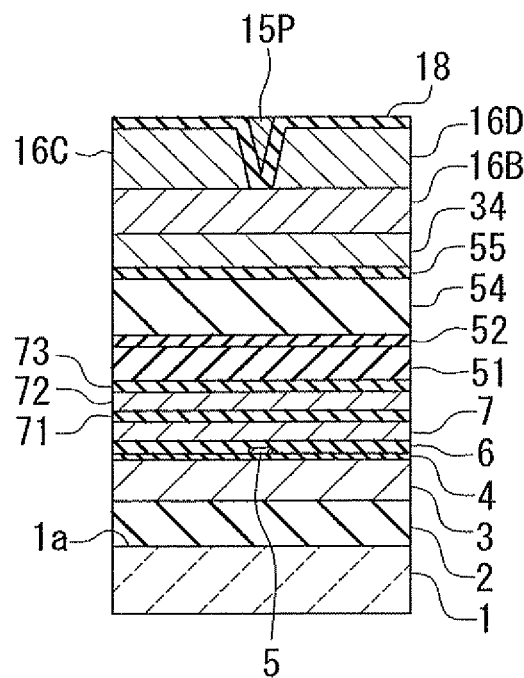

FIG. 14A and FIG. 14B show the next step. In this step, first, the second portion 18 is selectively etched to form therein an opening for exposing the top surface of the coupling layer 36 and an opening for exposing the top surface of the not-shown second connection layer. Next, a preliminary main pole 15P and the not-shown third connection layer are formed by frame plating, for example. The preliminary main pole 15P is to be provided with the end face later to thereby become the main pole 15. The preliminary main pole 15P and the third connection layer are formed such that their top surfaces are higher in level than parts of the second portion 18 that lie on the side shields 16C and 16D. Next, the not-shown first nonmagnetic layer is formed over the entire top surface of the stack. The preliminary main pole 15P, the third connection layer and the first nonmagnetic layer are then polished by, for example, CMP, until the second portion 18 is exposed.

Figure 15A:
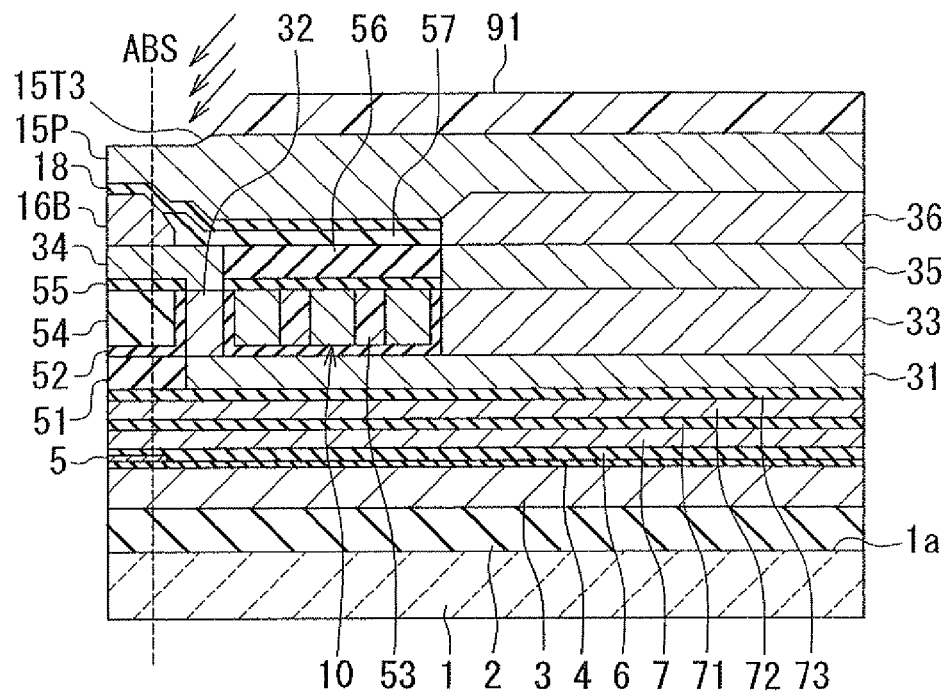
FIG. 15A and FIG. 15B are cross-sectional views showing a step that follows the step shown in FIG. 14A and FIG. 14B.
Figure 15B:
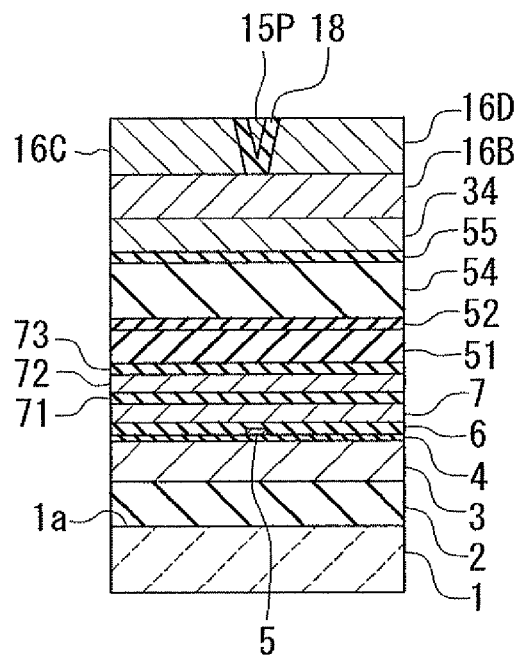

FIG. 15A and FIG. 15B show the next step. In this step, first, a photoresist mask 91 is formed on the preliminary main pole 15P. The photoresist mask 91 covers a portion of the top surface of the preliminary main pole 15P that is to become the fourth portion 15T4, and does not cover a portion of the top surface of the preliminary main pole 15P in the vicinity of the position ABS at which the medium facing surface 80 is to be formed.

Using the photoresist mask 91 as an etching mask, respective portions of the preliminary main pole 15P, the side shields 16C and 16D and the second portion 18 are etched in the vicinity of the position ABS at which the medium facing surface 80 is to be formed. This etching is performed to provide the preliminary main pole 15P with the third portion 15T3 which is an inclined plane. More specifically, the preliminary main pole 15P is etched by, for example, IBE with the direction of travel of the ion beams inclined relative to the direction perpendicular to the top surface 1a of the substrate 1. The arrows in FIG. 15A indicate the direction of travel of the ion beams. Performing IBE in such a manner forms the third portion 15T3 into a plane inclined relative to the direction perpendicular to the medium facing surface 80 to be formed later. Then, the photoresist mask 91 is removed.

Figure 16A:
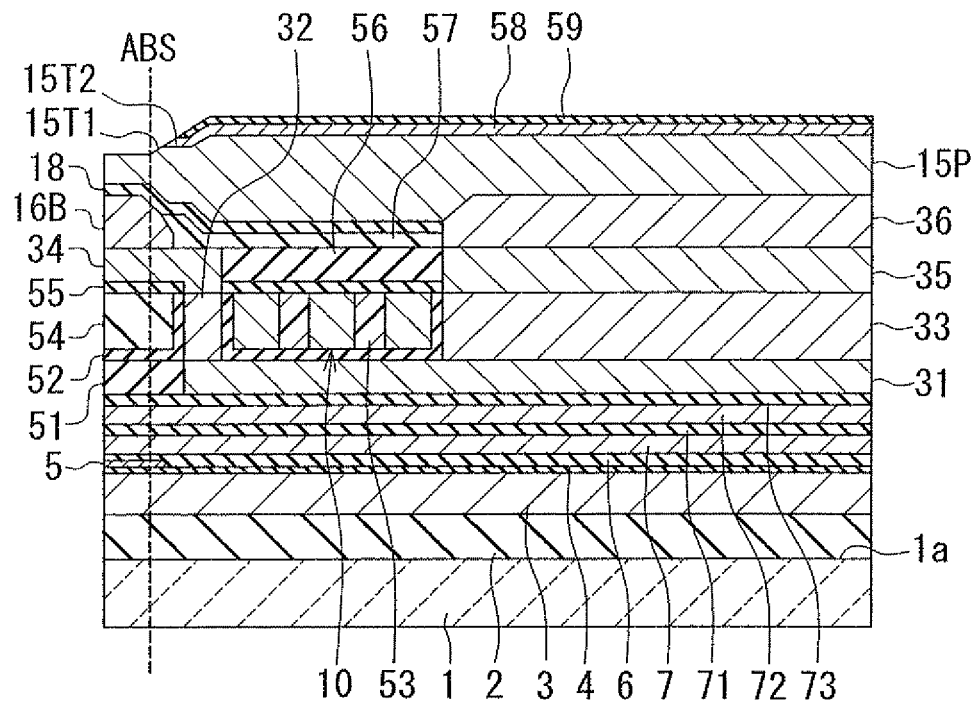
FIG. 16A and FIG. 16B are cross-sectional views showing a step that follows the step shown in FIG. 15A and FIG. 15B.
Figure 16B:
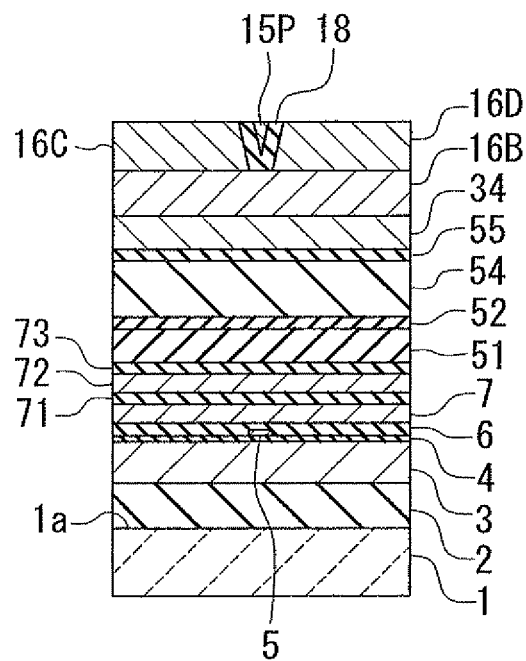

FIG. 16A and FIG. 16B show the next step. In this step, first, the nonmagnetic metal layer 58 and the insulating layer 59 are formed on the preliminary main pole 15P. Next, respective portions of the preliminary main pole 15P, the side shields 16C and 16D and the second portion 18 are etched by, for example, IBE, using the nonmagnetic metal layer 58 and the insulating layer 59 as an etching mask.

Where IBE is employed to etch the portions of the preliminary main pole 15P, the side shields 16C and 16D and the second portion 18, the etching is performed such that the direction of travel of the ion beams is at an angle of 40° to 75° relative to the direction perpendicular to the top surface 1a of the substrate 1 and that the direction of travel of the ion beams is caused to rotate as viewed in the direction perpendicular to the top surface 1a of the substrate 1. Performing IBE in such a manner provides the preliminary main pole 15P with a top surface having the first portion 15T1 and the second portion 15T2.

Figure 17A:
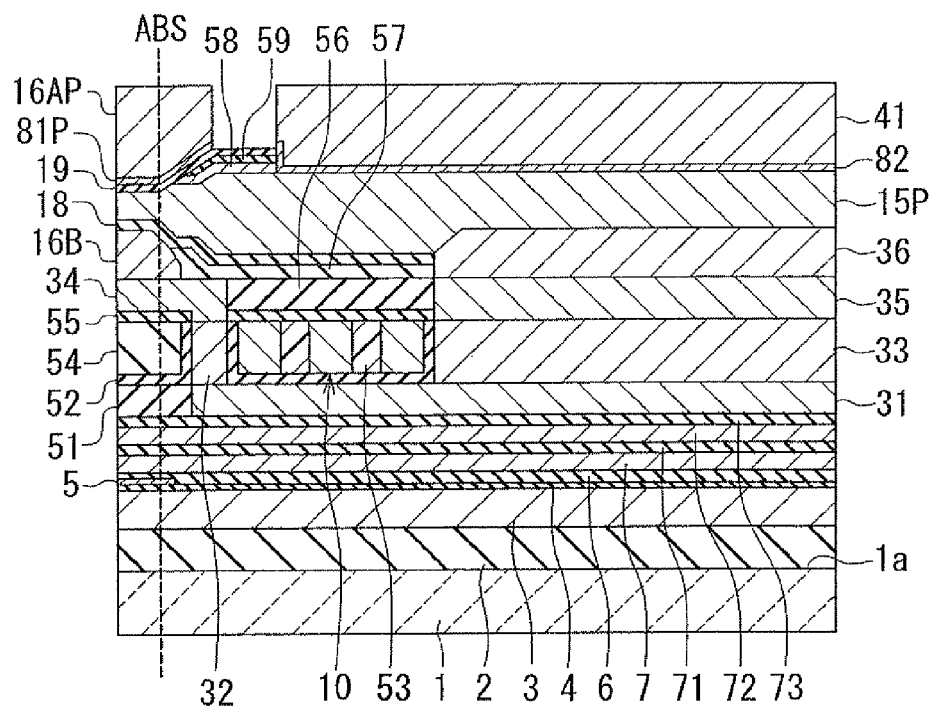
FIG. 17A and FIG. 17B are cross-sectional views showing a step that follows the step shown in FIG. 16A and FIG. 16B.
Figure 17B:
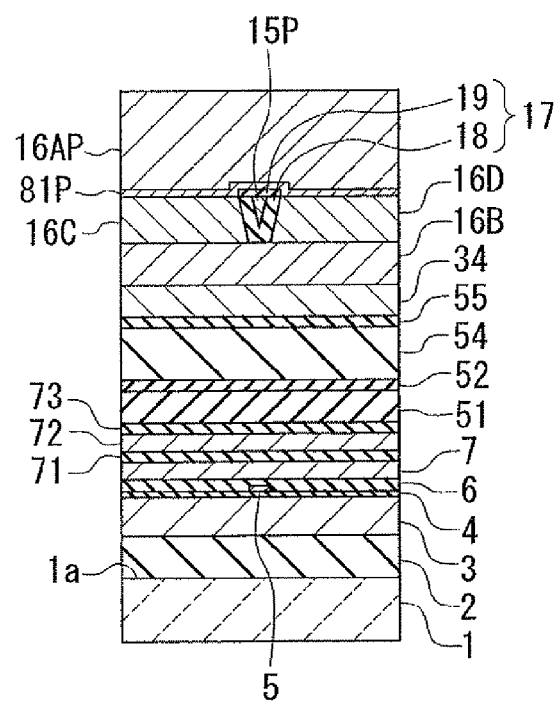

FIG. 17A and FIG. 17B show the next step. In this step, first, the first portion 19 is formed over the entire top surface of the stack by sputtering or chemical vapor deposition, for example. The first portion 19, the nonmagnetic metal layer 58, and the insulating layer 59 are then selectively etched by, for example, IBE, so that part of the top surface of the preliminary main pole 15P, part of the top surface of each of the side shields 16C and 16D, and the top surface of the third connection layer are exposed.

Next, a first seed layer is formed over the preliminary main pole 15P, the side shields 16C and 16D and the first portion 19 by physical vapor deposition such as sputtering. The first seed layer is to become the underlying layers 81 and 82 later. Then, a first preliminary shield 16AP, which is to become the first shield 16A later, and the yoke layer 41 are formed on the first seed layer by, for example, frame plating using the first seed layer as an electrode and seed. Next, the first seed layer except portions thereof lying under the first preliminary shield 16AP and the yoke layer 41 is removed by, for example, IBE, using the first preliminary shield 16AP and the yoke layer 41 as etching masks. The first seed layer is thereby separated into a seed layer 81P, which lies under the first preliminary shield 16AP, and the underlying layer 82.

Figure 18A:
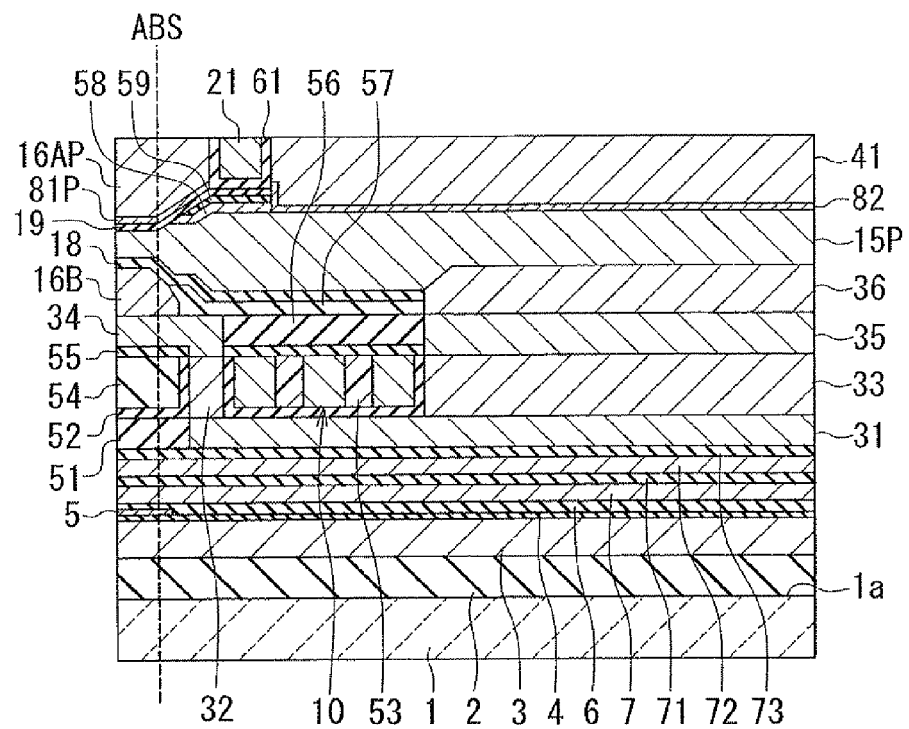
FIG. 18A and FIG. 18B are cross-sectional views showing a step that follows the step shown in FIG. 17A and FIG. 17B.
Figure 18B:
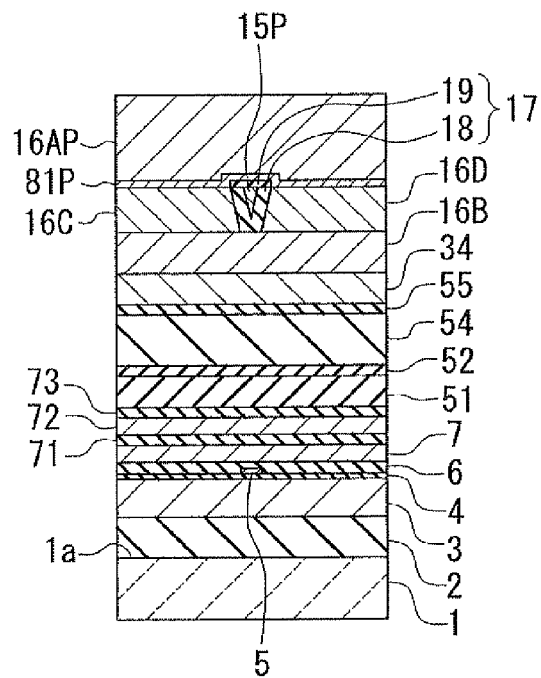

FIG. 18A and FIG. 18B show the next step. In this step, first, the insulating film 61 is formed over the entire top surface of the stack. Where alumina is selected as the material of the insulating film 61, the insulating film 61 is formed by ALD, for example. The insulating film 61 has a thickness in the range of 0.1 to 0.2 μm, for example. The insulating film 61 is then selectively etched by, for example, IBE, so that the top surface of the third connection layer is exposed. The first layer 21 of the first portion 20 of the coil is then formed by frame plating, for example. The first layer 21 is formed such that its top surface is higher in level than portions of the insulating film 61 that lie on the first preliminary shield 16AP and the yoke layer 41. Next, the not-shown second nonmagnetic layer is formed over the entire top surface of the stack. The first layer 21, the insulating film 61 and the second nonmagnetic layer are then polished by, for example, CMP, until the first preliminary shield 16AP and the yoke layer 41 are exposed.

Figure 19A:
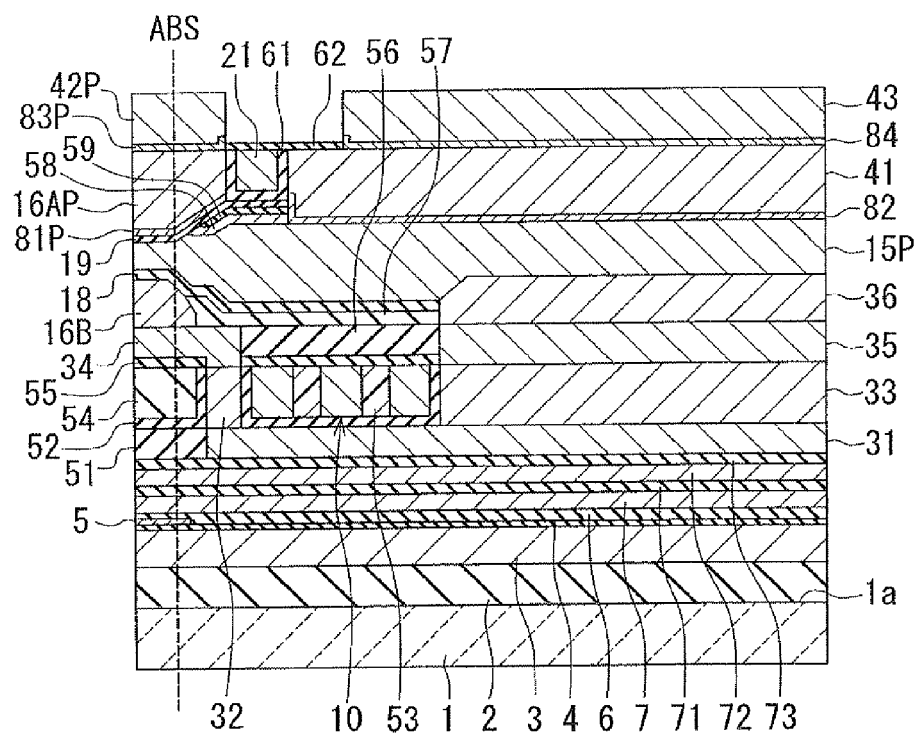
FIG. 19A and FIG. 19B are cross-sectional views showing a step that follows the step shown in FIG. 18A and FIG. 18B.
Figure 19B:
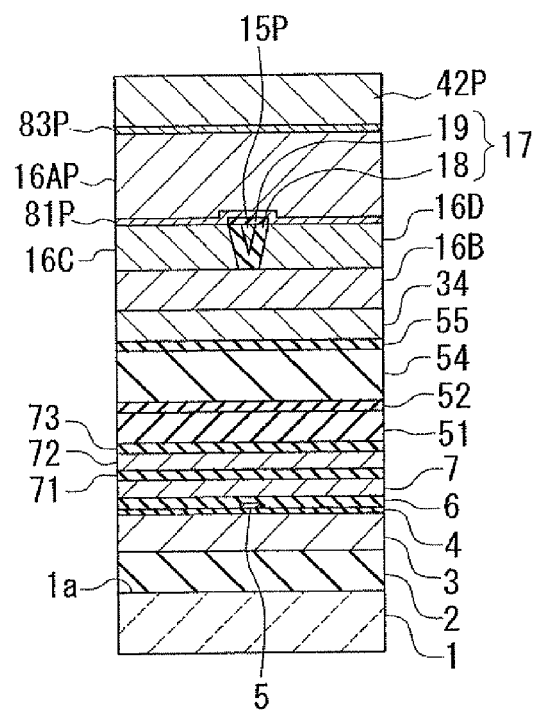

FIG. 19A and FIG. 19B show the next step. In this step, first, the insulating layer 62 is formed over the entire top surface of the stack. The insulating layer 62 is then selectively etched by, for example, IBE, so that the top surfaces of the first preliminary shield 16AP and the yoke layer 41 are exposed. Then, a second seed layer, which is to become the underlying layers 83 and 84 later, is formed over the first preliminary shield 16AP, the yoke layer 41 and the insulating layer 62 by physical vapor deposition such as sputtering. A preliminary coupling layer 42P, which is to become the first coupling layer 42 later, and the second coupling layer 43 are then formed on the second seed layer by, for example, frame plating using the second seed layer as an electrode and seed. Next, the second seed layer except portions thereof lying under the preliminary coupling layer 42P and the second coupling layer 43 is removed by, for example, IBE, using the preliminary coupling layer 42P and the second coupling layer 43 as etching masks. The second seed layer is thereby separated into a seed layer 83P, which lies under the preliminary coupling layer 42P, and the underlying layer 84.

Figure 20A:
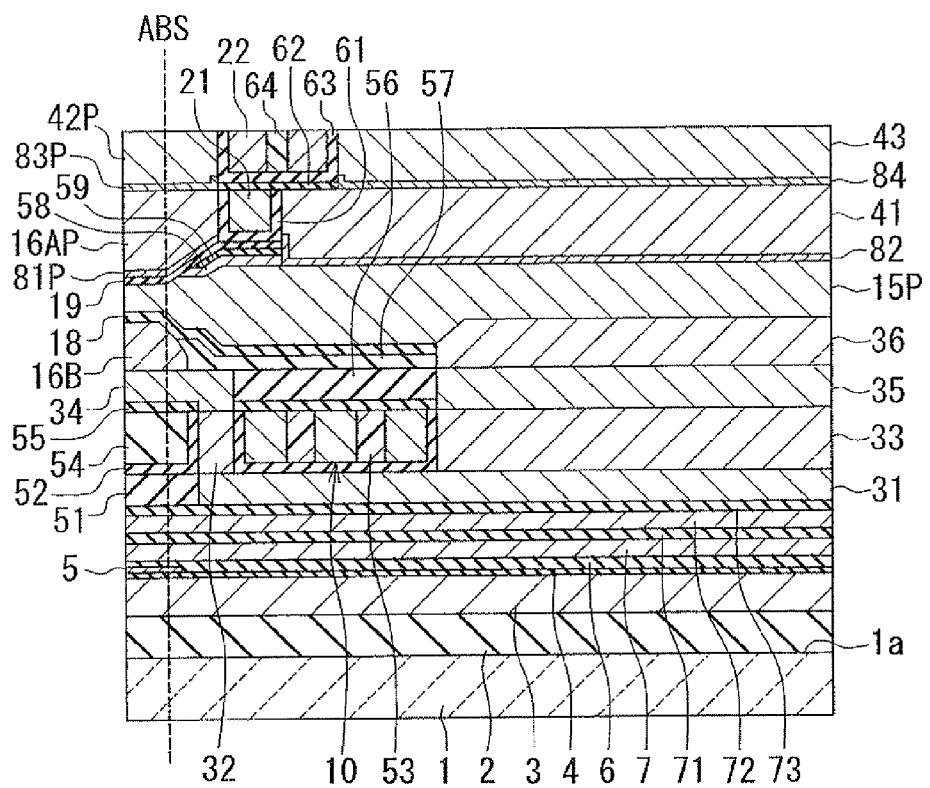
FIG. 20A and FIG. 20B are cross-sectional views showing a step that follows the step shown in FIG. 19A and FIG. 19B.
Figure 20B:
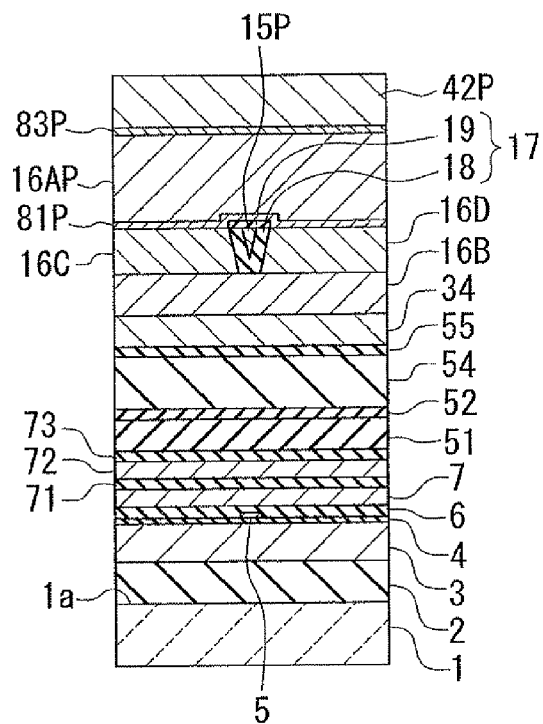

FIG. 20A and FIG. 20B show the next step. In this step, first, the insulating film 63 is formed over the entire top surface of the stack. The insulating layer 62 and the insulating film 63 are then selectively etched by, for example, IBE, so that the coil connection part 21E (see FIG. 5) of the first layer 21 is exposed. Next, the second layer 22 of the first portion 20 of the coil and the insulating layer 64 are formed. The methods for forming the second layer 22 and the insulating layer 64 are the same as the those for forming the second portion 10 of the coil and the insulating layer 53. Next, a not-shown insulating layer is formed over the entire top surface of the stack. The second layer 22, the insulating film 63, the insulating layer 64 and the not-shown insulating layer are then polished by, for example, CMP, until the top surfaces of the preliminary coupling layer 42P and the second coupling layer 43 are exposed.

Figure 21A:
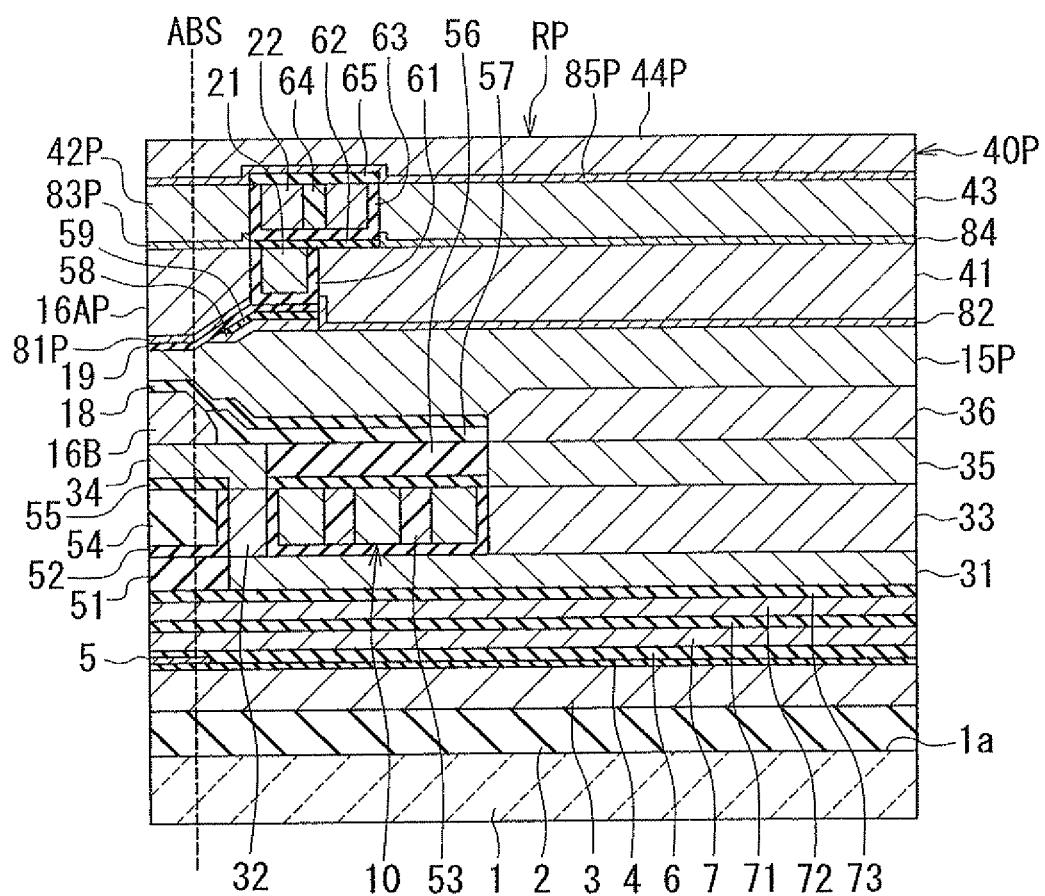
FIG. 21A and FIG. 21B are cross-sectional views showing a step that follows the step shown in FIG. 20A and FIG. 20B.
Figure 21B:
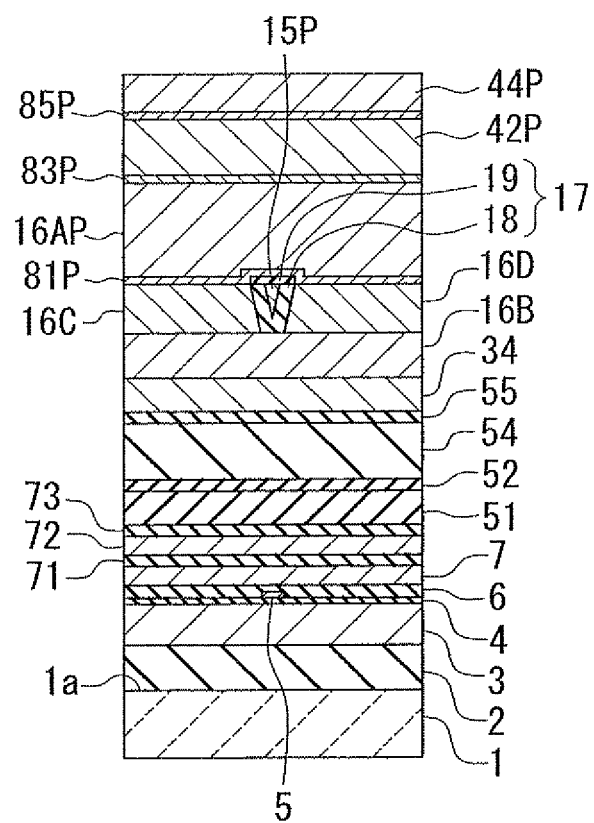

FIG. 21A and FIG. 21B show the next step. In this step, first, the insulating layer 65 is formed over the second layer 22, the insulating film 63 and the insulating layer 64. Next, a seed layer 85P, which is to become the underlying layer 85 later, is formed over the preliminary coupling layer 42P, the second coupling layer 43 and the insulating layer 65 by physical vapor deposition such as sputtering. Then, a preliminary coupling layer 44P, which is to become the third coupling layer 44 later, is formed on the seed layer 85P by, for example, frame plating using the seed layer 85P as an electrode and seed. The preliminary coupling layer 44P has a thickness in the range of 0.3 to 0.6 μm, for example. Using the preliminary coupling layer 44P as an etching mask, the seed layer 85P except the portion thereof lying under the preliminary coupling layer 44P is then removed by IBE, for example.

The yoke layer 41, the second coupling layer 43, the preliminary coupling layers 42P and 44P, the underlying layers 82 and 84 and the seed layer 85P constitute a preliminary coupling portion 40P which is to become the first coupling portion 40 later. The first preliminary shield 16AP, the preliminary coupling portion 40P and the seed layers 81P and 83P constitute a preliminary return path section RP which is to be provided with the front end face R11 and the inclined surface R12 later to thereby become the first return path section R1. The descriptions of the step of FIG. 17A and FIG. 17B and subsequent steps so far include a description of the step of forming the preliminary coupling portion 40P and a description of the step of forming the preliminary return path section RP.

Figure 22A:
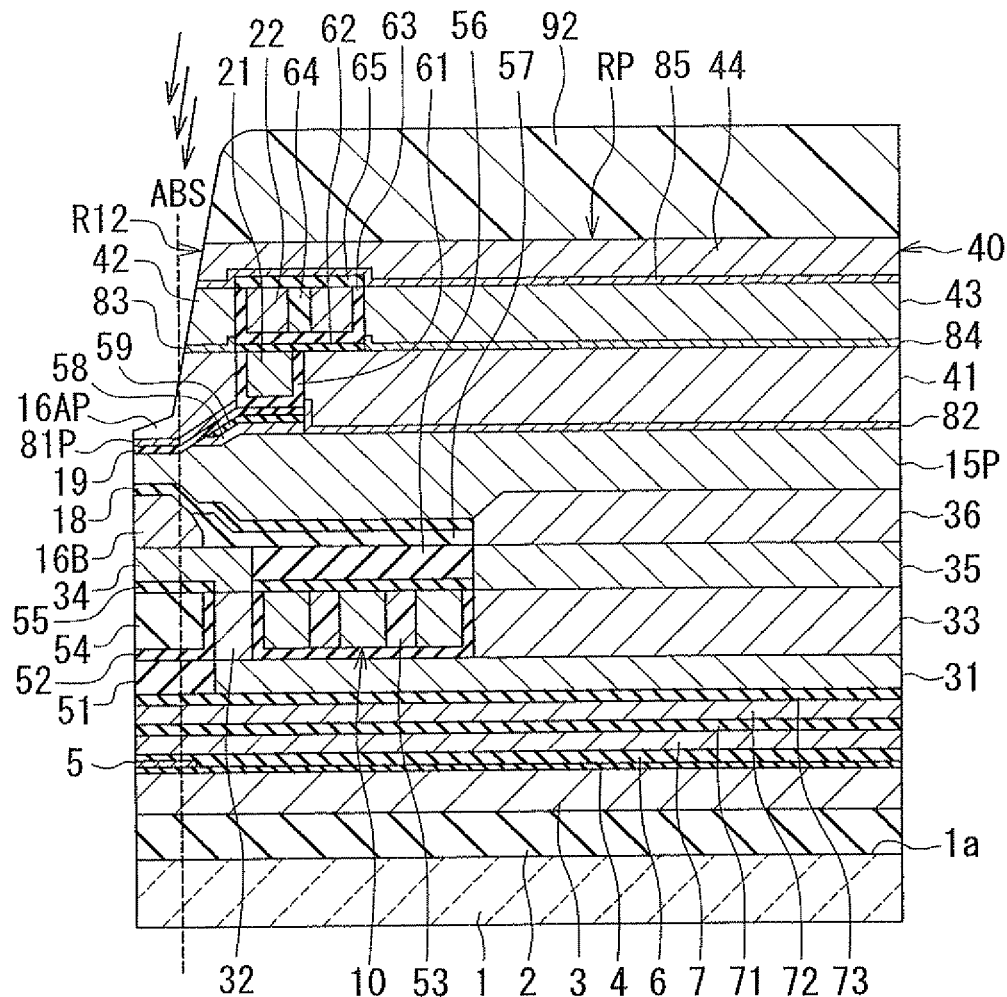
FIG. 22A and FIG. 22B are cross-sectional views showing a step that follows the step shown in FIG. 21A and FIG. 21B.
Figure 22B:
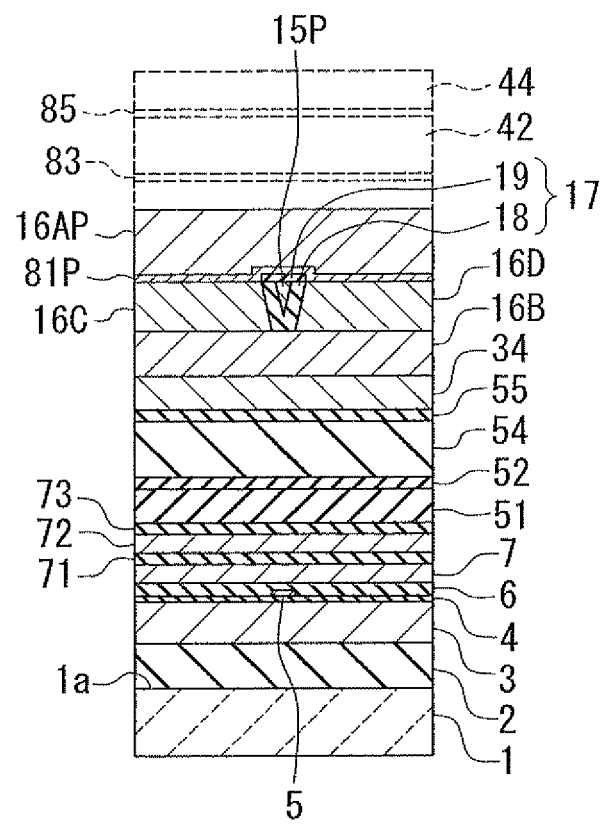

FIG. 22A and FIG. 22B show the next step. In this step, first, a photoresist mask 92 is formed on the top surface of the stack. The photoresist mask 92 is not present in the position ABS at which the medium facing surface 80 is to be formed, but is present on a portion of the stack that is to remain as the magnetic head (the portion located on the right side relative to the position ABS in FIG. 22A) and covers part of the preliminary coupling layer 44P. The photoresist mask 92 has an end closest to the position ABS. The distance from this end to the position ABS falls within the range of 0.2 to 0.5 μm, for example.

Next, the preliminary return path section RP is partially etched to form the inclined surface R12. More specifically, using the photoresist mask 92 as the etching mask, respective portions of the first preliminary shield 16AP, the seed layer 83P and the preliminary coupling portion 40P (the preliminary coupling layers 42P and 44P and the seed layer 85P) are etched by, for example, IBE, so that the inclined surface R12 is formed over the first preliminary shield 16AP, the seed layer 83P and the preliminary coupling portion 40P. The inclined surface R12 is formed such that the part of the inclined surface R12 present on the first preliminary shield 16AP intersects the position ABS at which the medium facing surface 80 is to be formed. This etching makes the preliminary coupling layers 42P and 44P into the coupling layers 42 and 44, respectively, and makes the seed layers 83P and 85P into the underlying layers 83 and 85, respectively. This etching also makes the preliminary coupling portion 40P into the first coupling portion 40. The photoresist mask 92 is then removed.

Next, a preliminary nonmagnetic layer, which is to become the nonmagnetic layer 70 later, is formed to cover the entire top surface of the stack. Wiring, terminals and other components are then formed on the preliminary nonmagnetic layer, and the substrate 1 is cut near the position ABS at which the medium facing surface 80 is to be formed. Next, the cut surface is polished to form the medium facing surface 80 so that the preliminary return path section RP is provided with the front end face R11 and thereby becomes the first return path section R1, the preliminary main pole 15P is provided with the end face and thereby becomes the main pole 15, and the preliminary nonmagnetic layer becomes the nonmagnetic layer 70. This makes the first preliminary shield 16AP into the first shield 16, and the seed layer 81P into the underlying layer 81. Then, fabrication of flying rails and other processes are performed to complete the magnetic head.

As has been described, the method of manufacturing the magnetic head according to the present embodiment includes the steps of forming the preliminary main pole 15P; forming the first portion 19 and the second portion 18 of the gap part 17; forming the first portion 20 and the second portion 10 of the coil; forming the preliminary return path section RP; partially etching the preliminary return path section RP; forming the preliminary nonmagnetic layer; and forming the medium facing surface 80.

The step of forming the preliminary return path section RP includes the steps of forming the first preliminary shield 16AP; forming the seed layer 83P on the first preliminary shield 16AP; and forming the preliminary coupling portion 40P. The preliminary coupling layer 42P, which is part of the preliminary coupling portion 40P, is formed by plating with the seed layer 83P used as a seed.

In the method of manufacturing the magnetic head according to the present embodiment, as shown in FIG. 22A, the inclined surface R12 is formed in the step of partially etching the preliminary return path section RP. The inclined surface R12 is formed such that the part of the inclined surface R12 present on the first preliminary shield 16AP intersects the position ABS at which the medium facing surface 80 is to be formed. This provides the structure in which the first edge R12a of the inclined surface R12 is present on the first shield 16A and the end of the underlying layer 83 is located at a distance from the medium facing surface 80.

Second Embodiment

Figure 23:
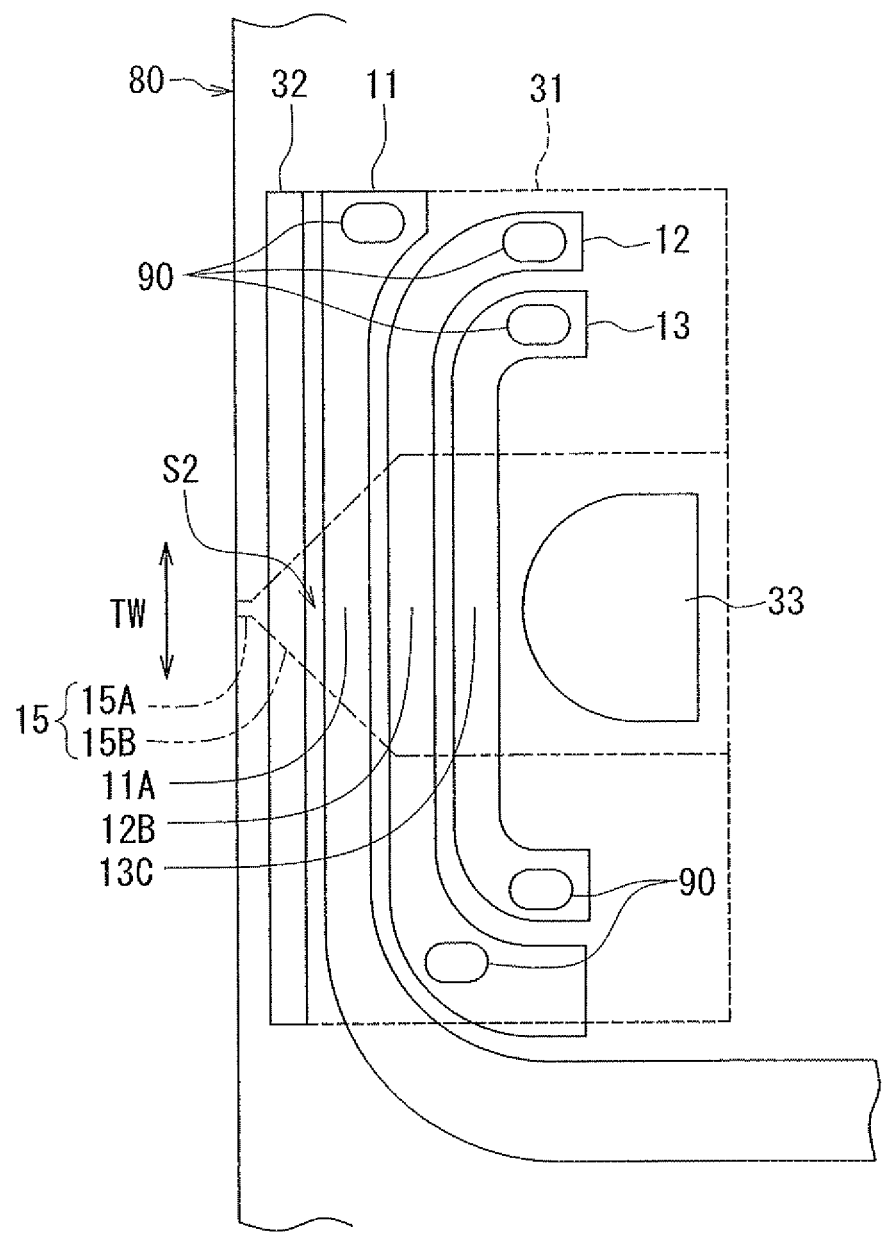
FIG. 23 is a plan view showing a plurality of second coil elements of a coil of a magnetic head according to a second embodiment of the invention.
Figure 24:
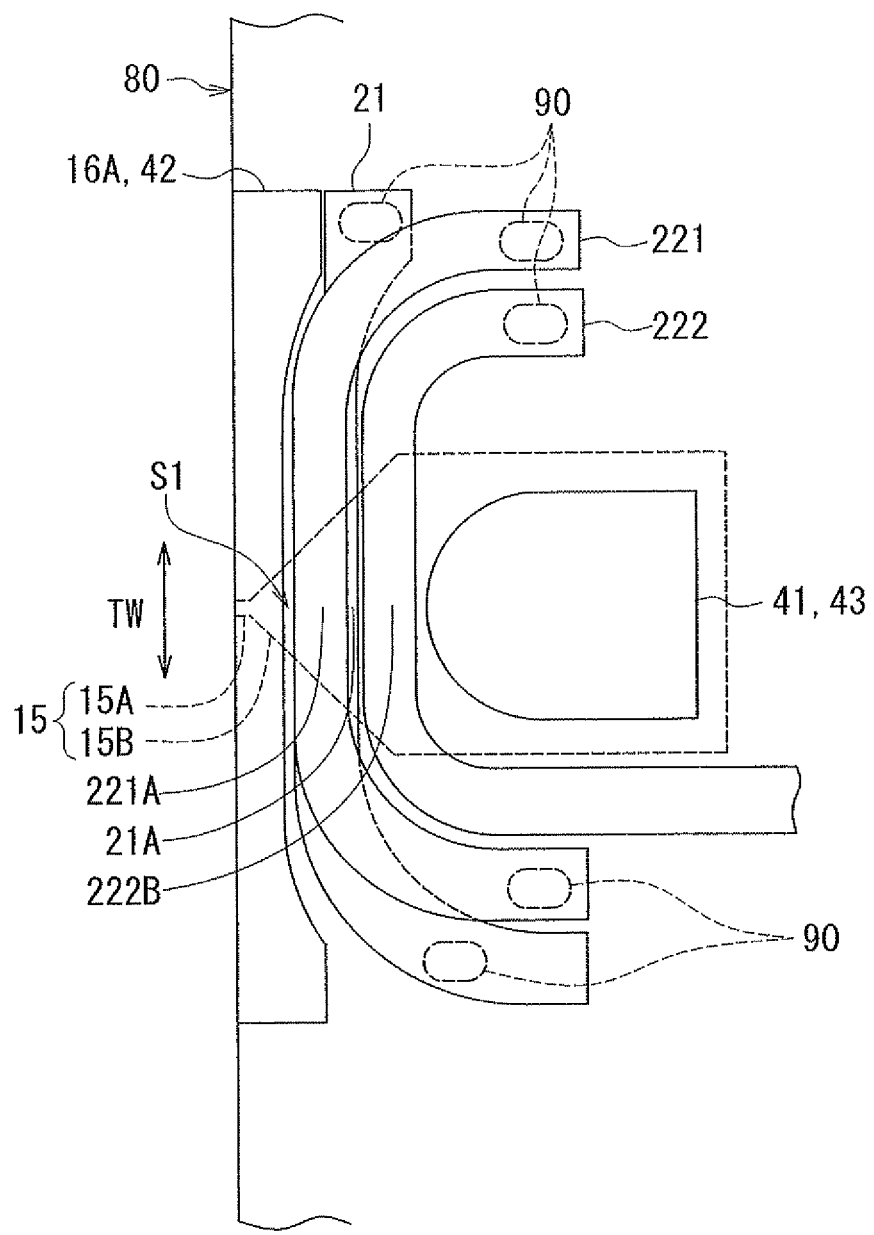
FIG. 24 is a plan view showing a plurality of first coil elements of the coil of the magnetic head according to the second embodiment of the invention.

A magnetic head according to a second embodiment of the invention will now be described with reference to FIG. 23 and FIG. 24. FIG. 23 is a plan view showing a plurality of second coil elements of the coil of the magnetic head according to the present embodiment. FIG. 24 is a plan view showing a plurality of first coil elements of the coil of the magnetic head according to the present embodiment.

The configuration of the magnetic head according to the present embodiment is different from that of the magnetic head according to the first embodiment in the following respects. In the magnetic head according to the present embodiment, the coil is wound approximately three turns around the main pole 15. The coil of the present embodiment has three line-shaped portions 11, 12 and 13 shown in FIG. 23 in place of the second portion 10 of the first embodiment shown in FIG. 4. The coil of the present embodiment further has a first layer 21 shaped as shown in FIG. 24, in place of the first layer 21 of the first embodiment shown in FIG. 5. The coil of the present embodiment further has two line-shaped portions 221 and 222 shown in FIG. 24 in place of the second layer 22 of the first embodiment shown in FIG. 6.

As shown in FIG. 23, the line-shaped portions 11, 12 and 13 respectively include second coil elements 11A, 12B and 13C extending to pass through the second space S2. The second coil elements 11A, 12B and 13C align in this order in the direction perpendicular to the medium facing surface 80, the coil element 11A being closest to the medium facing surface 80.

As shown in FIG. 24, the first layer 21 of the present embodiment includes a first coil element 21A extending to pass through the first space S1. The coil element 21A passes between the first shield 16A and the yoke layer 41, in particular. As shown in FIG. 24, the line-shaped portions 221 and 222 respectively include first coil elements 221A and 222B extending to pass through the first space S1. The first coil elements 221A and 222B align in this order in the direction perpendicular to the medium facing surface 80, the coil element 221A being closer to the medium facing surface 80. The coil elements 221A and 222B pass between the first coupling layer 42 and the second coupling layer 43, in particular.

The line-shaped portions 11, 12 and 13 are electrically connected to the first layer 21 and the line-shaped portions 221 and 222 via five connection layers 90 of columnar shape, which penetrate a plurality of layers interposed therebetween, so as to form a coil that is wound helically around the main pole 15.

The remainder of configuration, function and effects of the present embodiment are similar to those of the first embodiment.

Third Embodiment

Figure 25:
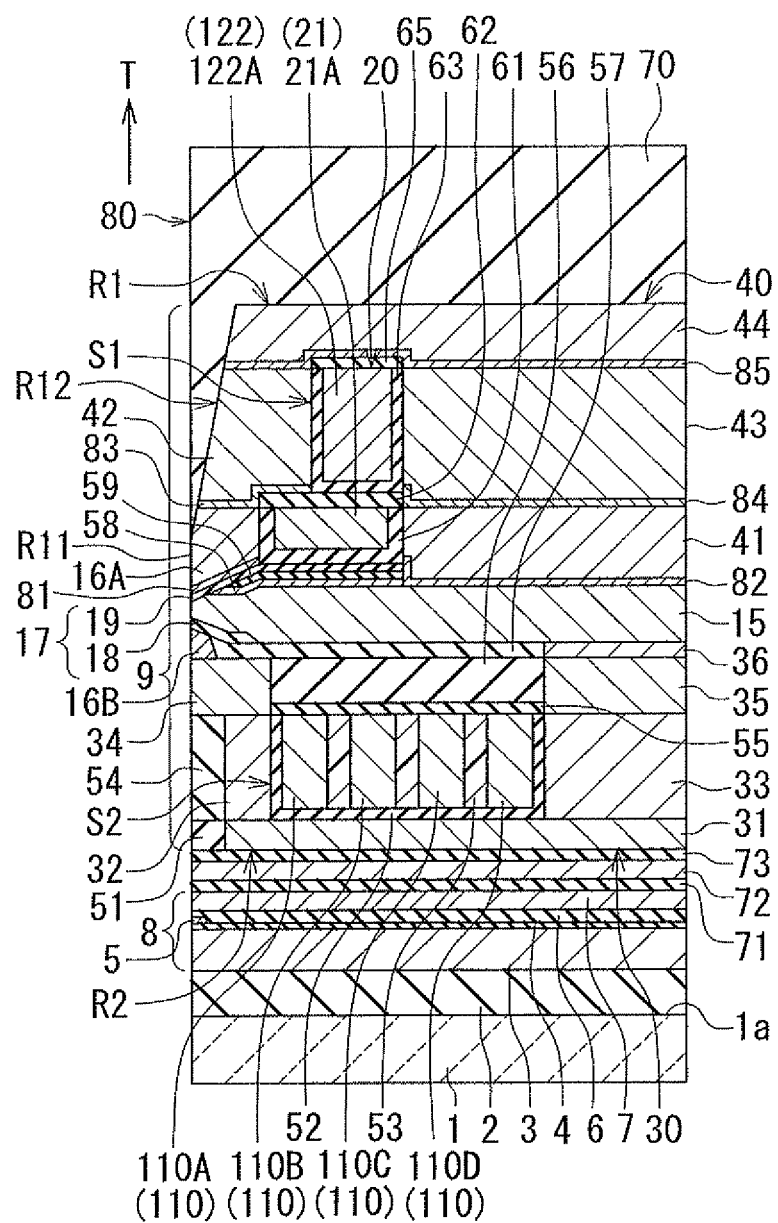
FIG. 25 is a cross-sectional view of a magnetic head according to a third embodiment of the invention.
Figure 26:
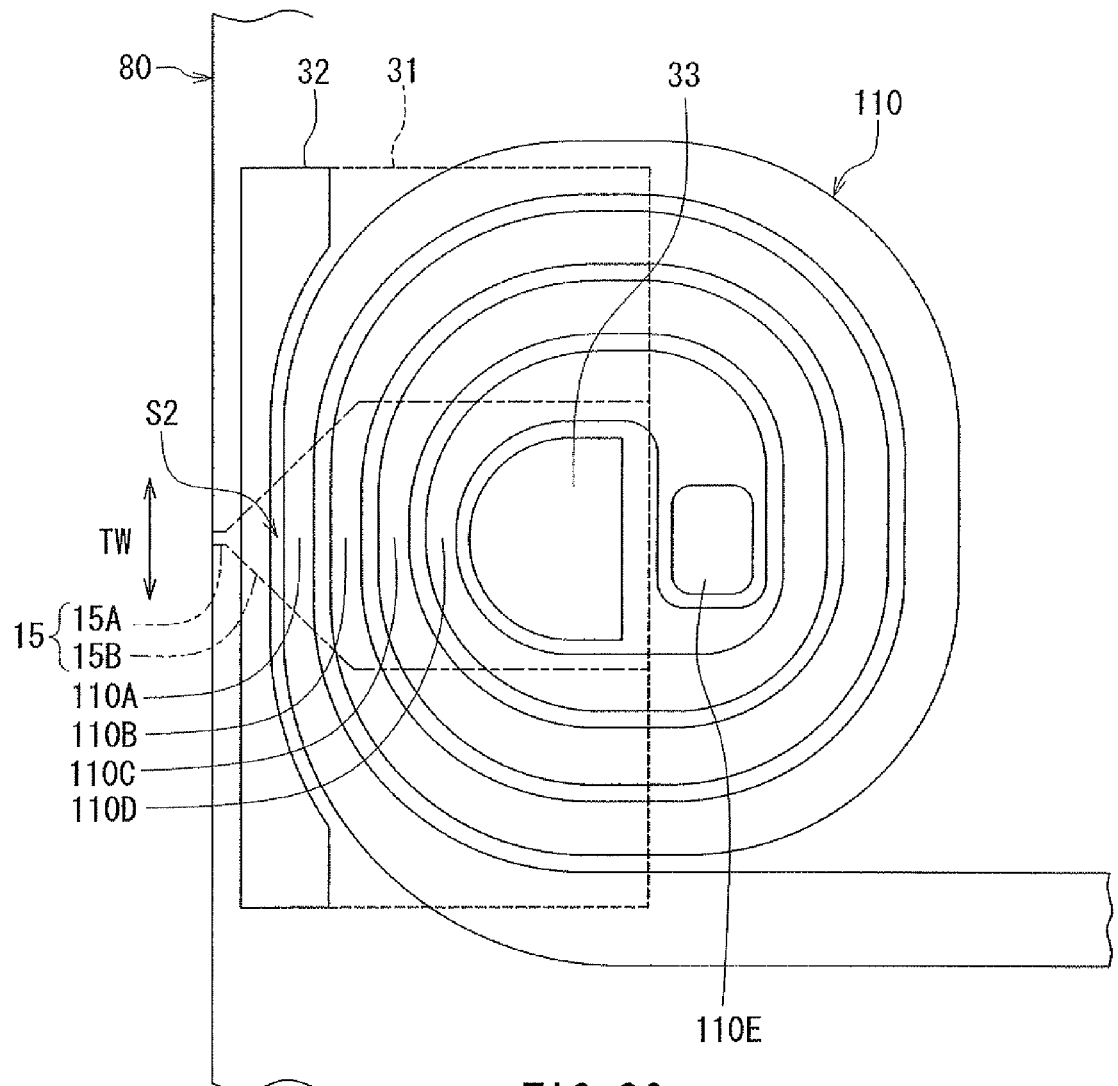
FIG. 26 is a plan view showing a second portion of a coil of the magnetic head according to the third embodiment of the invention.
Figure 27:
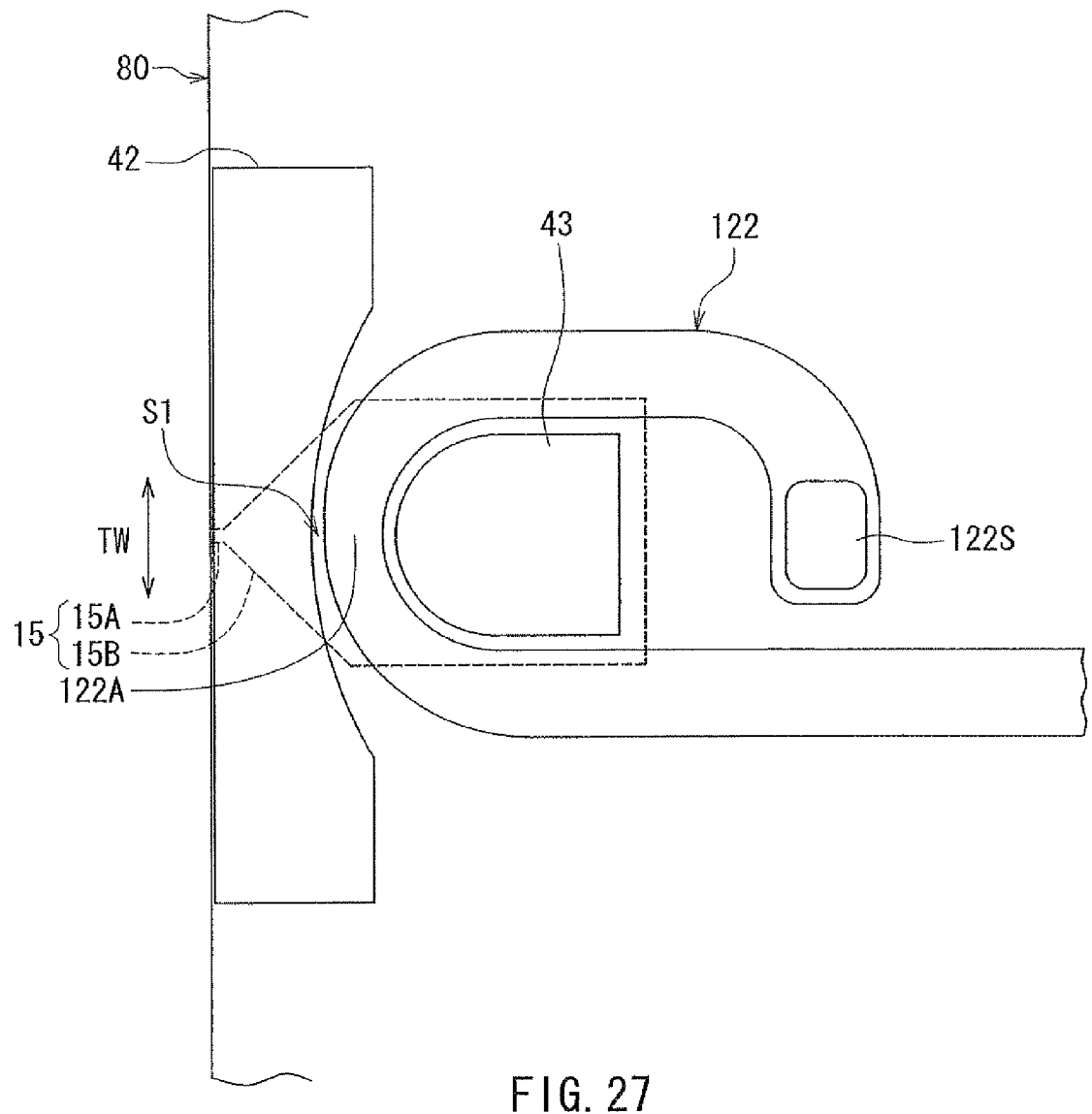
FIG. 27 is a plan view showing a second layer of a first portion of the coil of the magnetic head according to the third embodiment of the invention.

A magnetic head according to a third embodiment of the invention will now be described with reference to FIG. 25 to FIG. 27. FIG. 25 is a cross-sectional view of the magnetic head according to the present embodiment. Note that FIG. 25 shows a cross section perpendicular to the medium facing surface and to the top surface of the substrate, or the main cross section, in particular. FIG. 26 is a plan view showing a second portion of the coil of the magnetic head according to the present embodiment. FIG. 27 is a plan view showing a second layer of a first portion of the coil of the magnetic head according to the present embodiment.

The configuration of the magnetic head according to the present embodiment is different from that of the magnetic head according to the first embodiment in the following respects. The coil of the present embodiment includes a second portion 110 in place of the second portion 10 of the first embodiment. As shown in FIG. 26, the second portion 110 is wound approximately four turns around the coupling layer 33 which constitutes part of the second return path section R2.

The first portion 20 of the coil of the present embodiment includes a second layer 122 in place of the second layer 22 of the first embodiment. As shown in FIG. 27, the second layer 122 is wound approximately one turn around the second coupling layer 43 which constitutes part of the first return path section R1. The magnetic head according to the present embodiment is without the insulating layer 64.

Now, the second portion 110 and the second layer 122 will be described in more detail with reference to FIG. 26 and FIG. 27. As shown in FIG. 26, the second portion 110 includes four second coil elements 110A, 110B, 110C and 110D extending to pass between the coupling layer 32 and the coupling layer 33, in particular, within the second space S2. The second coil elements 110A, 110B, 110C and 110D align in this order in the direction perpendicular to the medium facing surface 80, the coil element 110A being closest to the medium facing surface 80. The second portion 110 has a coil connection part 110E electrically connected to the first layer 21 of the first portion 20 of the first embodiment shown in FIG. 5. In the present embodiment, the coil connection part 21S of the first layer 21 is electrically connected to the coil connection part 110E via first to third connection layers.

As shown in FIG. 27, the second layer 122 of the first portion 20 includes a first coil element 122A extending to pass between the first coupling layer 42 and the second coupling layer 43, in particular, within the first space S1. The second layer 122 has a coil connection part 122S penetrating the insulating layer 62 and the insulating film 63 and electrically connected to the coil connection part 21E (see FIG. 5) of the first layer 21.

The remainder of configuration, function and effects of the present embodiment are similar to those of the first embodiment.

Fourth Embodiment

Figure 28:
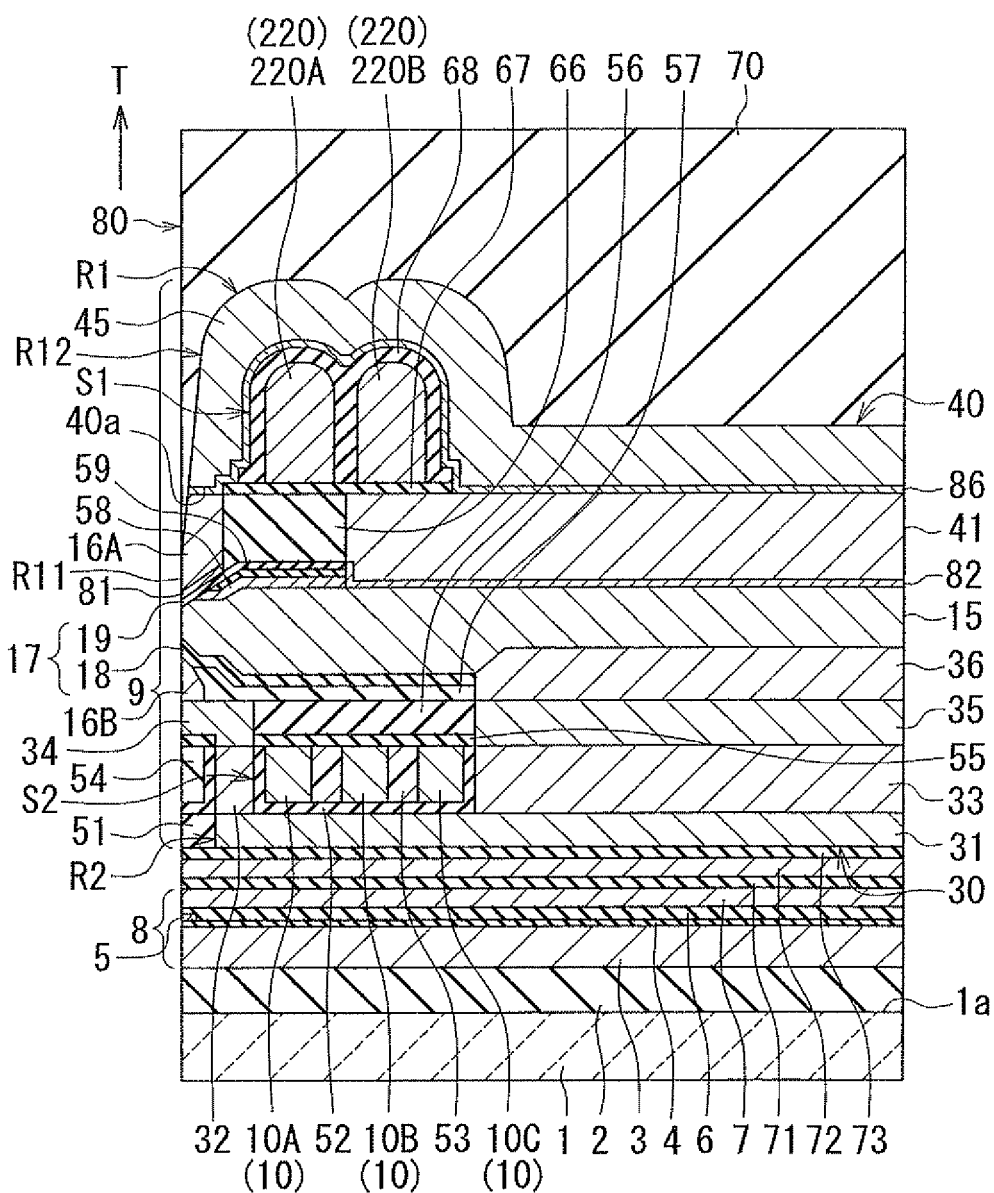
FIG. 28 is a cross-sectional view of a magnetic head according to a fourth embodiment of the invention.
Figure 29:
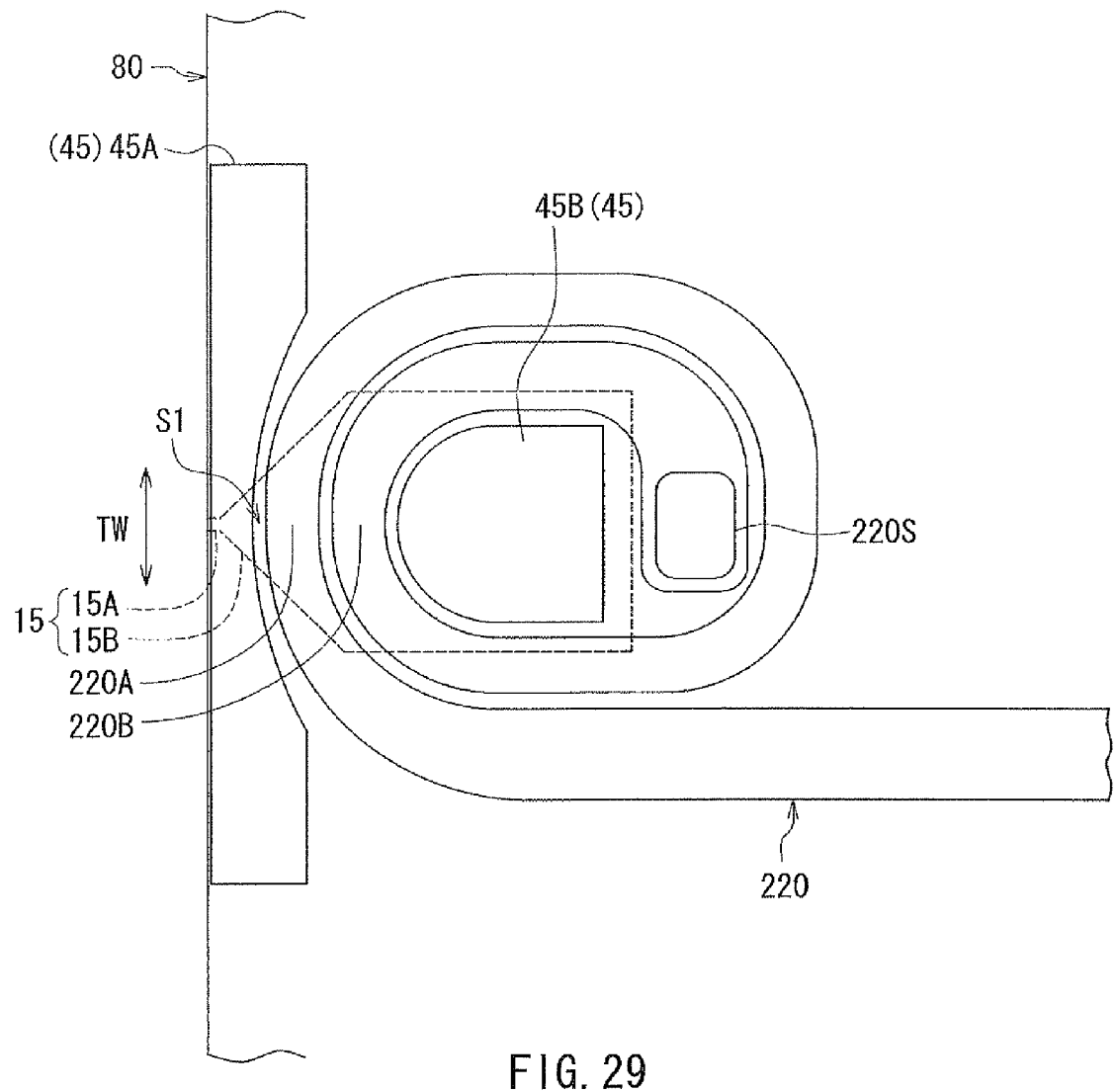
FIG. 29 is a plan view showing a first portion of a coil of the magnetic head according to the fourth embodiment of the invention.

A magnetic head according to a fourth embodiment of the invention will now be described with reference to FIG. 28 and FIG. 29. FIG. 28 is a cross-sectional view of the magnetic head according to the present embodiment. Note that FIG. 28 shows a cross section perpendicular to the medium facing surface and to the top surface of the substrate, or the main cross section, in particular. In FIG. 28, the second nonmagnetic layer mentioned in the description of the first embodiment is shown with reference numeral 66. FIG. 29 is a plan view showing a first portion of the coil of the magnetic head according to the present embodiment.

The configuration of the magnetic head according to the present embodiment is different from that of the magnetic head according to the first embodiment in the following respects. The magnetic head according to the present embodiment is without the insulating films 61 and 63, the insulating layers 62, 64 and 65 and the underlying layers 83, 84 and 85. Furthermore, the first coupling portion 40 of the first return path section R1 of the present embodiment has a coupling layer 45 in place of the first to third coupling layers 42 to 44 of the first embodiment. The coupling layer 45 includes the shield facing surface 40a of the first coupling portion 40. The coupling layer 45 is located farther from the top surface 1a of the substrate 1 than are the first shield 16A and the yoke layer 41, and magnetically couples the first shield 16A and the yoke layer 41 to each other. The coupling layer 45 further includes a first portion 45A located on the first shield 16A and a second portion 45B located on the yoke layer 41. The first portion 45A has an end face that faces toward the medium facing surface 80 and the shield facing surface 40a which is the bottom surface. This end face is located at a distance from the medium facing surface 80. The distance from the medium facing surface 80 to an arbitrary point on the end face of the first portion 45A increases with increasing distance from the arbitrary point to the top surface 1a of the substrate 1.

The coil of the present embodiment includes a first portion 220 in place of the first portion 20 of the first embodiment. As shown in FIG. 29, the first portion 220 is wound approximately two turns around the second portion 45B of the coupling layer 45 which constitutes part of the first return path section R1.

The magnetic head according to the present embodiment includes an insulating layer 67 made of an insulating material and disposed on part of the top surfaces of the yoke layer 41 and the second nonmagnetic layer 66. The first portion 220, lies on the insulating layer 67. The magnetic head further includes an insulating layer 68 made of an insulating material and disposed to cover the first portion 220. The insulating layers 67 and 68 are made of alumina, for example.

The first return path section R1 of the present embodiment includes an underlying layer 86 interposed between the coupling layer 45 and each of the first shield 16A, the yoke layer 41 and the insulating layer 68 and underlying the coupling layer 45. The underlying layer 86 has an end closest to the medium facing surface 80, the end being located at a distance from the medium facing surface 80. The coupling layer 45 lies on the underlying layer 86. The underlying layer 86 may be made of a material the same as or different from the material of the first shield 16A, the yoke layer 41 and the coupling layer 45. As will be described in detail later, the underlying layer 86 is part of a seed layer that is used for plating to form the coupling layer 45. A portion of the underlying layer 86, the portion being interposed between the first shield 16A and the coupling layer 45, corresponds to the "underlying layer" according to the invention.

The underlying layer 86 except the portion thereof interposed between the first shield 16A and the coupling layer 45, the underlying layer 82, the coupling layer 45, and the yoke layer 41 constitute the first coupling portion 40 of the present embodiment. The portion of the underlying layer 86 interposed between the first shield 16A and the coupling layer 45, the underlying layer 81, the first shield 16A, and the first coupling portion 40 constitute the first return path section R1.

The inclined surface R12 of the first return path section R1 of the present embodiment is formed over the first shield 16A, the underlying layer 86 and the first coupling portion 40 (the coupling layer 45). The connecting surface 16Ad (see FIG. 1 and FIG. 7) of the first shield 16A, the end face of the coupling layer 45 and the end of the underlying layer 86 each constitute part of the inclined surface R12.

Now, the first portion 220 will be described in more detail with reference to FIG. 29. As shown in FIG. 29, the first portion 220 includes two first coil elements 220A and 220B extending to pass between the first portion 45A and the second portion 45B of the coupling layer 45, in particular, within the first space S1. The first coil elements 220A and 220B align in this order in the direction perpendicular to the medium facing surface 80, the coil element 220A being closer to the medium facing surface 80. The first portion 220 has a coil connection part 220S electrically connected to the coil connection part 10E of the second portion 10 of the first embodiment shown in FIG. 4. The coil connection part 220S is electrically connected to the coil connection part 10E via the first to third connection layers mentioned in the description of the first embodiment and a fourth connection layer (not shown) of columnar shape disposed on the third connection layer. The coil connection part 220S is disposed on the fourth connection layer. The fourth connection layer is made of a conductive material such as copper.

Figure 30A:
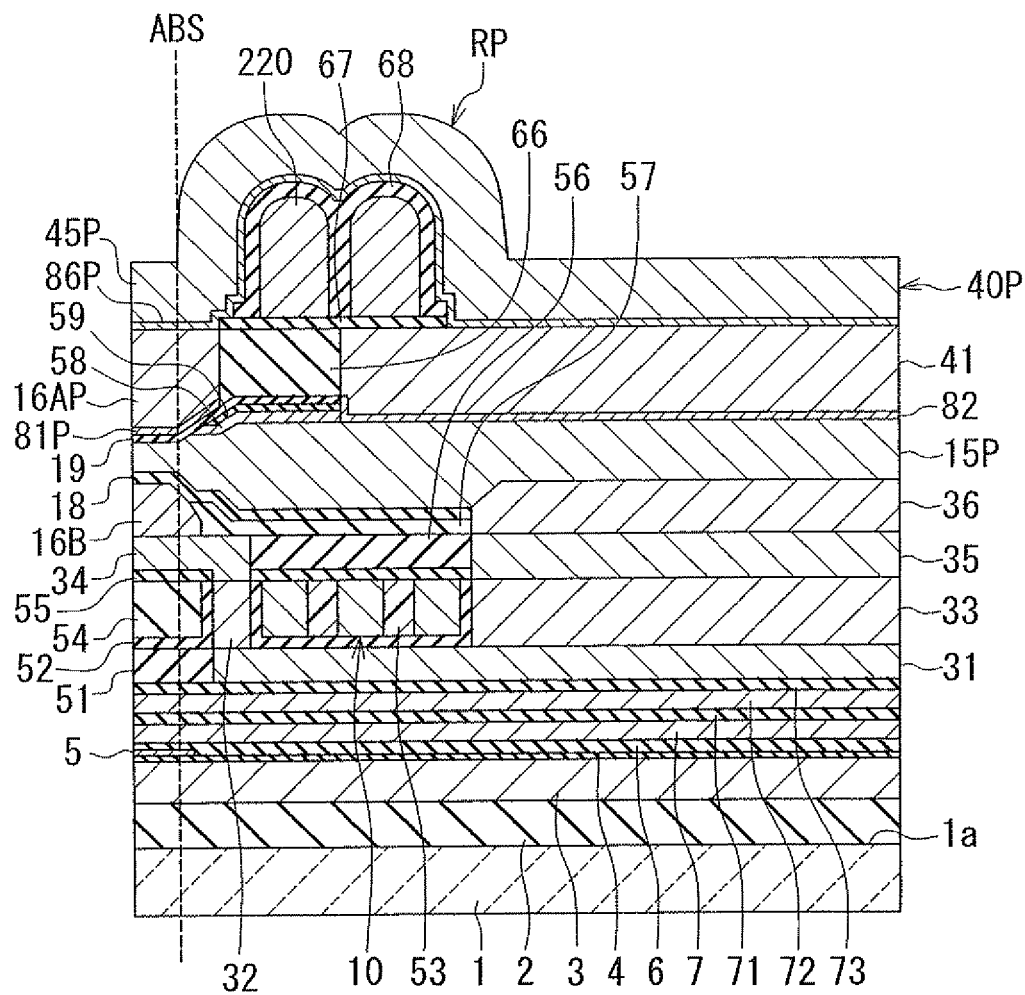
FIG. 30A and FIG. 30B are cross-sectional views showing a step of a method of manufacturing the magnetic head according to the fourth embodiment of the invention.
Figure 30B:
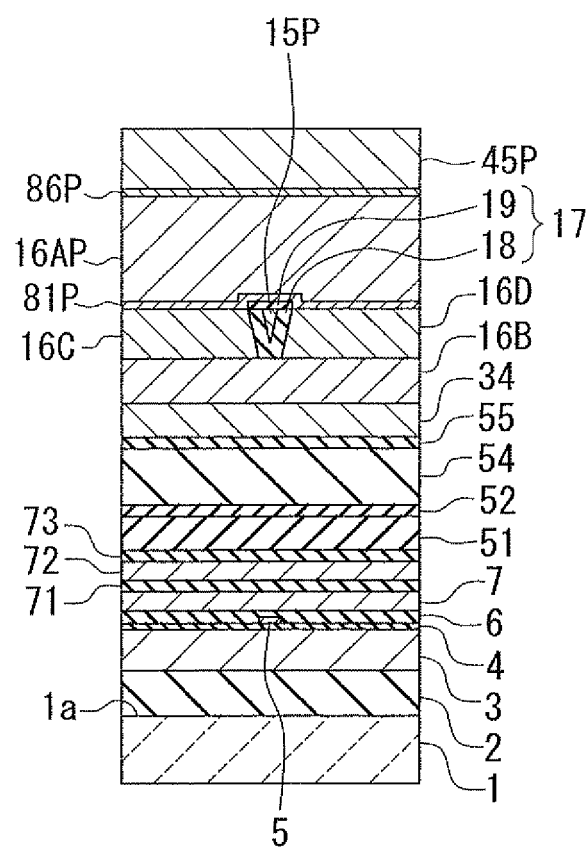
Figure 31A:
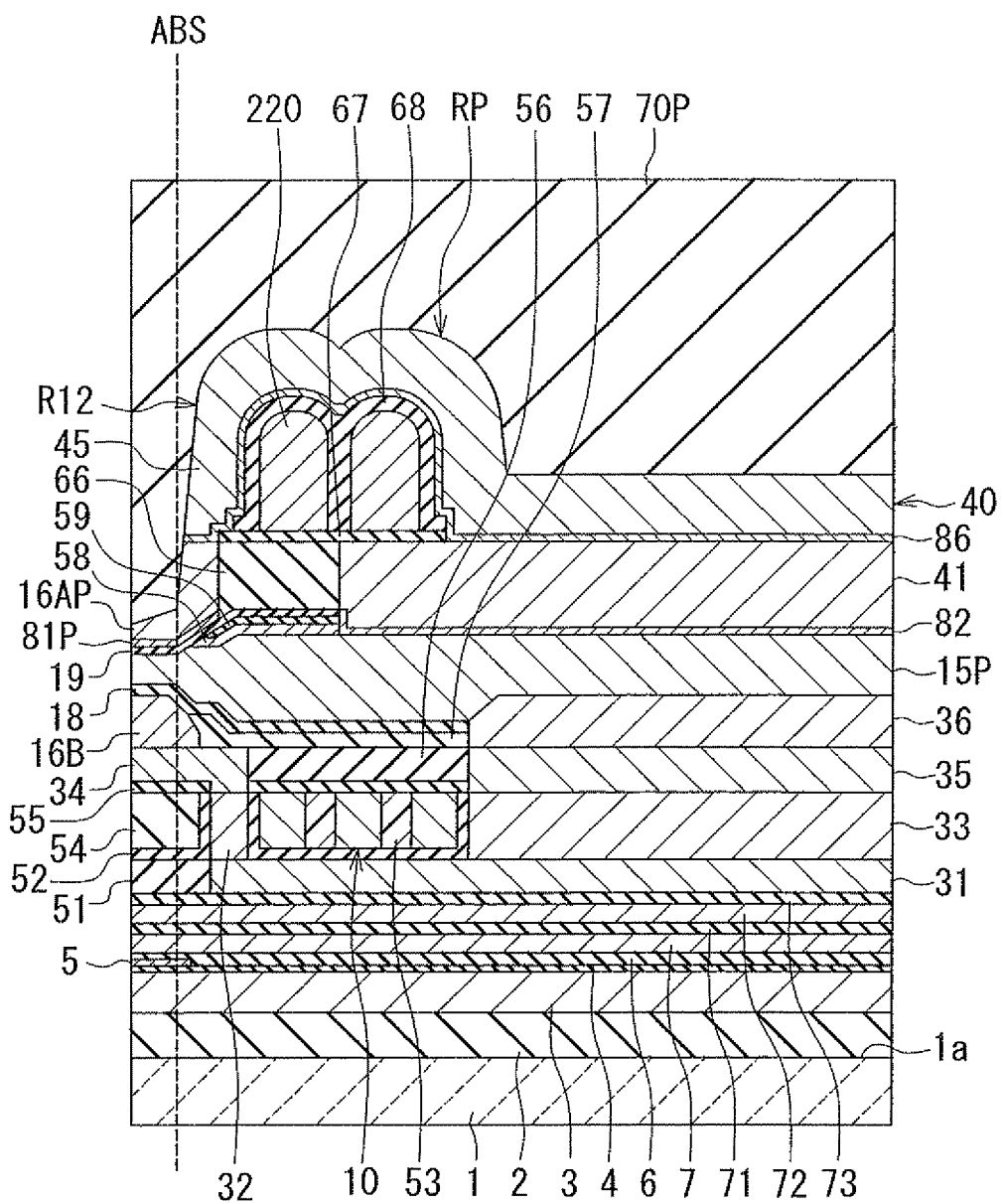
FIG. 31A and FIG. 31B are cross-sectional views showing a step that follows the step shown in FIG. 30A and FIG. 30B.
Figure 31B:
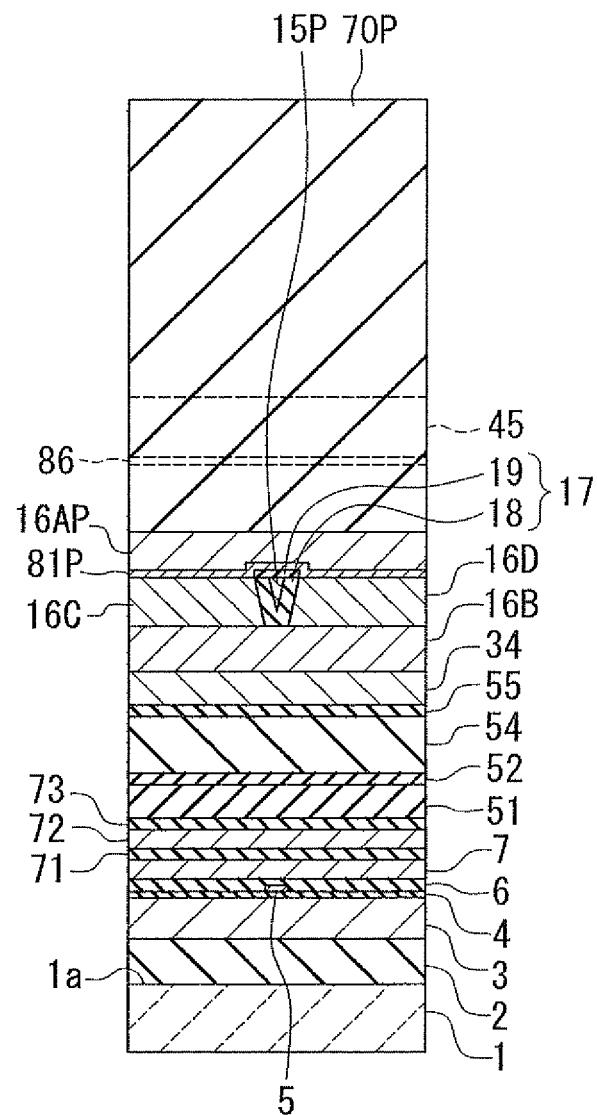

A method of manufacturing the magnetic head according to the present embodiment will now be described with reference to FIG. 30A to FIG. 31B. FIG. 30A to FIG. 31B each show a stack of layers formed in the process of manufacturing the magnetic head. FIG. 30A and FIG. 31A each show a cross section perpendicular to the medium facing surface 80 and to the top surface 1a of the substrate 1, or the main cross section, in particular. FIG. 30B and FIG. 31B each show a cross section taken at the position at which the medium facing surface 80 is to be formed. The symbol "ABS" in FIG. 30A and FIG. 31A indicates the position at which the medium facing surface 80 is to be formed.

The method of manufacturing the magnetic head according to the present embodiment is the same as the method according to the first embodiment up to the step of separating the first seed layer into the seed layer 81P and the underlying layer 82. FIG. 30A and FIG. 30B show the next step. In this step, first, the not-shown fourth connection layer is formed on the third connection layer by frame plating, for example. Next, the second nonmagnetic layer 66 is formed over the entire top surface of the stack. The second nonmagnetic layer 66 is then polished by, for example, CMP, until the first preliminary shield 16AP, the yoke layer 41 and the fourth connection layer are exposed.

Next, the insulating layer 67 is formed over the entire top surface of the stack. The insulating layer 67 is then selectively etched by, for example, IBE, so that the top surfaces of the first preliminary shield 16AP, the yoke layer 41 and the fourth connection layer are exposed. Then, the first portion 220 of the coil is formed by frame plating, for example. The insulating layer 68 is then formed to cover the first portion 220. Next, a seed layer 86P, which is to become the underlying layer 86 later, is formed over the first preliminary shield 16AP, the yoke layer 41 and the insulating layer 68 by physical vapor deposition such as sputtering. Then, a preliminary coupling layer 45P, which is to become the coupling layer 45 later, is formed on the seed layer 86P by, for example, frame plating using the seed layer 86P as an electrode and seed. Using the preliminary coupling layer 45P as an etching mask, the seed layer 86P except the portion thereof lying under the preliminary coupling layer 45P is then removed by IBE, for example.

The seed layer 86P except the portion thereof interposed between the first preliminary shield 16AP and the preliminary coupling layer 45P, the underlying layer 82, the preliminary coupling layer 45P, and the yoke layer 41 constitute a preliminary coupling portion 40P which is to become the first coupling portion 40 later. The portion of the seed layer 86P interposed between the first preliminary shield 16AP and the preliminary coupling layer 45P, the seed layer 81P, the first preliminary shield 16AP, and the preliminary coupling portion 40P constitute a preliminary return path section RP which is to be provided with the front end face R11 and the inclined surface R12 later to thereby become the first return path section R1.

FIG. 31A and FIG. 31B show the next step. In this step, first, the photoresist mask 92 (not shown) mentioned in the description of the first embodiment is formed over the entire top surface of the stack. The shape and location of the photoresist mask 92 are the same as those in the first embodiment except that the photoresist mask 92 covers part of the preliminary coupling layer 45P instead of the preliminary coupling layer 44P.

Next, the preliminary return path section RP is partially etched to form the inclined surface R12. More specifically, using the photoresist mask 92 as the etching mask, respective portions of the first preliminary shield 16AP, the seed layer 86P and the preliminary coupling portion 40P (the preliminary coupling layer 45P) are etched by, for example, IBE, so that the inclined surface R12 is formed over the first preliminary shield 16AP, the seed layer 86P and the preliminary coupling portion 40P (the preliminary coupling layer 45P). This etching makes the preliminary coupling layer 45P into the coupling layer 45, and makes the seed layer 86P into the underlying layer 86. This etching also makes the preliminary coupling portion 40P into the first coupling portion 40. The photoresist mask 92 is then removed. Next, a preliminary nonmagnetic layer 70P, which is to become the nonmagnetic layer 70 later, is formed to cover the entire top surface of the stack.

Wiring, terminals and other components are then formed on the preliminary nonmagnetic layer 70P, and the substrate 1 is cut near the position ABS at which the medium facing surface 80 is to be formed. Next, the cut surface is polished to form the medium facing surface 80. This makes the preliminary main pole 15P into the main pole 15, the first preliminary shield 16AP into the first shield 16A, the seed layer 81P into the underlying layer 81, and the preliminary nonmagnetic layer 70P into the nonmagnetic layer 70. This also makes the preliminary return path section RP into the first return path section R1. The subsequent steps are the same as those in the first embodiment.

The preliminary coupling layer 45P, which is formed by plating, grows in the direction perpendicular to the surface of the seed layer 86P. In the vicinity of the position ABS at which the medium facing surface 80 is to be formed, the preliminary coupling layer 45P grows mainly in the direction perpendicular to the top surface 1a of the substrate 1 and in the direction perpendicular to the medium facing surface 80 to be formed later. If the inclined surface R12 is not formed before forming the medium facing surface 80, the end face of the coupling layer 45 should be located in the medium facing surface 80. The end face of the coupling layer 45 includes a first portion which is the end face of a portion of the preliminary coupling layer 45P that has grown in the direction perpendicular to the top surface 1a of the substrate 1 and a second portion which is the end face of a portion of the preliminary coupling layer 45P that has grown in the direction perpendicular to the medium facing surface 80. Magnetic flux leakage from the inside to the outside of the first return path section R1 tends to occur in the second portion of the end face of the coupling layer 45. As a result, adjacent track erasure may occur.

In contrast to this, in the present embodiment, respective portions of the first preliminary shield 16AP, the seed layer 86P and the preliminary coupling portion 40P (the preliminary coupling layer 45P) are etched so that the inclined surface R12 is formed over the first preliminary shield 16AP, the seed layer 86P and the preliminary coupling portion 40P (the preliminary coupling layer 45P). The present embodiment thus allows the second portion of the end face of the coupling layer 45, in which magnetic flux leakage tends to occur, to be located away from the medium facing surface 80, so that a magnetic flux leaking from the second portion of the end face of the coupling layer 45 is prevented from reaching the recording medium.

The remainder of configuration, function and effects of the present embodiment are similar to those of the first embodiment.

Fifth Embodiment

Figure 32:
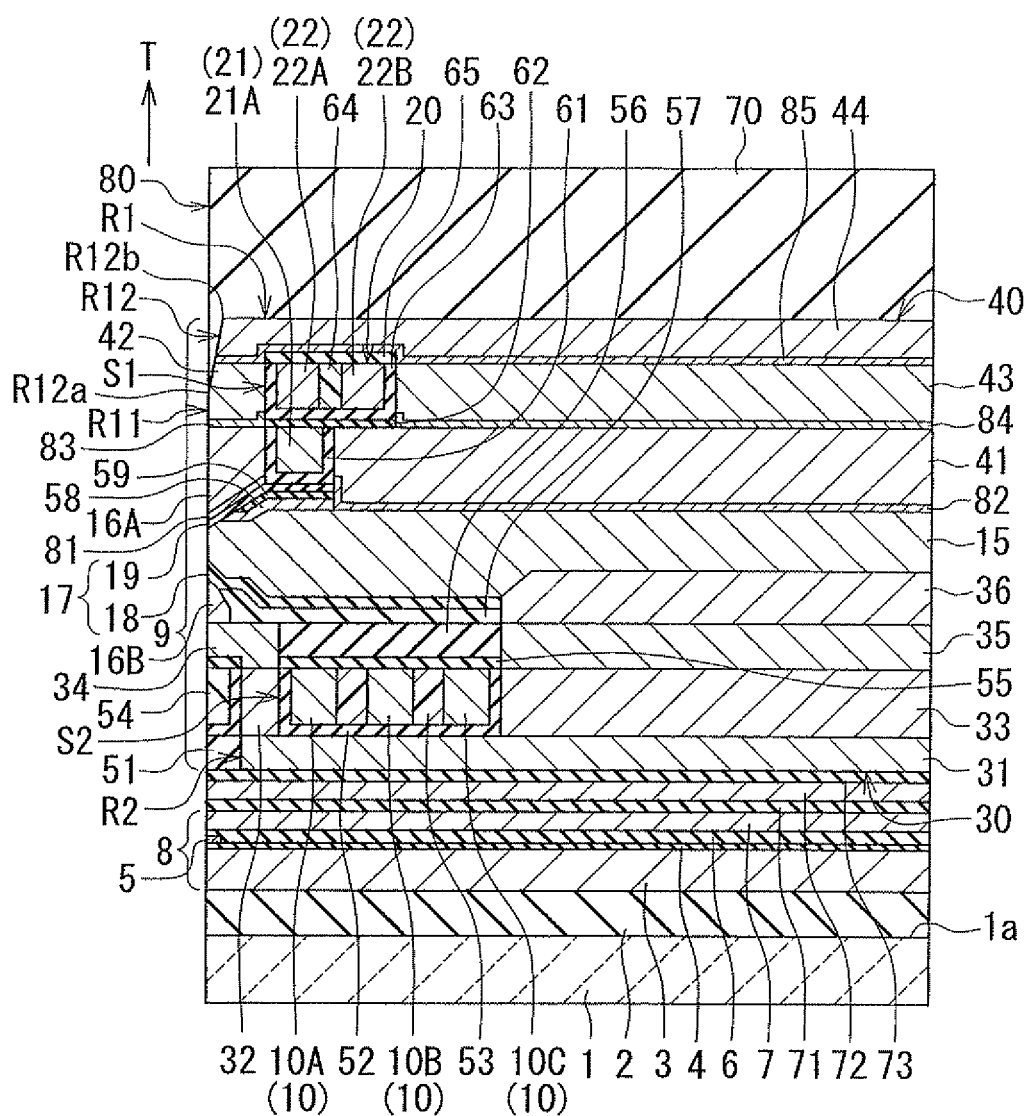
FIG. 32 is a cross-sectional view of a magnetic head according to a fifth embodiment of the invention.
Figure 33:
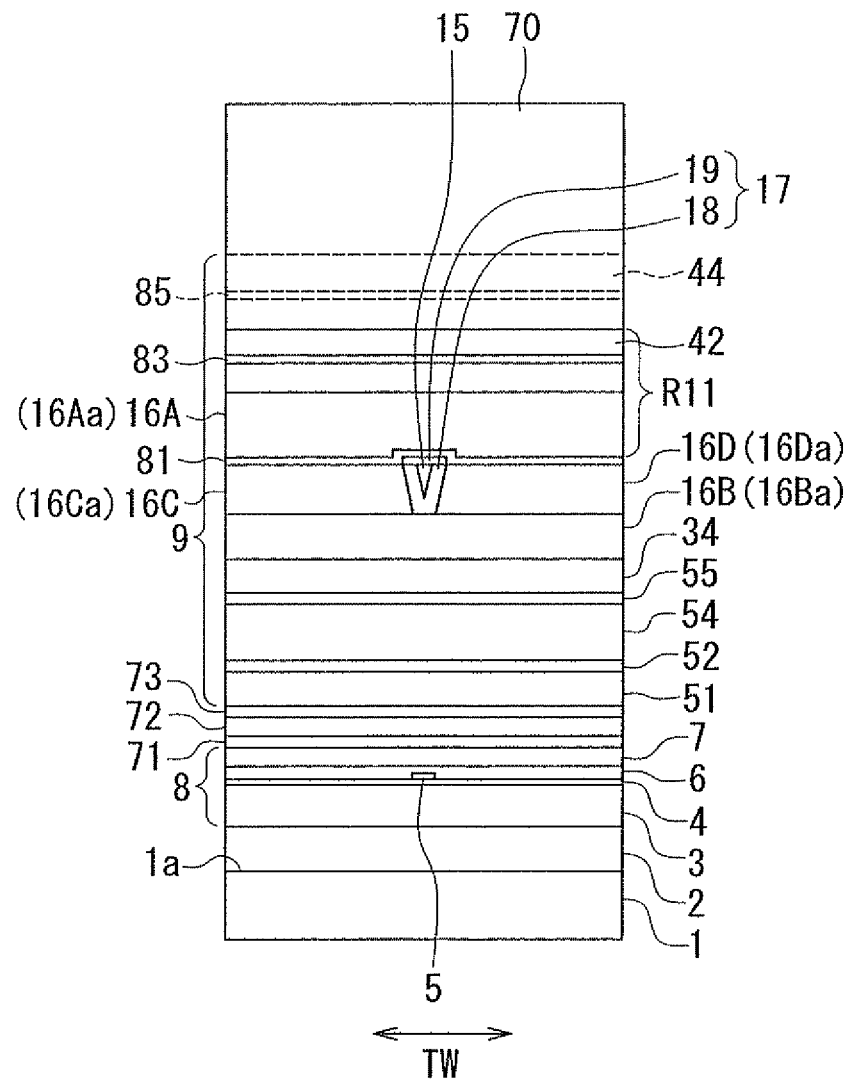
FIG. 33 is a front view showing the medium facing surface of the magnetic head according to the fifth embodiment of the invention.

A magnetic head according to a fifth embodiment of the invention will now be described with reference to FIG. 32 and FIG. 33. FIG. 32 is a cross-sectional view of the magnetic head according to the present embodiment. Note that FIG. 32 shows a cross section perpendicular to the medium facing surface and to the top surface of the substrate, or the main cross-section, in particular. FIG. 33 is a front view showing the medium facing surface of the magnetic head according to the present embodiment.

The configuration of the magnetic head according to the present embodiment is different from that of the magnetic head according to the first embodiment in the following respects. The first shield 16A of the present embodiment does not include the connecting surface 16Ad of the first embodiment shown in FIG. 1 and FIG. 7. The end face 16Aa of the first shield 16A therefore intersects the top surface 16Ac. Furthermore, in the present embodiment, the underlying layer 83 has an end located in the medium facing surface 80.

The first coupling layer 42 of the present embodiment has the shield facing surface 40a (see FIG. 1) which is the bottom surface, an end face located in the medium facing surface 80, a top surface farthest from the main pole 15, and a connecting surface connecting the end face and the top surface to each other. The distance from the medium facing surface 80 to an arbitrary point on the connecting surface of the first coupling layer 42 increases with increasing distance from the arbitrary point to the top surface 1a of the substrate 1.

The inclined surface R12 of the first return path section R1 of the present embodiment is formed on the first coupling portion 40 (the coupling layers 42 and 44 and the underlying layer 85). The connecting surface of the first coupling layer 42, the end face of the third coupling layer 44 and the end of the underlying layer 85 each constitute part of the inclined surface R12. The end face 16Aa of the first shield 16A, the end face of the first coupling layer 42 and the end of the underlying layer 83 each constitute part of the front end face R11 of the first return path section R1. The first edge R12a of the inclined surface R12 is present on the first coupling layer 42.

The method of manufacturing the magnetic head according to the present embodiment is different from the method according to the first embodiment in the following respects. In the step of partially etching the preliminary return path section RP in the present embodiment, the preliminary coupling portion 40P (the preliminary coupling layers 42P and 44P and the seed layer 85P) is partially etched so that the inclined surface R12 is formed on the preliminary coupling portion 40P (the preliminary coupling layers 42P and 44P and the seed layer 85P).

The coil of the present embodiment may have the same configuration as that in any of the second to fourth embodiments. The present embodiment cannot provide the effect resulting from the configuration in which the end of the underlying layer 83 is located at a distance from the medium facing surface 80, which has been described in relation to the first embodiment. The remainder of configuration, function and effects of the present embodiment are similar to those of any of the first to fourth embodiments.

The present invention is not limited to the foregoing embodiments, and various modifications may be made thereto. For example, of the first and second return path sections R1 and R2, only the first return path section R1 may be provided in the magnetic head.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording, comprising:
   a medium facing surface that faces a recording medium;
   a coil that produces a magnetic field corresponding to data to be written on the recording medium;
   a main pole that has an end face located in the medium facing surface, the main pole allowing a magnetic flux that corresponds to the magnetic field produced by the coil to pass, and producing a write magnetic field for writing the data on the recording medium by means of a perpendicular magnetic recording system;
   a first return path section made of a magnetic material;
   a gap part made of a nonmagnetic material and including a first portion interposed between the main pole and the first return path section;
   a nonmagnetic layer made of a nonmagnetic material; and
   a substrate having a top surface, wherein:
   the coil, the main pole, the first return path section, the gap part, and the nonmagnetic layer are located above the top surface of the substrate;
   the first return path section is located on a front side in a direction of travel of the recording medium relative to the main pole and is farther from the top surface of the substrate than is the main pole, the first return path section, being magnetically connected to part of the main pole away from the medium facing surface so that a first space is defined by the main pole, the gap part and the first return path section;
   the coil includes at least one first coil element extending to pass through the first space;
   the first return path section has: a front end face located in the medium facing surface at a position on the front side in the direction of travel of the recording medium relative to the end face of the main pole; and an inclined surface located on the front side in the direction of travel of the recording medium relative to the front end face;
   the inclined surface has a first edge connected to the front end face, and a second edge that is located farther from the top surface of the substrate than is the first space;
   part of the inclined surface lies between the first space and the medium facing surface;
   a distance from the medium facing surface to an arbitrary point on the inclined surface increases with increasing distance from the arbitrary point to the top surface of the substrate;
   an angle greater than 90° is formed between the front end face and the inclined surface; and
   the nonmagnetic layer includes an interposer interposed between the inclined surface and the medium facing surface.

2. The magnetic head for perpendicular magnetic recording according to claim 1, wherein the angle formed between the front end face and the inclined surface is in the range of 160° to 175°.

3. The magnetic head for perpendicular magnetic recording according to claim 1, wherein the inclined surface is planar.

4. The magnetic head for perpendicular magnetic recording according to claim 1, wherein:
   the first return path section includes: a first shield including the front end face; a first coupling portion for magnetically coupling the first shield to the part of the main pole away from the medium facing surface; and an underlying layer interposed between the first shield and the first coupling portion and underlying a part of the first coupling portion;
   the inclined surface is formed over the first shield, the underlying layer and the first coupling portion;
   the first edge of the inclined surface is present on the first shield;
   the first shield further has a top surface farthest from the main pole; and
   the first coupling portion has a shield facing surface that faces the top surface of the first shield with the underlying layer interposed therebetween.

5. The magnetic head for perpendicular magnetic recording according to claim 4, wherein:
   the first coupling portion includes a yoke layer and a first, a second, and a third coupling layer;
   the yoke layer is located away from the medium facing surface and magnetically connected to the part of the main pole away from the medium facing surface;
   the first coupling layer includes the shield facing surface and is magnetically connected to the first shield;
   the second coupling layer is located farther from the top surface of the substrate than is the yoke layer, and is magnetically connected to the yoke layer; and
   the third coupling layer is located farther from the top surface of the substrate than are the first and second coupling layers, and magnetically couples the first and second coupling layers to each other.

6. The magnetic head for perpendicular magnetic recording according to claim 4, wherein:
   the first coupling portion includes a yoke layer and a coupling layer;
   the yoke layer is located away from the medium facing surface and magnetically connected to the part of the main pole away from the medium facing surface; and
   the coupling layer includes the shield facing surface, and is located farther from the top surface of the substrate than are the first shield and the yoke layer, the coupling layer magnetically coupling the first shield and the yoke layer to each other.

7. The magnetic head for perpendicular magnetic recording according to claim 1, further comprising a second return path section made of a magnetic material and located on a rear side in the direction of travel of the recording medium relative to the main pole, wherein:

the gap part furthers include a second portion interposed between the main pole and the second return path section;

the second return path section is magnetically connected to the part of the main pole away from the medium facing surface so that a second space is defined by the main pole, the gap part and the second return path section; and the coil further includes at least one second coil element extending to pass through the second space.

8. The magnetic head for perpendicular magnetic recording according to claim 1, further comprising two side shields made of a magnetic material and having two end faces that are located in the medium facing surface at positions on opposite sides of the end face of the main pole in a track width direction.

9. A method of manufacturing the magnetic head for perpendicular magnetic recording of claim 1, comprising the steps of:

forming a preliminary main pole which is to be provided with the end face later to thereby become the main pole;

forming the gap part;

forming the coil;

forming a preliminary return path section which is to be provided with the front end face and the inclined surface later to thereby become the first return path section;

partially etching the preliminary return path section so that the preliminary return path section is provided with the inclined surface;

forming a preliminary nonmagnetic layer which is to become the nonmagnetic layer later; and forming the medium facing surface so that the preliminary return path section is provided with the front end face and thereby becomes the first return path section, the preliminary main pole is provided with the end face and thereby becomes the main pole, and the preliminary nonmagnetic layer becomes the nonmagnetic layer.

10. The method of manufacturing the magnetic head for perpendicular magnetic recording according to claim 9, wherein the angle formed between the front end face and the inclined surface is in the range of 160° to 175°.

11. The method of manufacturing the magnetic head for perpendicular magnetic recording according to claim 9, wherein the inclined surface is planar.

12. The method of manufacturing the magnetic head for perpendicular magnetic recording according to claim 9, wherein:

the first return path section includes: a first shield including the front end face; a first coupling portion for magnetically coupling the first shield to the part of the main pole away from the medium facing surface; and an underlying layer interposed between the first shield and the first coupling portion and underlying a part of the first coupling portion;

the inclined surface is formed over the first shield, the underlying layer and the first coupling portion;

the first edge of the inclined surface is present on the first shield;

the first shield further has a top surface farthest from the main pole;

the first coupling portion has a shield facing surface that faces the top surface of the first shield with the underlying layer interposed therebetween;

the step of forming the preliminary return path section includes the steps of:

forming a preliminary shield which is to become the first shield later;

forming a seed layer on the preliminary shield, the seed layer being intended to become the underlying layer later; and forming a preliminary coupling portion which is to become the first coupling portion later, wherein at least part of the preliminary coupling portion is formed by plating with the seed layer used as a seed; and the step of partially etching the preliminary return path section etches respective portions of the preliminary shield, the seed layer and the preliminary coupling portion so that the inclined surface is formed over the preliminary shield, the seed layer and the preliminary coupling portion.

* * * * *